United States Patent
Aoki et al.

(10) Patent No.: US 7,874,688 B2
(45) Date of Patent: Jan. 25, 2011

(54) DEFORMABLE MIRROR DEVICE, DEFORMABLE MIRROR PLATE

(75) Inventors: Sunao Aoki, Kanagawa (JP); Takahiro Miura, Kanagawa (JP); Masahiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 973 days.

(21) Appl. No.: 11/572,160

(22) PCT Filed: Jul. 29, 2005

(86) PCT No.: PCT/JP2005/013934

§ 371 (c)(1),
(2), (4) Date: Jan. 16, 2007

(87) PCT Pub. No.: WO2006/011594

PCT Pub. Date: Feb. 2, 2006

(65) Prior Publication Data

US 2007/0165312 A1  Jul. 19, 2007

(30) Foreign Application Priority Data

Jul. 30, 2004  (JP) ............... 2004-223018
Nov. 2, 2004  (JP) ............... 2004-319123
Apr. 27, 2005  (JP) ............... 2005-129576

(51) Int. Cl.
G02B 5/08 (2006.01)

(52) U.S. Cl. .................................................. 359/846
(58) Field of Classification Search ................ 359/848, 359/846
See application file for complete search history.

(56) References Cited

U.S. PATENT DOCUMENTS 4,011,003 A * 3/1977 Dragt ...................... 359/223.1

(Continued)

FOREIGN PATENT DOCUMENTS

JP  03296008 A  * 12/1991

(Continued)

OTHER PUBLICATIONS

U.S. Appl. No. 12/124,009, filed May 20, 2008, Aoki, et al.

*Primary Examiner*—Mark Consilvio
(74) *Attorney, Agent, or Firm*—Oblon, Spivak, McClelland, Maier & Neustadt, L.L.P.

(57) ABSTRACT

A deformable mirror device compensates the spherical aberration caused by the difference of thickness of the cover layers covering recording layers of an optical disc. Circular projections are concentrically arranged on a flexible member (2) where a mirror surface (3) is formed to produce a strength distribution pattern (2a). Attractive force is generated as electrostatic force between an upper electrode (8) and a lower electrode (9) according to the voltage applied from a drive circuit (10) so as to contract the second space (7) and accordingly expand the first space (5) in order to deform the mirror surface. At this time, the profile of the mirror surface is deformed to show a desired profile that can compensate the spherical aberration by the pattern formed on the flexible member (2) as strength distribution pattern (2a). With this arrangement, only a single drive actuator (10) is needed to deform the mirror surface to simplify the configuration and the control operation. The mirror surface can be deformed stepwise to show predetermined deformed profiles depending on the pattern formed as strength distribution pattern (2a). Then, it is possible to compensate the spherical aberration for each of the three or more than three recording layers of the optical disc.

19 Claims, 31 Drawing Sheets

U.S. PATENT DOCUMENTS

| | | | |
|---|---|---|---|
| 4,160,184 A * | 7/1979 | Ljung | 310/328 |
| 4,488,789 A * | 12/1984 | Kenney | 359/225.1 |
| 5,291,337 A * | 3/1994 | Greger et al. | 359/846 |
| 5,880,896 A * | 3/1999 | Ishii et al. | 359/846 |
| 6,002,661 A * | 12/1999 | Abe et al. | 369/112.01 |
| 6,836,352 B2 * | 12/2004 | Fitzpatrick et al. | 359/291 |
| 7,025,468 B2 * | 4/2006 | Nishioka et al. | 359/846 |
| 7,123,397 B2 * | 10/2006 | Murakami | 359/224.1 |
| 2004/0233553 A1 * | 11/2004 | Shibata et al. | 359/846 |
| 2007/0097836 A1 * | 5/2007 | Kurozuka et al. | 369/112.29 |

FOREIGN PATENT DOCUMENTS

| | | | |
|---|---|---|---|
| JP | 5-157903 | | 6/1993 |
| JP | 07-306367 | | 11/1995 |
| JP | 08334708 A | * | 12/1996 |
| JP | 2004-012895 | | 1/2004 |
| JP | 2004-079117 | | 3/2004 |

* cited by examiner

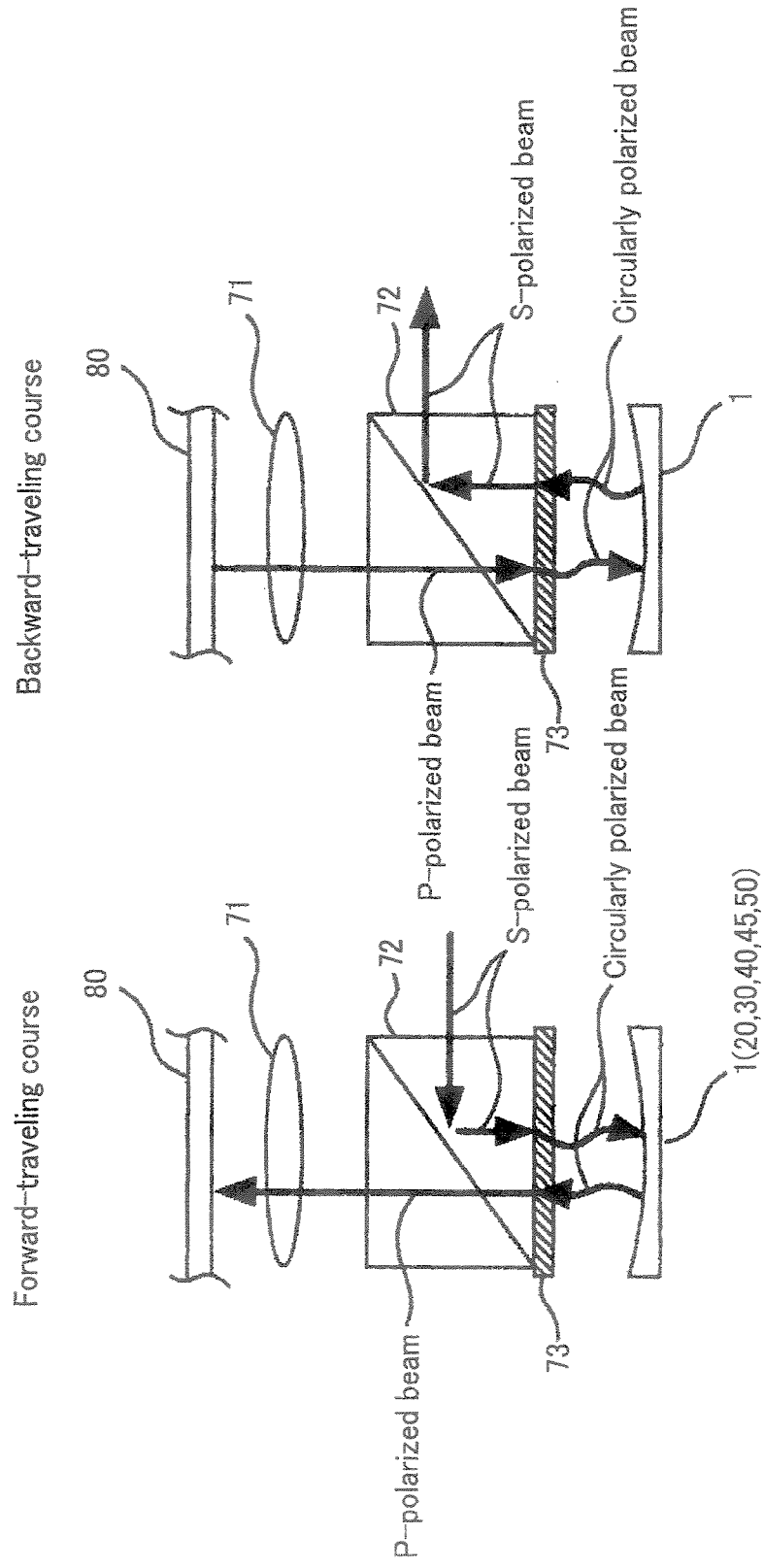

DEFORMABLE MIRROR DEVICE, DEFORMABLE MIRROR PLATE

TECHNICAL FIELD

This invention relates to a deformable mirror device having a deformable mirror surface and also to a deformable mirror plate.

This application is based upon and claims the benefit of priority from the prior Japanese Patent Applications No. 2004-223018 filed on Jul. 30, 2004, No. 2004-319123 filed on Nov. 2, 2004 and No. 2005-129576 filed on Apr. 27, 2005, the entire contents of which being incorporated herein by reference.

BACKGROUND ART

In optical disc apparatus adapted to record information signals on or reproduce information signals from an optical disc that operates as information recording medium, a laser beam emitted from a laser beam source is converged by an objective lens and irradiated onto the signal recording layer of the optical disc to record or reproduce signals. When a laser beam is irradiated by way of an objective lens, spherical aberration appears depending on the thickness of the cover layer covering the recording layer of the optical disc, or the distance for the laser beam striking the optical disc to travel from the recording surface to the recording layer. In other words, the optical system of an optical disc apparatus that include an objective lens is designed to minimize the spherical aberration as a function of the thickness of the cover layer arranged on the optical disc to be used with it and hence spherical aberration takes place when the thickness of the cover layer differs from the expected value.

For the same token, it is also known that spherical aberration appears when the thickness of the cover layer arranged on a optical disc is not uniform. Additionally, in recent years, optical discs having a multilayered recording layer have been marketed to realize a high recording density. With such an optical disc, the distance from the laser beam striking surface to the recording layer varies so that spherical aberration takes place when signals are recorded on or reproduced from any of the recording layers other than the reference recording layer. When spherical aberration exists, the image forming performance of the laser beam irradiated on the signal recording layer is degraded to by turn degrade the information signal recording/reproducing characteristics. Therefore, means are required to correct the spherical aberration attributable to the thickness of the cover layer arranged on the optical disc.

Known means for correcting the spherical aberration attributable to the varying thickness of the cover layer provided on such an optical disc include those for deforming the surface profile of the mirror of the optical system. For example, Jpn. Pat. Appln. Laid-Open Publication No. 5-15191 discloses a deformable mirror including a deformable plate carrying a mirror surface on the surface thereof and piezoelectric actuators for pressurizing the deformable plate at several positions from the rear side of the plate so that the spherical aberration that appears is corrected by changing the voltages being applied to the respective piezoelectric actuators and thereby deforming the mirror surface.

Jpn. Pat. Appln. Laid-Open Publication No. 9-152505 also discloses a deformable mirror where a reference surface having a predetermined profile is formed under a flexible member carrying a mirror surface on the surface thereof and the flexible member is adapted to be adsorbed to the reference surface or de-adsorbed in order to produce two desired profiles. In other words, the reference surface is so profiled that the spherical aberration can be corrected by the profile of the mirror surface when the flexible member is adsorbed to the reference surface.

Of the above-cited arrangements, that of providing piezoelectric actuators is complex because of the necessity of using a plurality of piezoelectric actuators in order to make the mirror surface show a predetermined profile. Then, the control circuit for controlling the operation of driving the plurality of piezoelectric actuators inevitably shows large dimensions and makes the overall arrangement a very complex one.

Additionally, when recording information signals on and reproducing information signals from an optical disc developed in recent years for high density recording the beam diameter of the laser beam converged to the signal recording surface of such an optical disc is typically about 4 mm. Then, it is highly difficult to arrange a plurality of piezoelectric actuators in an area of such a dimension.

With the deformable mirror provided with a reference surface as cited above, it is possible to downsize the control circuit because it does not require the use of a plurality of piezoelectric actuators to realize a predetermined profile for the mirror surface. However, the mirror surface is deformed only in two modes of adsorbing and de-adsorbing the flexible member. With an optical system using such a deformable mirror, it is not possible to effectively correct the spherical aberration of an optical disc having three or more than three signal recording layers.

DISCLOSURE OF THE INVENTION

Problem to be Solved by the Invention

In view of the above-identified circumstances, it is therefore the object of the present invention to provide a novel deformable mirror device and a deformable mirror plate that can dissolve the problem of the conventional art.

According to the present invention, there is provided a deformable mirror device including: a flexible member carrying a mirror surface formed on the surface thereof and including parts formed so as to be in a state differentiated from the remaining parts in terms of mode of deformation due to the profiles of circles or ellipses thereof having a common center; and a drive means for applying drive force to the flexible member and deforming the profile of the mirror surface.

In another aspect of the present invention, there is provided a deformable mirror plate including: a flexible member including parts formed so as to be in a state differentiated from the remaining parts in terms of mode of deformation due to the profiles of circles or ellipses thereof having a common center; and a mirror surface formed on the surface of the flexible member.

As defined above, a flexible member carrying a mirror surface formed on the surface thereof is made to include parts formed so as to be in a state differentiated from the remaining parts in terms of mode of deformation. Thus, it is possible to realize a mode of deformation for those parts formed so as to be in a state differentiated from the remaining parts that is different from the latter parts when drive force is uniformly applied to the flexible member. Then, therefore, it is possible to obtain a profile that is deformed in a desired manner for the flexible member by applying predetermined uniform drive force to the flexible member according to the pattern for forming parts in a state differentiated from the remaining parts. When it is possible to obtain a desired deformed profile for the flexible member by applying predetermined uniform drive force to the flexible member, it is then possible to deform the flexible member without using a complex arrangement for applying different drive forces by arranging a plurality of piezoelectric actuators as in the case of known deformable mirrors.

Additionally it is also possible to obtain a profile that is deformed stepwise in a desired manner for the flexible member according to the level of the drive force applied to it. When it is possible to obtain a profile that is deformed stepwise in a desired manner for the flexible member according to the level of the drive force applied to it, it is then possible to produce two or more than two types of deformed profile for the mirror surface unlike the case where the flexible member is adsorbed to a reference surface to produce a profile that is deformed in a desired manner.

By adopting the present invention, according to the application of a predetermined uniform drive force to the flexible member having a mirror surface formed thereon, it is possible to obtain a desired deformed profile for the flexible member. Therefore, it is possible to deform the flexible member into a desired profile without using a complex structure, in which, similarly to the known deformable mirror a plurality of piezoelectric actuators is provided to apply different drive forces. Then, it is possible to avoid the use of a large circuit for the deformable mirror device. Additionally since a plurality of piezoelectric actuators is not required, the control circuit for driving and controlling the plurality of piezoelectric actuators is also not required.

According to the present invention, it is possible to obtain a profile that is deformed stepwise in a desired manner for the flexible member according to the level of the drive force applied to it. Thus, it is possible to produce two or more than two types of deformed profile for the mirror surface. Then, if an optical disc has three or more than three signal recording layers, it is possible to effectively correct spherical aberration for any of the signal recording layers other than the one selected as reference signal recording layer when designing the corresponding optical system.

Still additionally, according to the present invention, it is possible to realize a deformable mirror device that can compensate spherical aberration for any variations of flexible member such as one adapted to reflect a laser beam by 180° and one adapted to reflect a laser beam by 90° by forming parts so as to be in a state differentiated from the remaining parts in terms of mode of deformation due to the profiles of circles or ellipses thereof having a common center. Then, as a result of forming parts showing profiles of circles or ellipses having a common center, it is possible to prevent areas intensively subjected to stress from arising when drive force is applied. Thus, it is possible to effectively prevent the flexible member from being broken and/or fractured by fatigue if it is deformed repeatedly.

Other objects and specific advantages of the present invention will become apparent from the following description of preferred embodiments given below by referring to the accompanying drawings.

BRIEF DESCRIPTION OF THE DRAWINGS

FIGS. 12A and 12B are schematic lateral views of the optical system of FIG. 1, mainly illustrating polarization of a laser beam;

BEST MODE FOR CARRYING OUT THE INVENTION

Now, the present invention will be described in greater detail by referring to the accompanying drawings that illustrate preferred embodiments of the invention.

Firstly, the optical system of an optical disc apparatus to which a deformable mirror device according to the present invention is applicable will be described below by referring to FIG. 1.

Figure 1:
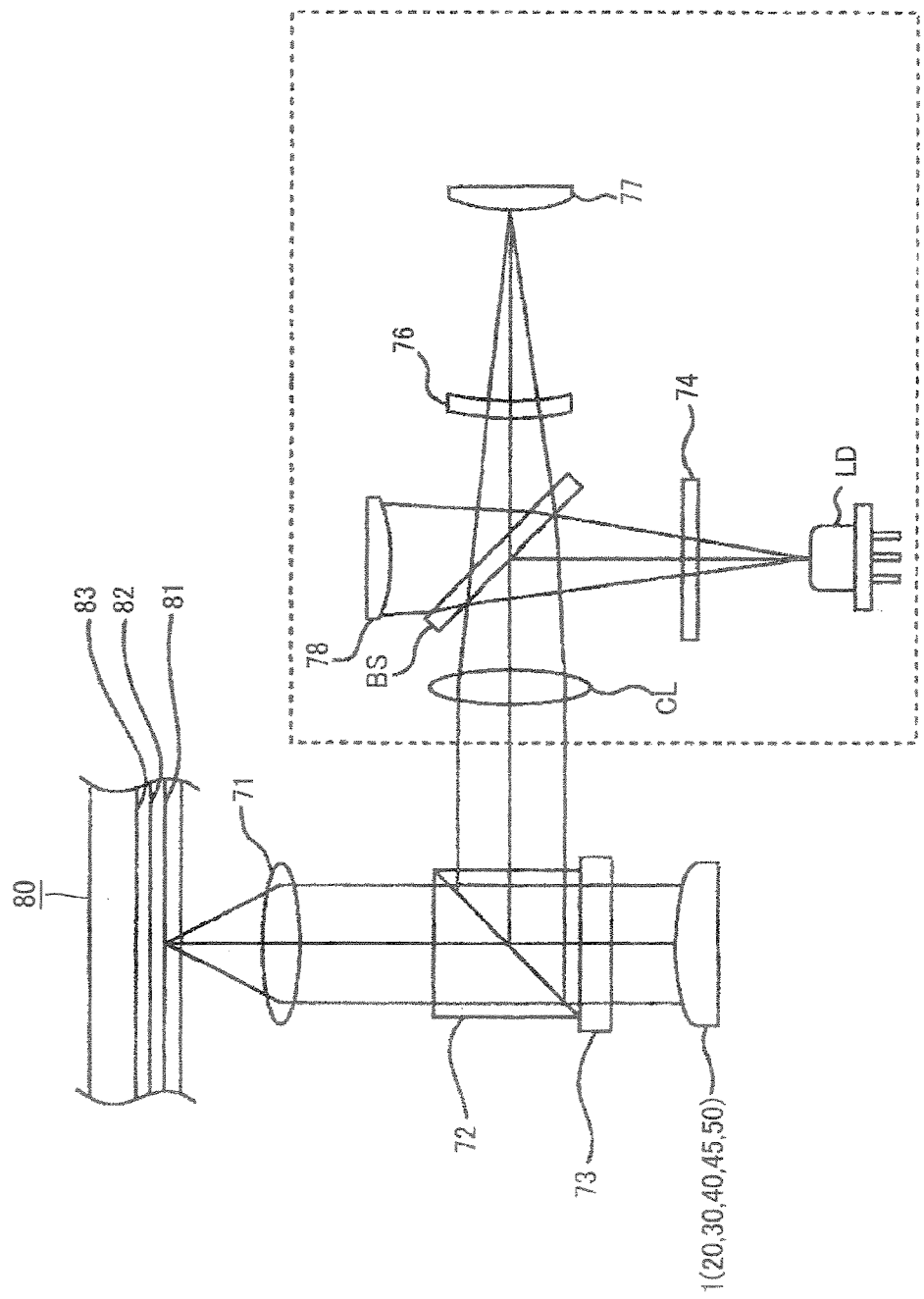
FIG. 1 is a schematic lateral view of the optical system of an optical disc apparatus to which any of the first through fifth embodiments of deformable mirror device according to the present invention is applicable.

As shown in FIG. 1, the optical disc apparatus to which the present invention is applicable is adapted to use an optical disc 80 as information recording medium. A laser beam of a wavelength of 405 nm is used to record information signals on and reproduce information signals from the optical disc 80 to be used for the optical disc apparatus. In other words, it is an optical disc showing a high recording density such as a so-called Blu-ray disc. An objective lens 71 having a numerical aperture (NA) of 0.85 is used for condensing the laser beam on the optical disc 80.

Referring to FIG. 1, the optical disc 80 has three signal recording layers arranged one on the other. The recording layer formed closest to the recording surface that is the laser beam striking surface is the first recording layer 81. The gap between the recording surface and the first recording layer 81 is typically defined to be 0.075 mm. In other words, the cover layer from the recording surface to the first recording layer 81 is 0.075 mm thick.

Then, the second recording layer 82 and the third recording layer 83 are arranged so as to be separated from the first recording layer 81 by predetermined respective gaps. The gap separating the first recording layer 81 and the second recording layer 82 and the gap separating the second recording layer 82 and the third recording layer 83 are typically defined to be 25 μm. Thus, the cover layer of the second recording layer 82 is 0.100 mm thick and the cover layer of the third recording layer 83 is 0.125 mm thick.

As shown in FIG. 1, the optical system for reading information signals from and writing information signals to the optical disc 80 includes an objective lens 71, a polarization beam splitter 72, a ¼ wave plate 73, a deformable mirror device 1 (20, 30, 40, 45, 50), a semiconductor laser LD, a grating 74, a beam splitter BS, a collimator lens CL, a multi-lens 76, a detector 77 and a front monitor 78.

In the optical system, the laser beam emitted from the semiconductor laser LD enters the beam splitter BS by way of the grating 74 and the collimator lens CL. Part of the laser beam that enters the beam splitter BS is made to enter the front monitor 78 provided to monitor the laser output.

The laser beam reflected by the beam splitter BS is transmitted through the collimator lens CL and enters the polarization beam splitter 72. The polarization beam splitter 72 is designed to reflect the S-polarized beam component of the laser beam and transmit the P-polarized beam component of the laser beam. Therefore, the laser beam that enters as S-polarized laser beam is reflected by the polarization beam splitter 72 and enters the ¼ wave plate 73. The laser beam is then transformed into a circularly polarized laser beam as it is transmitted through the ¼ wave plate 73. The laser beam that is circularly polarized by the ¼ wave plate 73 is then reflected by the mirror surface of the deformable mirror device 1 (20, 30, 40, 45, 50) according to the present invention. The reflected laser beam is then transformed into a P-polarized laser beam as it is transmitted through the ¼ wave plate 73 once again so that it is now not reflected by the polarization beam splitter 72 and enters the objective lens 71.

The objective lens 71 is supported by a biaxial actuator (not shown) so as to be at least displaceable in the direction of moving away from the optical disc 80 whose optical axis runs in parallel to that of the objective lens 71, and selectively focus the laser beam entering from the polarization beam splitter 72 at one of the first recording layer 81, the second recording layer 82 and the third recording layer 83.

On the other hand, the laser beam reflected by the recording layer of the optical disc 80 is transmitted through the objective lens 71 and the polarization beam splitter 72 and enters the ¼ wave plate 73. The reflected laser beam that is transmitted through the ¼ wave plate 73 is transformed into a circularly polarized laser beam and reflected by the deformable mirror device so as to enter the ¼ wave plate 73 once again. As the reflected laser beam that enters the ¼ wave plate 73 is transmitted through the latter, it is transformed into an S-polarized laser beam and hence reflected by the polarization beam splitter 72 to enter the collimator lens CL.

Part of the laser beam reflected by the optical disc 80 and transmitted through the collimator lens CL is then transmitted through the beam splitter BS and enters the detector 77 by way of the multi-lens 76 and detected by the detector 77. The reflected laser beam that is detected by the detector 77 is transformed into an electric signal to provide various pieces of information.

Meanwhile, when a plurality of recording layer is formed on the optical disc 80, the optical system to be used for the optical disc device is designed in such a way that the extent of spherical aberration is minimized when the laser beam is focused on the first recording layer 81 arranged closest to the recording surface the incident laser beam strikes. In other words, when an optical disc 80 of the above-described type is used, it is so designed that the extent of spherical aberration is minimized for the thickness 0.075 mm of the cover layer that covers the first recording layer 81.

However, the traveling distance of the laser beam that strikes the recording surface increases as it gets to the second recording layer 82 and the third recording layer 83. In other words, the extent of spherical aberration increases as the laser beam is focused on the second recording layer 82 and on the third recording layer 83.

Thus, according to the present invention, the mirror surface of the deformable mirror device a ranged in a manner as shown in FIG. 1 is deformed to make it possible to compensate the spherical aberration that arises when the laser beam is so adjusted as to be focused on the second recording layer or the third recording layer in a manner as will be described below for each of the preferred embodiments of the invention.

First Embodiment

Firstly, the first embodiment of a deformable mirror device 1 according to the present invention will be described below by referring to FIG. 2. The deformable mirror device 1 deforms a mirror surface by using a flexible member that takes a differentiated partial state in a deformation mode as the part where the cross section profile is differentiated is formed and a strength distribution pattern is given.

Figure 2:
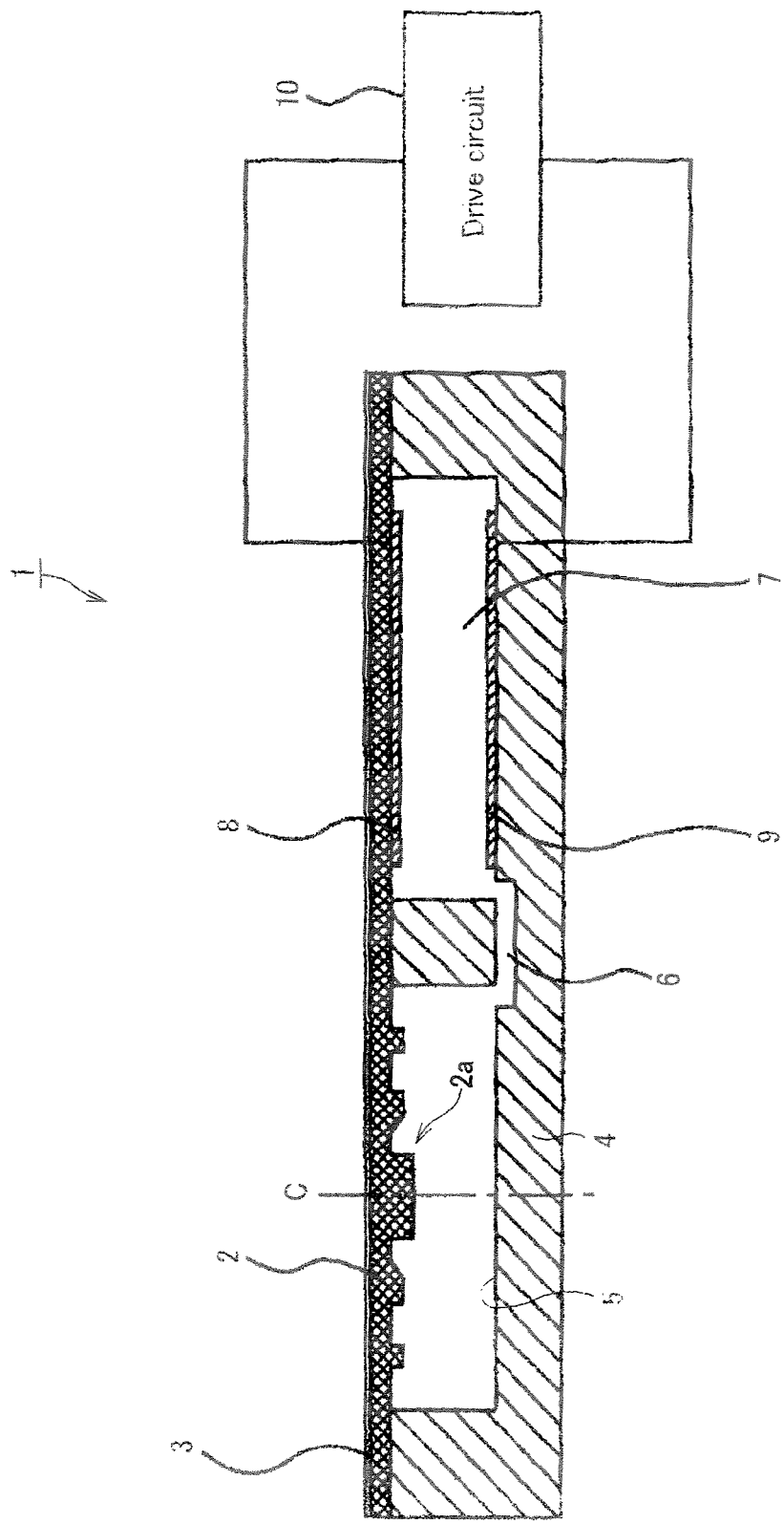
FIG. 2 is a schematic cross sectional view of the first embodiment of deformable mirror device according to the present invention.

As shown in FIG. 2, the deformable mirror device 1 according to the invention includes at least a flexible member 2, a reflection film 3, a substrate 4, an upper electrode 8 and a lower electrode 9. The substrate 4 of the mirror device 1 is provided with two circular grooves for producing a first space 5 and a second space 7, the two grooves being arranged side by side. The first space 5 and the second space 7 defined by the two grooves are linked to each other by way of a flow channel 6.

The flexible member 2 is bonded to the substrate 4 so as to cover the first space 5 and the second space 7. The flexible member 2 is bonded to the substrate 4 to hermetically seal the first space 5 and the second space 7. The first space 5 and the second space 7 that are hermetically sealed are filled with gas or liquid.

The flexible member 2 is resiliently deformable and made of a flexible material. A reflection film 3 typically made of aluminum is bonded to the surface of the flexible member 2 opposite to the surface bonded to the substrate 4. The reflection film 3 arranged on one of the surfaces of flexible member 2 operates as mirror surface of the deformable mirror device 1.

The reflection film 3 is formed on the flexible member 2 typically by sputtering.

In the following description, the flexible member carrying a mirror surface formed on one of the surfaces thereof is referred to as deformable mirror plate.

A strength distribution patter 2a showing a given strength distribution is formed on the part of the flexible member 2 that is located vis-à-vis the first space 5.

Figure 4:
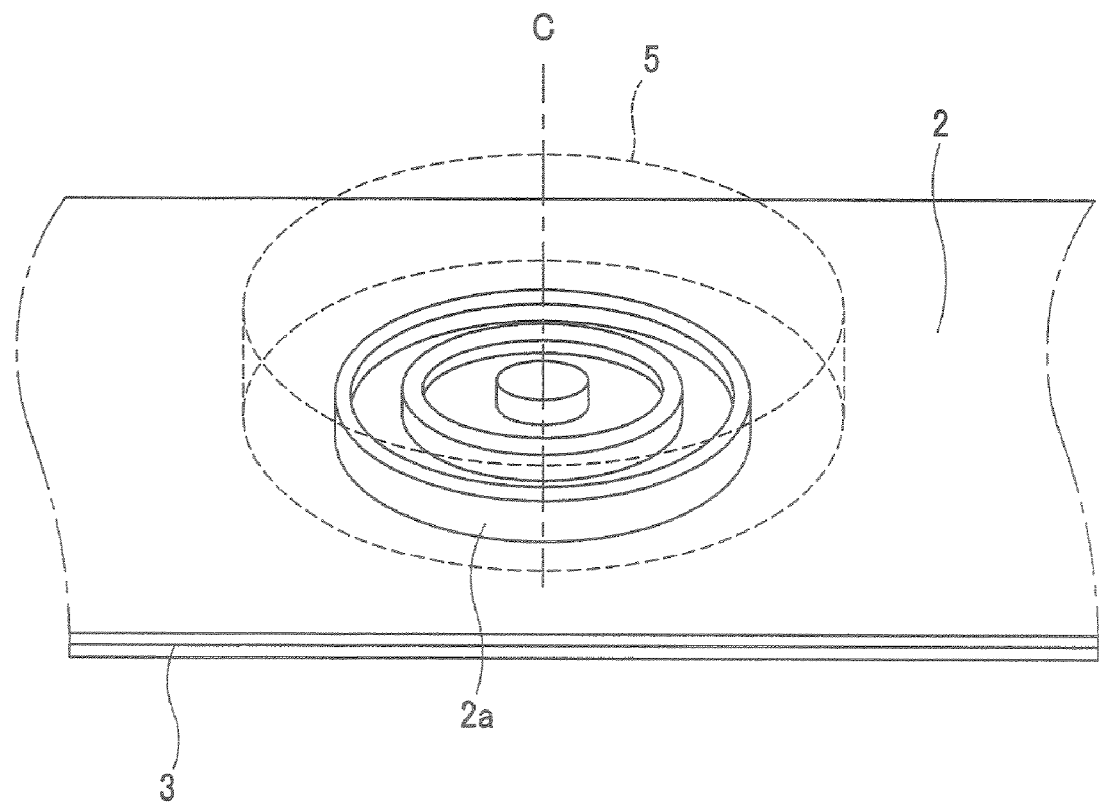
FIG. 4 is a schematic perspective view of the flexible member of the first embodiment of deformable mirror device according to the present invention.

Now, the strength distribution pattern 2a formed on the flexible member 2 will be described below by referring to FIG. 4.

The strength distribution pattern 2a is formed on the surface of the flexible member 2 opposite to the surface thereof where the reflection film 3 is arranged. The strength distribution pattern 2a is formed by concentrically forming a plurality of projecting parts around the central axis C of the circular first space 5. Thus, the flexible member 2 is equipped with projecting parts as parts thereof as shown in FIG. 2. The flexible member 2 shows such a strength distribution that the projecting parts shows a mode of deformation different from that of the remaining parts thereof.

As the flexible member 2 is equipped with projecting parts as parts thereof and adapted to show a given strength distribution, the mirror surface shows a partially differentiated radius of curvature when a pressure (drive force) is applied thereto as will be described in greater detail hereinafter. The upper electrode 8 that is circular like the circular second space 7 is arranged on the area of the flexible member 2 that faces the second space 7. The upper electrode 8 is formed by a flexible electrode material. The lower electrode 9 that is also circular is arranged at the bottom of the second space 7 so as to face the upper electrode 8. The upper electrode 8 and the lower electrode 9 are connected to each other by way of a drive circuit 10 so that a drive voltage may be applied to the upper and lower electrodes 8 and 9.

Figure 3:
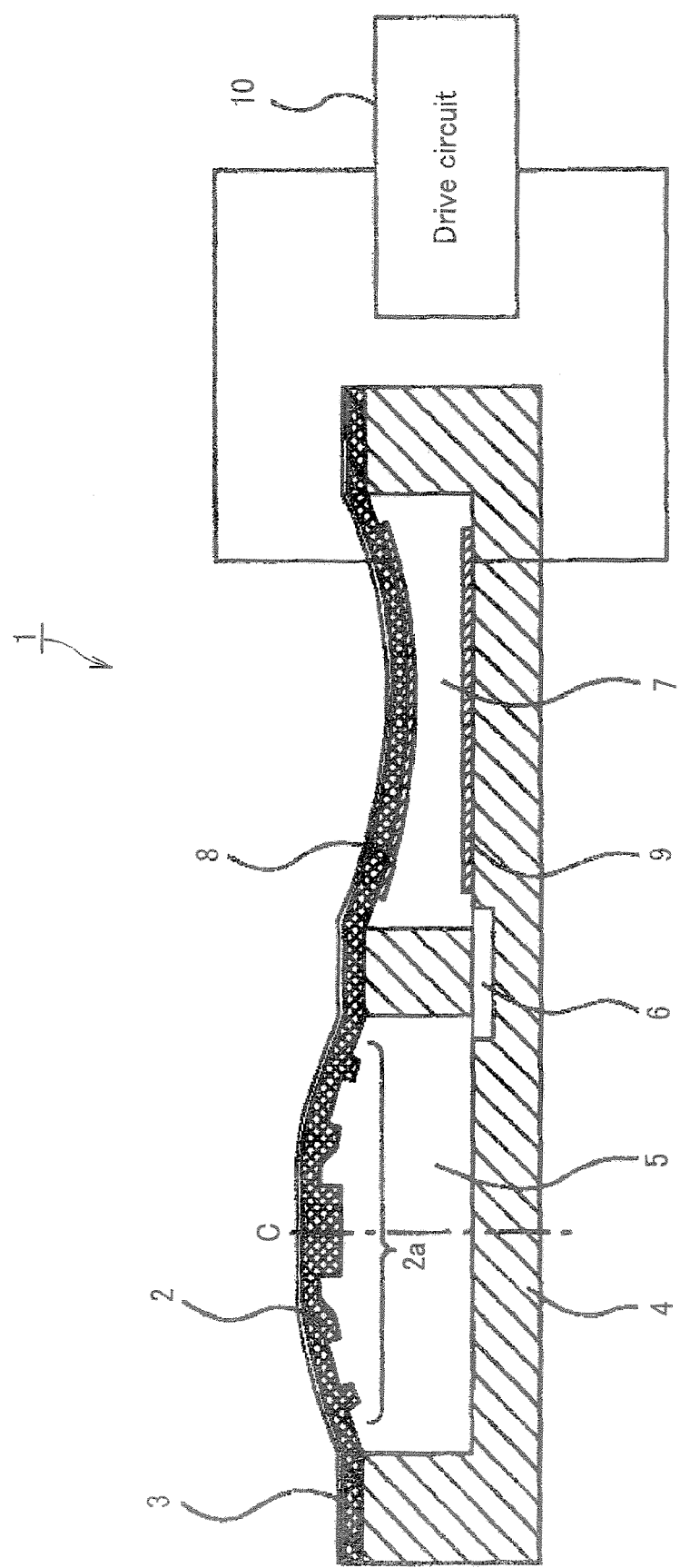
FIG. 3 is a schematic cross sectional view of the first embodiment of deformable mirror device according to the invention whose mirror surface is deformed.

Now, the mirror surface deforming operation of the deformable mirror device 1 having the above-described configuration will be described below by referring to FIG. 3.

A drive voltage is applied from the drive circuit 10 between the upper electrode 8 and the lower electrode 9 to deform the mirror surface formed by the reflection film 3 arranged on the deformable mirror device 1. As the drive power is applied, attractive force is generated between the upper electrode 8 and the lower electrode 9 due to electrostatic force so that the part of the flexible member 2 where the upper electrode 8 is formed is bent and deformed as the upper electrode 8 is attracted toward the lower electrode 9 that is arranged on the substrate 4.

As a result of the deformation, there arise a pressure difference between the second space 7 where the upper electrode 8 and the lower electrode 9 are arranged and the first space 5. Since the first and second spaces 5 and 7 are linked by way of the flow channel 6, the raised pressure in the second space 7 acts on the first space 5 by way of the flow channel 6 and hence on the surface of the flexible member 2 that is hermetically sealing the first space 5 where the strength distribution pattern 2a is formed so as to deform the flexible member 2 so as to make it swell at the side where the reflection film 3 is formed.

As pointed out above, pressure of a predetermined level is uniformly applied to the flexible member 2 as a function of the pressure change internal the second space 7. Since the strength distribution pattern 2a is formed on the flexible member 2, the flexible member 2 is deformed as a function of the strength distribution pattern 2a. In other words, as pressure is uniformly applied to the flexible member 2, it is deformed in such a way that the deformation of the flexible member 2 varies according to the profile of the strength distribution pattern 2a.

Thus, the deformed profile of the flexible member 2 that is deformed as pressure is uniformly applied to it can be set to a predefined one that can compensate the spherical aberration by appropriately selecting the profile of the strength distribution pattern 2a. In short, the mirror surface can be deformed to show a profile that can compensate the spherical aberration.

The attractive force generated between the upper electrode 8 and the lower electrode 9 can be changed by changing the level of the voltage being applied to the upper electrode 8 and the lower electrode 9. In other words, the pressure applied to the surface where the strength distribution pattern 2a is formed can be changed stepwise by controlling the level of the drive voltage applied from the drive circuit 10.

Thus, it is possible to produce a predefined deformed profile for the mirror surface that varies stepwise as a function of the applied pressure that is changed stepwise by appropriately selecting the strength distribution pattern 2a formed on the flexible member 2. Therefore, by using such a flexible member 2, it is possible to produce at least three profiles of the mirror surface corresponding to an un-deformed state, a first deformed state and a second deformed state according to the level of the drive voltage applied to the electrodes and hence the level of pressure applied to the flexible member 2.

In other words it is possible to realize a deformable mirror device 1 that can effectively compensate the spherical aberration that arises at each of the three or more than three recording layers of an optical disc 2 by selecting a strength distribution pattern 2a that provides the mirror surface with deformed profiles necessary for compensating the spherical aberrations according to the level of the drive voltage (applied pressure) that can be changed stepwise.

With the above-described deformable mirror device 1, the mirror surface can be made to show a desired deformed profile according to the uniform drive force applied to the flexible member 2. Thus, it is no longer necessary to arrange and drive a plurality of piezoelectric actuators at a plurality of spots of a flexible member when the mirror surface of the prior art needs to be made to show a deformed profile to compensate spherical aberration.

In other words, the deformable mirror device 1 requires only a single drive actuator for deforming the mirror surface that is the drive circuit 10 for driving the upper electrode 8 and the lower electrode 9. Thus, it is only necessary to control the drive circuit 10 in order to compensate spherical aberration and hence it is possible to compensate spherical aberration by means of a simple arrangement and a simple control operation.

It is possible to produce two or more than two differently deformed profiles for the mirror surface by controlling the drive circuit 10 in such a way that the level of the voltage supplied to the upper electrode 8 and the lower electrode 9 is changed stepwise as described above. Then, when three or more than three recording layers including the first through third recording layers 81, 82, 83 are formed on the optical disc 80, it is possible to provide the mirror surface with different profiles necessary for compensating the spherical aberration of each of the recording layers of the optical disc. That is, with respect to the optical disc 2 in which three or more than three recording layers are formed, it is possible to effectively compensate spherical aberration on the other recording layers than the reference recording layer for the optical system design.

The strength distribution pattern 2a for producing predetermined deformed profiles for the mirror surface as described above can be defined according to the results of simulation typically using an FEM (finite element method) simulation tool for deformed profiles that can be produced as a function of the pressure applied to the flexible member in accordance with the reduction of the second space 7.

Now, a method of manufacturing a deformable mirror device 1 of this embodiment will be described below.

Figure 5A:
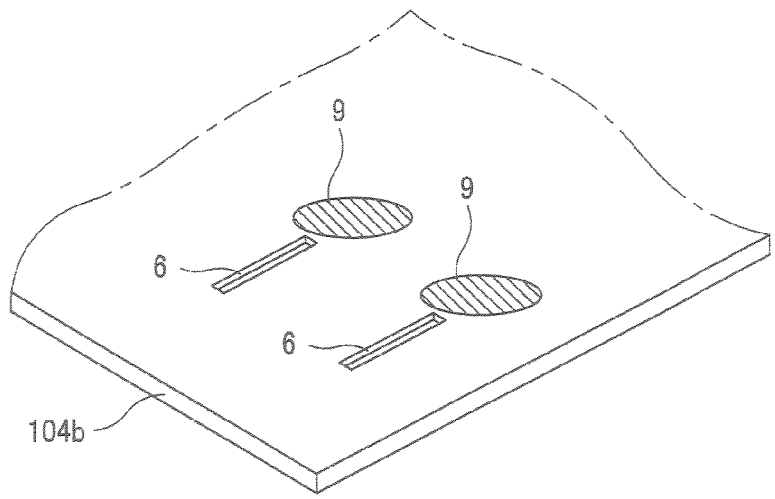
FIGS. 5A through 5C are schematic perspective views of the first embodiment of deformable mirror devices according to the present invention, illustrating the method of manufacturing it.

When manufacturing a deformable mirror device 1 of this embodiment, firstly a plurality of grooves are formed on a glass substrate 104a as shown in FIG. 5A so as to make them operate as flow channels 6. Such flow channels 6 can be produced by forming a mask pattern for producing flow channels on the glass substrate 104a and subsequently etching the glass substrate 104a.

Then, a film of an electrode material is formed on the entire surface of the glass substrate 104a where the flow channels 6 have been prepared at predetermined respective positions and, after forming mask patterns at predetermined respective position, lower electrodes 9 are formed as shown in FIG. 5A by etching. Note that the film of the electrode material is formed, for example, by sputtering.

Figure 5B:
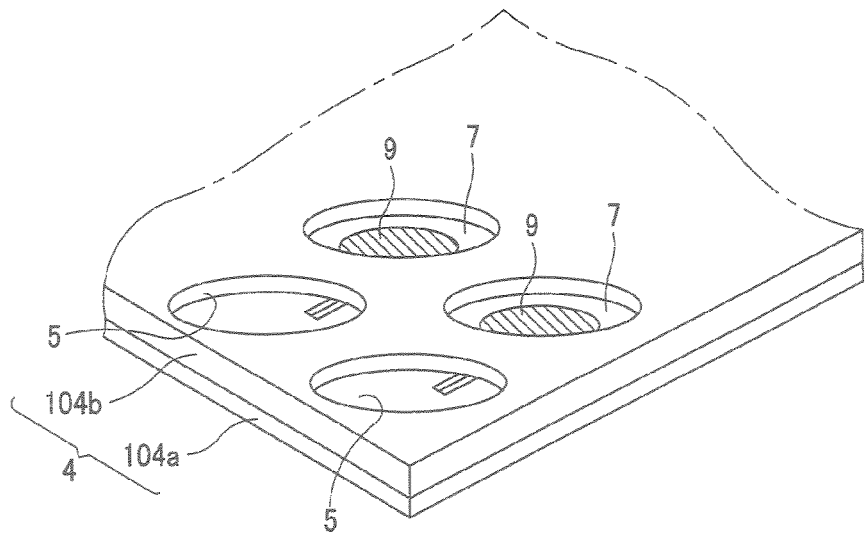

Then, an Si substrate 104b is bonded to the glass substrate 104a where the flow channels 6 and the lower electrodes 9 have been formed typically by means of an anode bonding process as shown in FIG. 5B. At this time, circular holes are cut through the Si substrate 104b for the first spaces 5 and the second spaces 7 as shown in FIG. 2.

The glass substrate 104a and the Si substrate 104b that are put together correspond to the substrate 4 of FIG. 2.

Figure 5C:
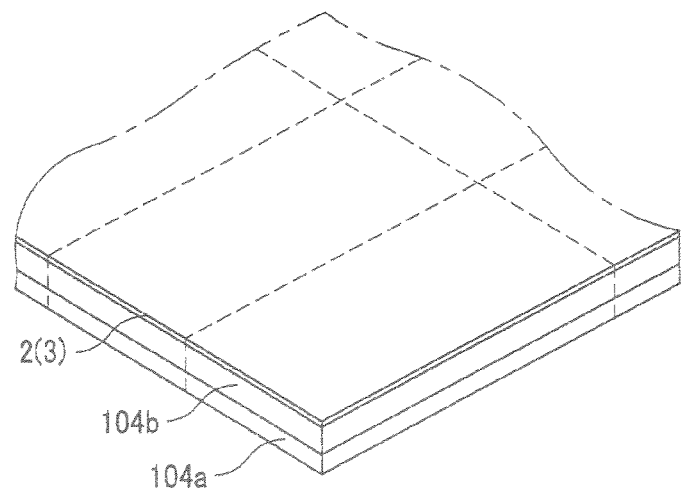

Then, a flexible members 2 that are equipped with respective reflection films 3 are bonded onto the Si substrate 104b typically by means of an anode bonding process as shown in FIG. 5C. As described earlier by referring to FIG. 2, a strength distribution pattern 2a is formed on each of the flexible members 2 at the area for facing the corresponding first space 5. Upper electrodes 8 are formed on the flexible member 2 at the areas for facing the respective second spaces 7. Although not shown, when the flexible members 2 shown in FIG. 5C are bonded to the Si substrate 104b, the strength distribution patterns 2a have been formed on the flexible member 2 in advance with the centers thereof aligned with the respective central axes of the circular first spaces 5 and the upper electrodes 8 have also been formed on the flexible members 2 in advance so as to be found in the respective second spaces 7 when they are bonded to the Si substrate 104b.

Like the lower electrodes 9, the upper electrodes 8 are produced by forming a film of an electrode material such as aluminum by sputtering and subsequently etching the film.

The reflection films 3 are produced by forming a film of aluminum on the flexible members 2 and subsequently etching the film.

Thereafter the bonded ensemble of the glass substrate 104a, the Si substrate 104b and the flexible members 2 equipped with respective reflection films 3 is cut to pieces showing predetermined dimensions along the broken lines shown in FIG. 5C to produce deformable mirror devices 1.

Since deformable mirror devices 1 can be manufactured by utilizing a manufacturing process that is popular in the field of manufacturing semiconductors involving film forming, etching and bonding, they can be easily manufactured with a high degree of precision on a mass production basis.

Additionally, since a semiconductor manufacturing process can be utilized for the purpose of the present invention it is possible to downsize each deformable mirror device 1 and reduce the manufacturing cost to a relatively low level.

Second Embodiment

Now, the second embodiment of the present invention will be described below by referring to FIG. 6. The deformable mirror device 20 of the second embodiment differs from the first embodiment in that while the first embodiment is adapted to produce drive force for deforming the mirror surface by the attractive force between the upper electrode 8 and the lower electrode 9, the second embodiment is adapted to produce drive force for deforming the mirror surface by way of deformation of a piezoelectric element 21.

Figure 6:
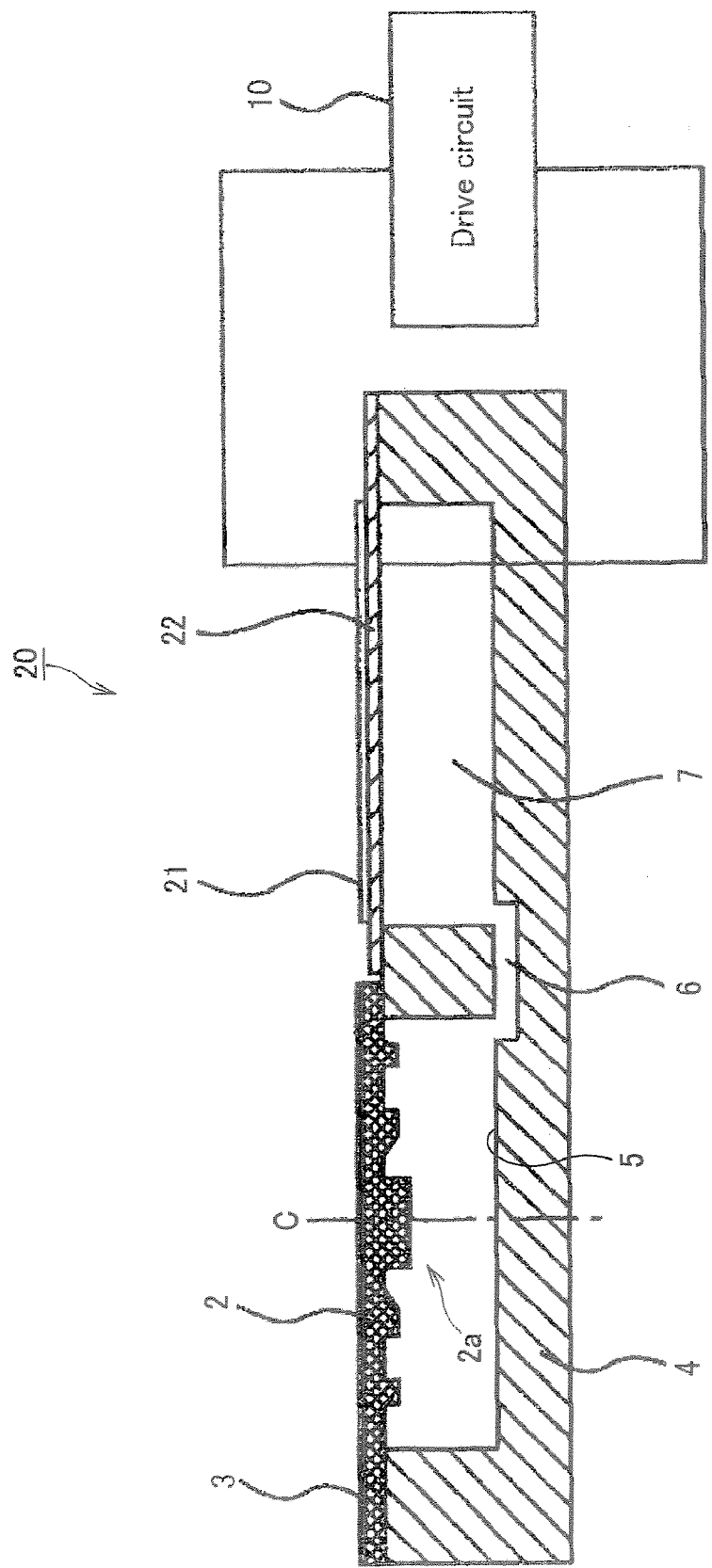
FIG. 6 is a schematic cross sectional view of the second embodiment of deformable mirror device according to the present invention.

In FIG. 6, the components same as those of the first embodiment are denoted respectively by the same reference symbols and will not be described any further.

In the deformable mirror device 20, the flexible member 2 is bonded to the substrate 4 so as to cover only the first space 5 as shown in FIG. 6. At the side of the second space 7, an elastic conductive plate 22 is bonded to the substrate 4 so as to cover only the second space 7. The elastic conductive plate 22 is a flexible elastic body made of a conductive material. The substrate 4 and the elastic conductive plate 22 are bonded to each other so as to hermetically seal the second space 7.

While the flexible member 2 is bonded to the substrate 4 so as to cover only the first space 5 in the above description it may alternatively be so arranged that the flexible member 2 is bonded to the substrate 4 so as to hermetically seal both the first space 5 and the second space 7 as in the case of the embodiment of FIG. 2 when a conductive material is selected for the flexible member 2.

The piezoelectric element 21 is rigidly fitted to the surface of the elastic conductive plate 22 opposite to the surface facing the second space 7, or the surface where the mirror surface is formed. The piezoelectric element 21 is made to show a circular profile like the second space 7 and rigidly secured in position so as to be located right above the second space 7.

The wires extended from the drive circuit 10 are connected to the elastic conductive plate 22 and the piezoelectric element 21 so as to apply a drive voltage to the piezoelectric element 21.

With the deformable mirror device 20 having the above-described configuration, the mirror surface is deformed as a voltage is applied from the drive circuit 10 to the piezoelectric element 21 to expand or contract the piezoelectric element depending on the polarity of the voltage applied to it. More specifically, as the piezoelectric element 21 is expanded or contracted, the elastic conductive plate 22 rigidly fitted to the piezoelectric element 21 is deformed to protrude or retract, whichever appropriate, relative to the mirror surface so as to consequently deform the mirror surface.

When the piezoelectric element 21 and hence the elastic conductive plate 22 are deformed to retract relative to the mirror surface the surface of the flexible member 2 where the strength distribution pattern 2a is formed is subjected to pressure trying to push it up toward the side of the mirror surface so that the mirror surface is consequently deformed to protrude.

When, on the other hand, the piezoelectric element 21 and hence the elastic conductive plate 22 are deformed to protrude relative to the mirror surface, the second space 7 is expanded to attract the surface of the flexible member 2 where the strength distribution pattern 2a is formed toward the inside so that the mirror surface is consequently deformed to retract.

With the above-described arrangement for applying pressure as a function of the expanding or contracting force of the piezoelectric element 21, it is possible to deform the mirror surface so as to protrude or retract. When the mirror surface is deformed to retract it can be made to be deformed so as to compensate the spherical aberration that appears by defining the strength distribution pattern 2a on the flexible member 2 in such a way that a predetermined deformed profile is produced according to the negative pressure applied to it to attract it toward the inside.

Additionally, the pressure applied to the surface of the flexible member 2 where the strength distribution pattern 2a is formed can be changed stepwise by changing the level of the voltage applied to the piezoelectric element 21. Then, it is possible to effectively compensate the spherical aberration for any of the recording layers of the optical disc where three or more than three recording layers are formed by designing the strength distribution pattern 2a so as to produce one of the predetermined deformed profiles according to the level of the pressure that is changed stepwise.

A manufacturing process that is substantially same as the one illustrated in FIG. 5 can be applied to the deformable mirror device 20. Thus, it is possible to achieve mass production with high accuracy, downsize each deformable mirror device 20 and reduce the manufacturing cost to a relatively low level.

Third Embodiment

Now, the third embodiment of the present invention will be described below by referring to FIG. 7. The deformable mirror device 30 of the third embodiment is adapted to deform the mirror surface by directly pushing or pulling the surface of the flexible member 2 where the strength distribution pattern 2a is formed by means of a voice coil motor.

Figure 7:
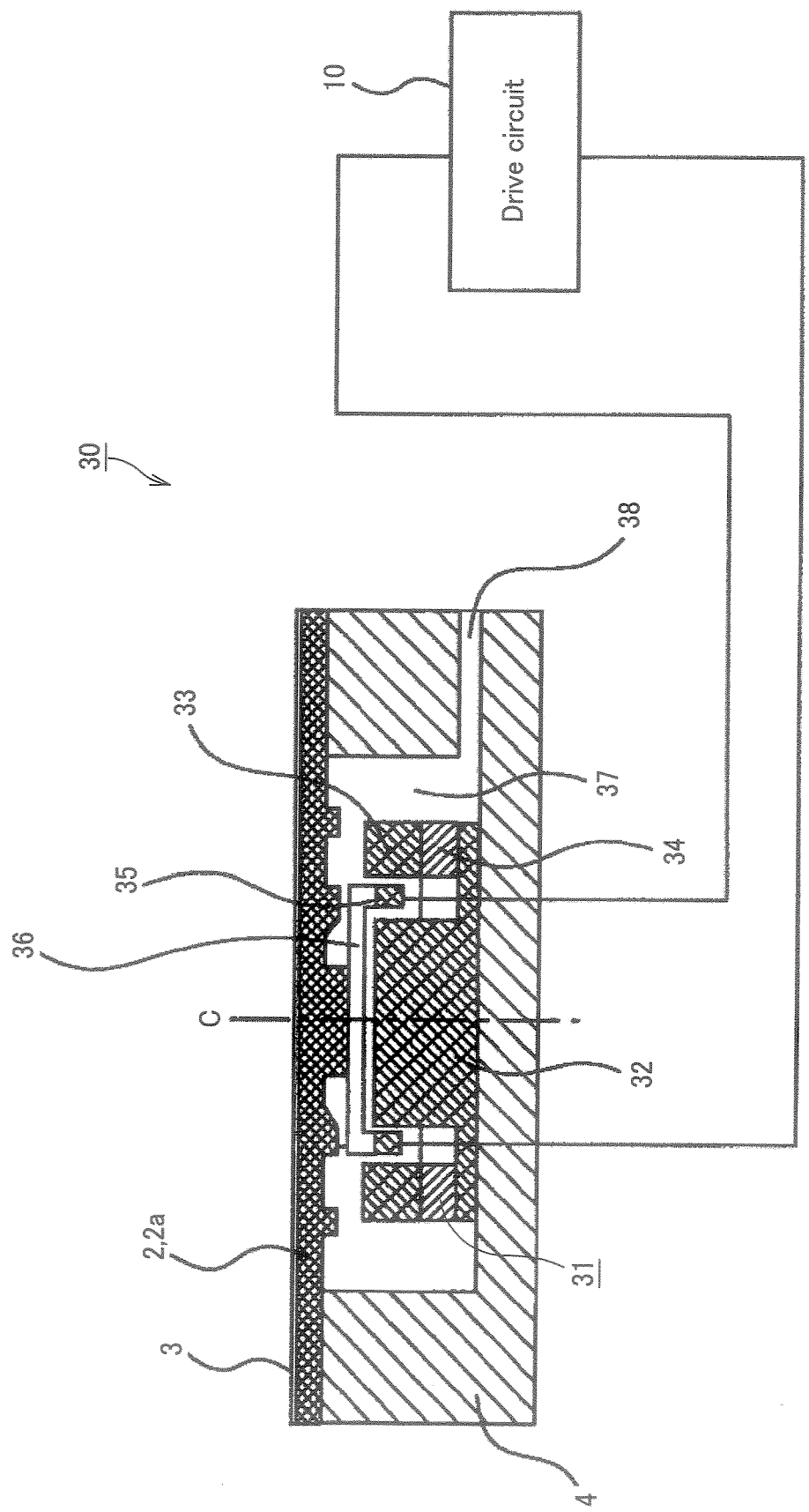
FIG. 7 is a schematic cross sectional view of the third embodiment of deformable mirror device according to the present invention.

As shown in FIG. 7, the mirror device 30 has a single circular space 37 in a substrate 4. The flexible member 2 is bonded to the substrate 4 in such a way that the central axis C of the circular space 37 is aligned with the center of the strength distribution pattern 2a that shows concentrically arranged circles. A voice coil motor 31 is fitted to the substrate 4 in the space 37.

The voice coil motor 31 is rigidly secured in position on the substrate 4 with the central axis of the cylindrical yoke 32 thereof aligned with the central axis C of the space 37. The cylindrical yoke 32 is provided with a flange section and a ring-shaped magnet 34 is fitted onto the flange section. A ring-shaped yoke 33 that is coaxial with the magnet 34 is arranged on the latter.

A coil holder 36 is fitted to the front end of the projection of the strength distribution pattern 2a that is formed at the center of the pattern. The central projection of the strength distribution pattern 2a and the coil holder 36 are centered relative to each other. A drive coil 35 is wound around the coil holder 36 on the outer peripheral surface of the front end part thereof located away from the central projection of the strength distribution pattern 2a.

The drive coil 35 is connected to the drive circuit 10 and a drive current is supplied from the drive circuit 10.

Note that the cylindrical yoke 32, the magnet 34 and the ring-shaped yoke 33 are so formed as to produce a magnetic path that generates drive force for driving the coil holder 36 to move in a direction parallel to the central axis of the space 37 when a drive current is made to flow to the drive coil 35.

A flow channel 38 is formed on the substrate 4. The space 37 communicates with the outside by way of the flow channel 38. In other words, the flow channel 38 operates as airway between the space 37 and the outside.

With the deformable mirror device 30 having the above-described configuration, the mirror surface is deformed as an electric current is made to flow from the drive circuit 10 to the drive coil 35. More specifically, drive force is generated in a direction parallel to the central axis of the space 37 according to the polarity of the electric current supplied to the drive coil 35 that is wound around the coil holder 36. As drive force is generated in a direction parallel to the central axis of the coil holder 36, the central part of the strength distribution pattern 2a formed on the flexible member 2, to which the coil holder 36 is fitted, is directly pushed toward the mirror surface side or drawn toward the side opposite to the mirror surface by the coil holder 36 so that consequently the mirror surface is deformed to protrude or retract whichever appropriate.

Thus, pushing force or drawing force is uniformly applied to the flexible member 2 by the voice coil motor. In this case again, it is possible to produce a desired deformed profile for the flexible member 2 where a strength distribution pattern 2a is formed by defining a required strength distribution for the pattern as drive force is uniformly applied to it.

More specifically, by defining the strength distribution pattern 2a that is formed on the flexible member 2 so as to produce a predetermined deformed profile according to the application of pushing force or drawing force by the coil holder 36, it is possible to deform the mirror surface to show a profile that can compensate the spherical aberration for the operating recording layer of the optical disc.

Additionally, it is possible to change the pressure applied to the surface of the flexible member 2 where the strength distribution pattern 2a is formed stepwise by changing the magnitude of the electric current supplied to the drive coil 35. Then, it is possible to effectively compensate the spherical aberration for any of the recording layers of the optical disc where three or more than three recording layers are formed by designing the strength distribution pattern 2a so as to produce one of the predetermined deformed profiles according to the level of the drive force that is changed stepwise.

The voice coil motor 31 that is employed for the third embodiment can be made to show a relatively high drive response speed at the coil holder 36 as a function of the supply of the drive current. For example, it can drive the coil holder 36 at high speed of a level of tens of several kHz. Then, the mirror surface can be made to show a high response speed for the deformation thereof. Thus, it is possible to provide a deformable mirror device that can compensate the spherical aberration for a recording layer of an optical disc by following the change in the thickness of the cover layer of the optical disc.

For instance, in the case of a high density optical disc such as a Blu-ray disc adapted to use a laser beam of a wavelength of 405 nm for high density signal recording, the thickness of the cover layer on the plane of the optical disc is so accurate that spherical aberration can be disregarded. However, as high density optical discs become more popular, less accurate cheap optical discs may be marketed. Then, the thickness of the cover layer may fluctuate to such an extent that the spherical aberration for a recording layer cannot be disregarded for a recording layer in a direction parallel to the plane of the optical disc.

If it is assumed such optical discs are marketed, it may become necessary to compensate the spherical aberration that arises for a recording layer in a direction parallel to the plane of the optical disc and prevent the recording/reproduction characteristics of the optical disc from being degraded. Since high density optical discs have been adapted to be driven to rotate at high speed for a signal recording/reproducing operation in recent years, the mirror surface is required to deform at relatively high speed.

The deformable mirror device 20 of the third embodiment adapted to deform the mirror surface at relatively high speed can effectively operate to compensate the spherical aberration that corresponds to the uneven thickness of the cover layer for a recording layer in a direction parallel to the plane of the optical disc.

Then, if it is possible to effectively compensate the spherical aberration that corresponds to the uneven thickness of the cover layer for a recording layer in a direction parallel to the plane of the optical disc, the recording/reproduction characteristics of a cheap optical disc can be prevented from being degraded. Then, it is possible to raise the tolerance for uneven thickness of the cover layer of an optical disc from the current level and hence reduce the cost of manufacturing optical discs.

Although techniques that can be used for a deformable mirror device 30 to compensate the spherical aberration that corresponds to the change in the thickness of the cover layer for a recording layer in a direction parallel to the plane of the optical disc are not limited to the above-described ones, the use of a voice coil motor 31 provides an advantage of eliminating the necessity of a special configuration and a special design for raising the response speed.

Additionally, it is possible to improve the damping characteristics for the above-described deformable mirror device 30 by optimizing the cross section and the profile of the flow channel 38 illustrated in FIG. 7.

Fourth Embodiment

Now, the fourth embodiment of the present invention will be described below by referring to FIG. 8. No strength distribution pattern 2a that shows a differentiated cross section is formed on the flexible member 2 but an electrode pattern 41 is formed by partly arranging upper electrodes 41 in the deformable mirror device 40 of the fourth embodiment. The electrostatic force generated between the upper electrodes 41 and the lower electrode 42 is made to operate as attractive force for directly deforming the flexible member 2.

Figure 8:
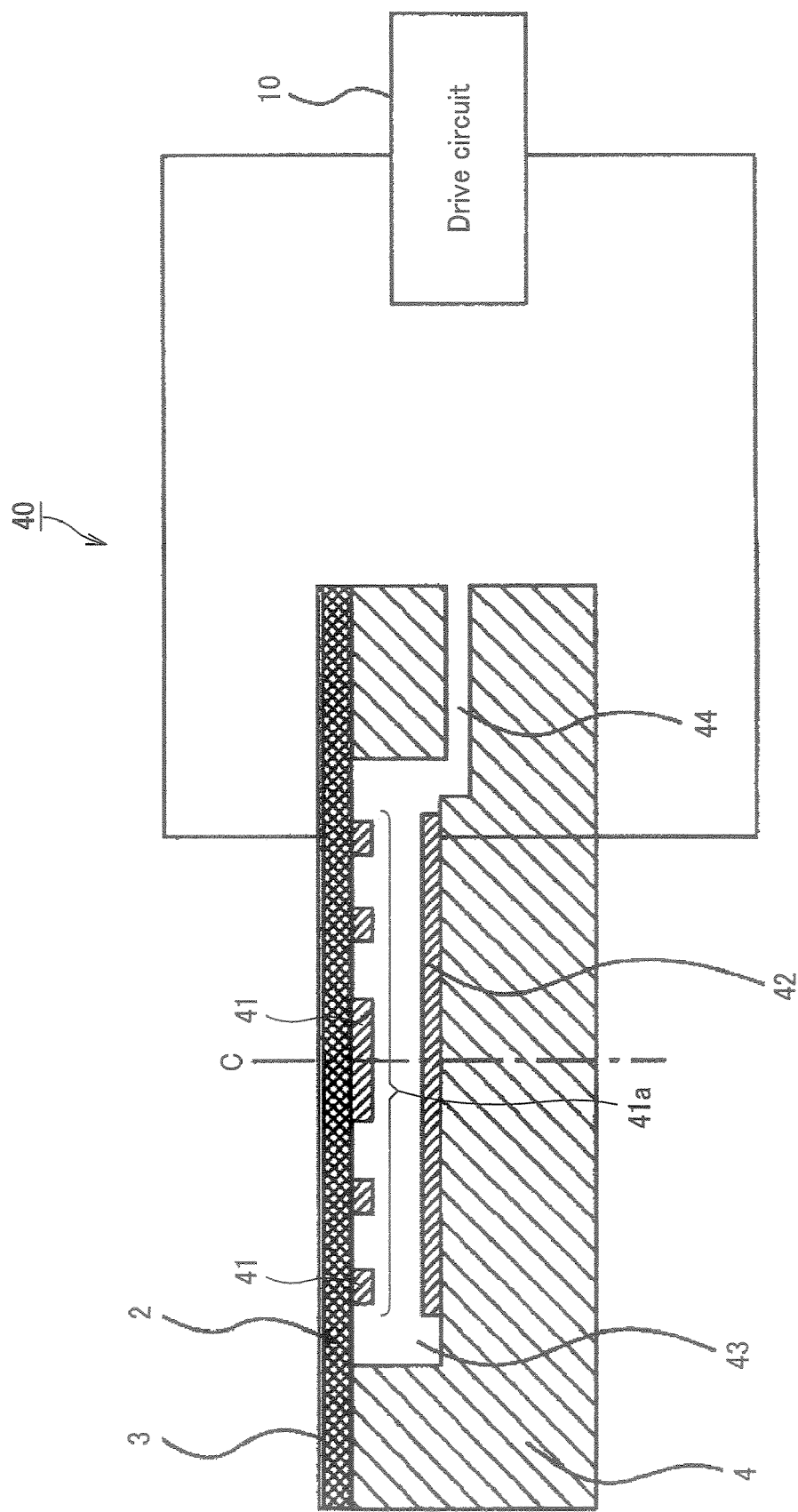
FIG. 8 is a schematic cross sectional view of the fourth embodiment of deformable mirror device according to the present invention.

Like the strength distribution pattern 2a illustrated in FIG. 2, as shown in FIG. 8, the electrode pattern 41a is prepared by concentrically forming a plurality of upper electrodes 41 on the surface of the flexible member 2 opposite to the surface thereof facing the space 43.

A circular lower electrode 42 is formed on the substrate 4 at the surface located vis-à-vis the plurality of upper electrodes 41 that form the electrode pattern 41a.

A drive circuit 10 is connected between each of the plurality of upper electrodes 41 and the lower electrode 42. In this case again, a flow channel 44 is formed on the substrate 4 so as to operate as airway for keeping the space 43 and the outside in communication with each other.

With the above-described deformable mirror device 40, the mirror surface is deformed by applying a voltage to each of the upper electrodes 41 and the lower electrode 42 from the drive circuit 10. As a voltage is applied to each of the upper electrodes 41 and the lower electrode 425 electrostatic force is generated between the upper electrodes 41 and the lower electrode 42 that is made to operate as attractive force. Since the electrode pattern 41a is formed by the plurality of concentrically arranged upper electrodes 41, attractive force acts only on the part of the flexible member 2 where the upper electrodes 41 are formed as a function of the drive voltage so that only the part where the upper electrodes 41 are arranged is strongly deformed. In other words, the part of the flexible member 2 where the upper electrodes 41 are formed show a mode of deformation different from that of the remaining part. Thus, when a voltage is applied between the upper and lower electrodes 41 and 42, the part of the flexible member 2 where the upper electrodes 41 are arranged is deformed with a radius of curvature different from the remaining part.

As the mode of deformation of this embodiment partly differentiated, the flexible member 2 can be made to show a desired deformed profile according to the uniform drive voltage applied between each of the upper electrodes 41 and the lower electrode 42 due to the pattern of arrangement of the upper electrodes 41, or the electrode pattern 41a.

In other words, it is possible to make the mirror surface show a deformed profile necessary for compensating the spherical aberration according to the applied predetermined uniform drive force. Thus, only a single actuator is required to drive the flexible member 2.

Additionally, it is possible to control the attractive force (drive force) stepwise relative to the flexible member 2 by changing the level of the voltage applied by the drive circuit 10. Then, it is possible to effectively compensate the spherical aberration for any of the recording layers of the optical disc where three or more than three recording layers are formed by designing the electrode pattern 41a so as to produce one of the predetermined deformed profiles according to the level of the level of the drive force that is changed stepwise.

Figure 9:
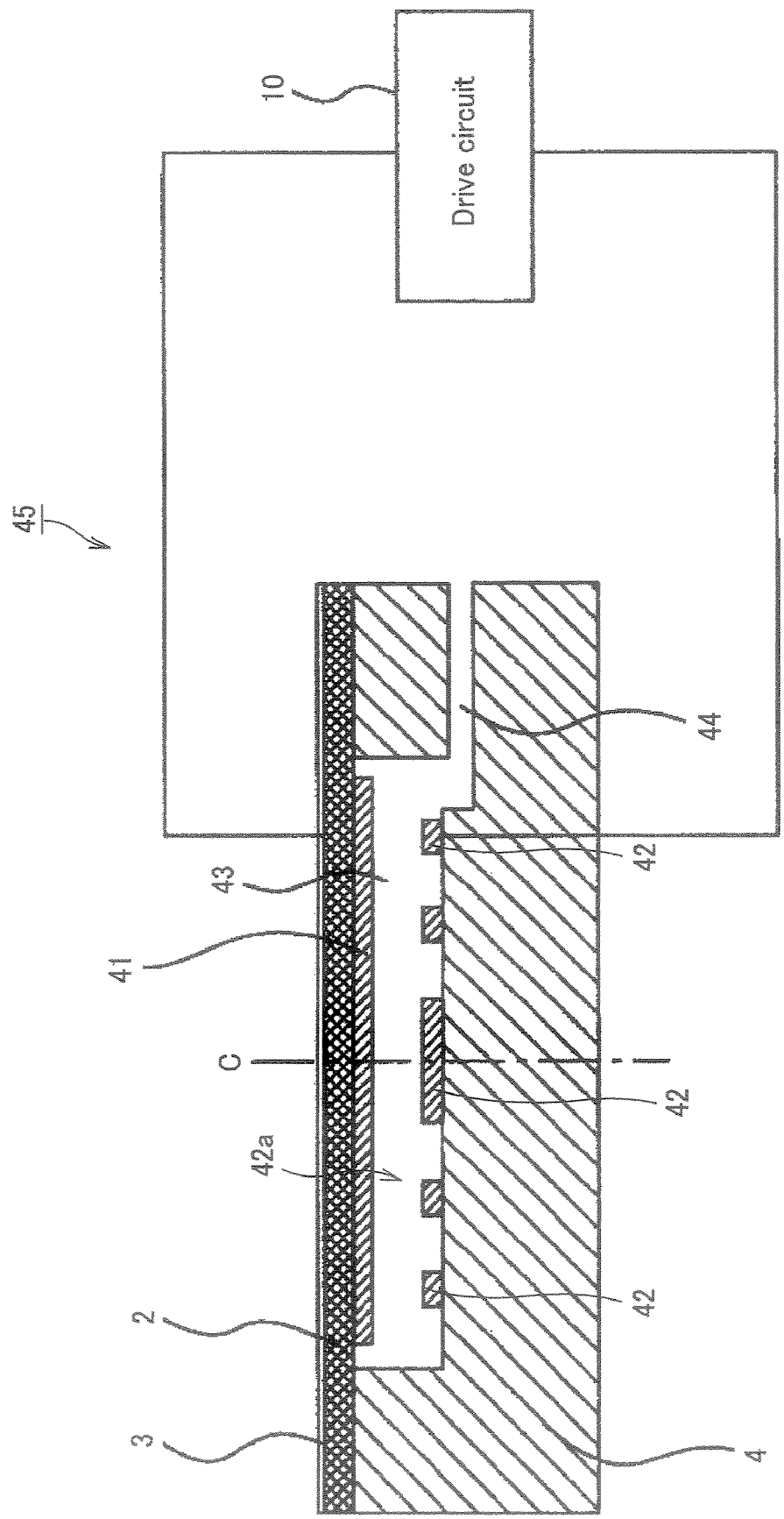
FIG. 9 is a schematic cross sectional view of a deformable mirror device according to the present invention obtained by modifying the fourth embodiment.

Alternatively, an electrode pattern 42a may be arranged at the side of the lower electrode 42 as shown in FIG. 9. In other words the deformable mirror device 45 of FIG. 9 is formed by switching the upper electrodes 41 and the lower electrode 42 of the deformable mirror device 40 of FIG. 8 to for an electrode pattern 42a at the side of the lower electrode 42.

With the deformable mirror device 45 of FIG. 9, attractive force is generated between the upper electrode 41 and the lower electrodes 42 only at the part where the lower electrodes 42 are arranged. In other words the mode of deformation of the flexible member 2 is partly differentiated and the flexible member 2 can be made to show a desired deformed profile due to the electrode pattern 42a formed in the deformable mirror device 45.

As pointed out above, with the deformable mirror device 40 where an electrode pattern 42a is formed by lower electrodes 42, it is possible to produce a desired mode of generation of attractive force by applying a uniform drive voltage between the upper electrode 41 and each of the lower electrodes 42 as in the case of the deformable mirror device 40 illustrated in FIG. 8. Therefore, it is possible to produce a desired deformed profile according to the uniform drive force applied in a predetermined manner.

The mode of deformation is partly differentiated only by producing an electrode pattern in each of the above-described deformable mirror devices 40, 45, it is also possible to arrange in such a way that a strength distribution pattern 2a is formed on the flexible member 2 and a voltage is applied between the upper electrodes 41 and the lower electrode 42, or between the lower electrode 41 and the lower electrodes 42 to generate electrostatic force for the purpose of applying drive force.

Fifth Embodiment

Figure 10:
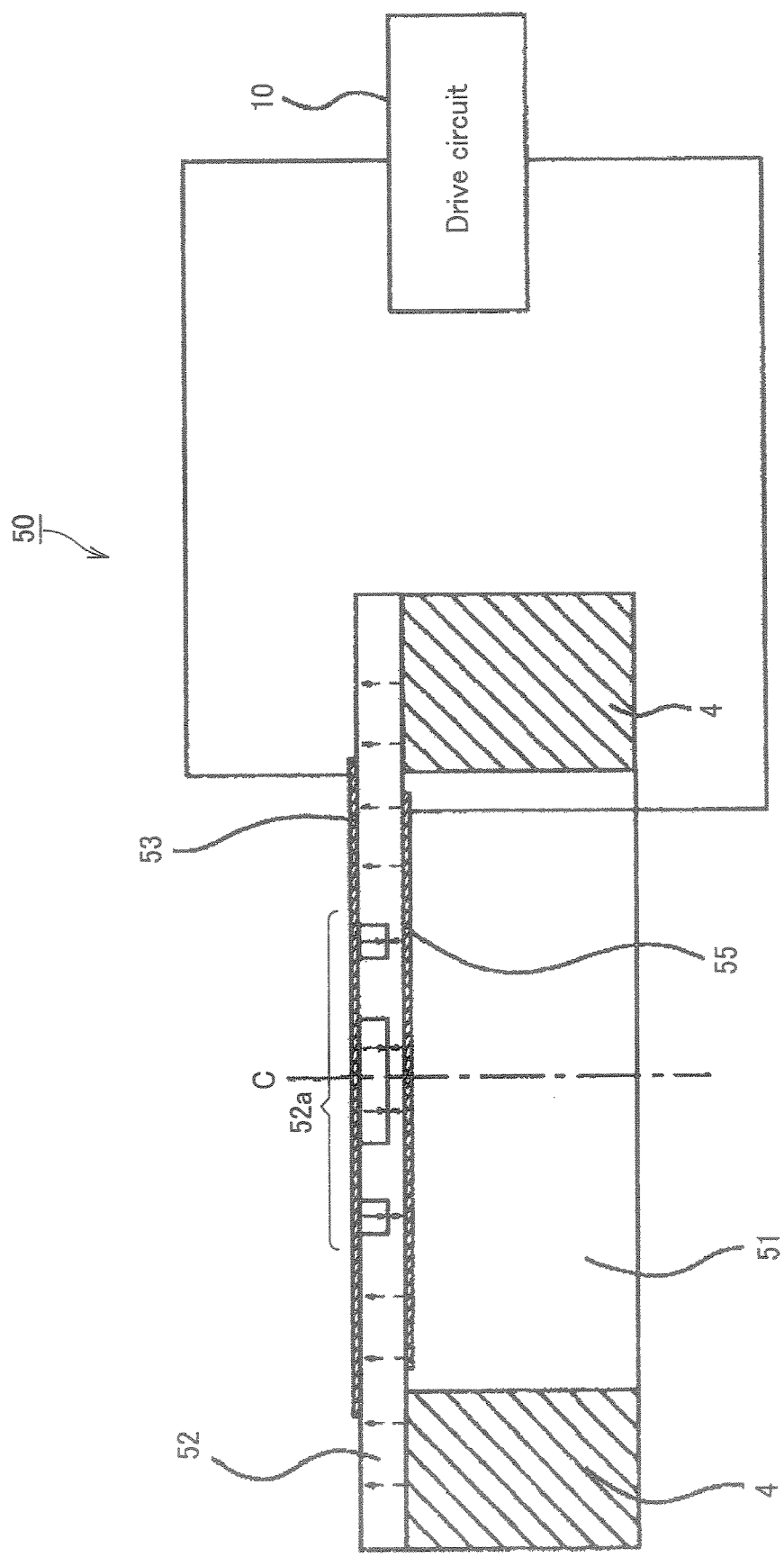
FIG. 10 is a schematic cross sectional view of the fifth embodiment of deformable mirror device according to the present invention.

Now, the fifth embodiment of the present invention will be described below by referring to FIG. 10. In the deformable mirror device 50 of the fifth embodiment, a piezoelectric element 52 is employed in place of the flexible member 2 where a mirror surface is formed as shown in FIG. 2 and a polarization inversion pattern 52a is formed in the piezoelectric element 52 to produce a desired deformed profile according to application of uniform drive force.

The piezoelectric element 52 is bonded to the substrate 4 where a circular space 51 is formed so as to cover the space 51. An electrode 53 that operates also as mirror surface is formed on the surface of the piezoelectric element 52 opposite to the surface that is bonded to the substrate 4. The electrode 53 that operates also as mirror surface can be formed by forming a film of a material that can be used for both a mirror surface and an electrode such as aluminum on the piezoelectric element 52 typically by sputtering.

A lower electrode 54 is formed on the surface of the piezoelectric element 52 that faces the space 51 by forming a film of an electrode material such as aluminum by sputtering.

The electrode 53 that also operates as mirror surface and the lower electrode 54 are connected to a drive circuit 10 and a drive voltage is applied to the piezoelectric element 52 by way of the electrodes 53, 54.

The polarization inversion pattern 52a formed in the piezoelectric element 52 is a concentric pattern typically centered at the central axis C of the circular space 51 as in the case of the strength distribution pattern 2a described earlier by referring to FIG. 2.

The process of preparing the polarization inversion pattern 52a that is formed in the piezoelectric element 52 will be described below by referring to FIGS. 11A through 11E.

Figure 11A:
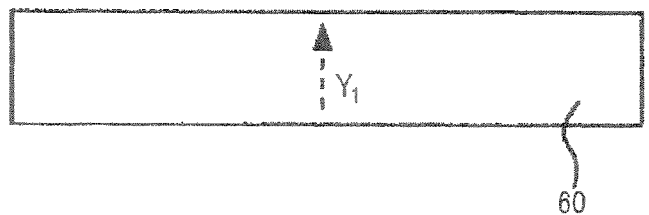
FIGS. 11A through 11E are schematic cross sectional views of a deformable mirror device according to the present invention illustrating the process of forming a polarization inversion pattern.

Firstly, as shown in FIG. 11A, a piezoelectric single crystal material 161 to be used for the piezoelectric element 52 is brought in. The piezoelectric single crystal material 161 may typically be $LiNbO_3$ (lithium niobate) or $LiTaO_3$ (lithium tantalate).

Note that the arrow $Y_1$ of a broken line in FIG. 11A indicates the direction of spontaneous polarization of the piezoelectric single crystal material 161.

Figure 11B:
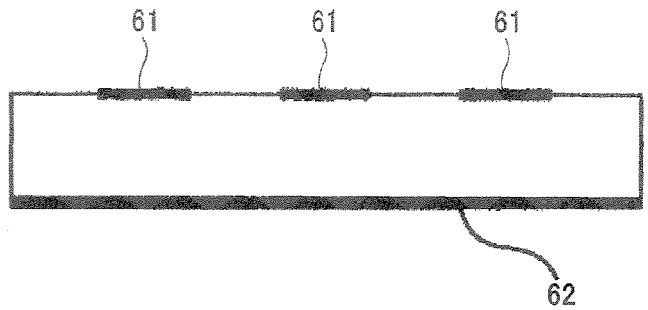

Then, as shown in FIG. 11B, the piezoelectric single crystal material 161 is subjected to a patterning process for producing an electrode. More specifically, an electrode 63 is formed on the entire area of one of the oppositely disposed surfaces of the piezoelectric single crystal material 161 while electrodes 62 are formed on the other surface in areas that correspond to parts for polarization inversion.

Figure 11C:
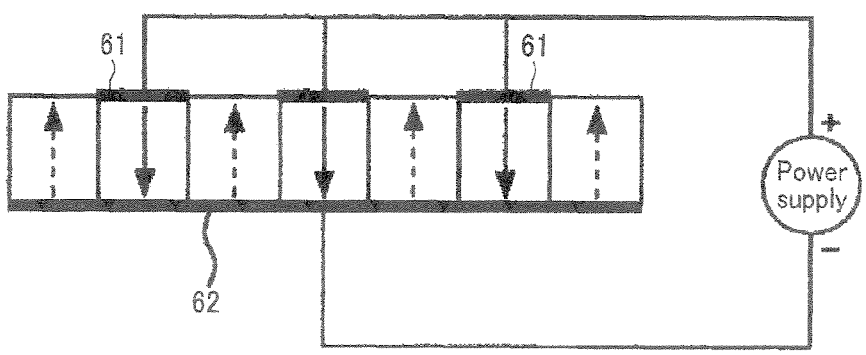

Thereafter, as shown in FIG. 11C, a voltage is applied in the inverted direction relative to the direction of spontaneous polarization of the piezoelectric single crystal material 161 by applying a voltage of positive polarity to the electode 62 and a voltage of negative polarity to the electrodes 63.

Figure 11D:
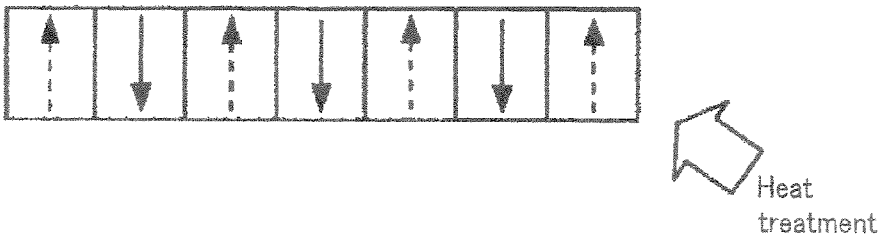
Figure 11E:
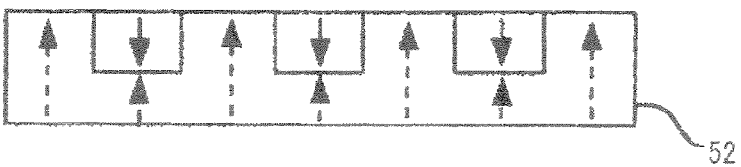

After the polarization inversion process, the piezoelectric single crystal material 161 is subjected to a heat treatment process for a predetermined time period as shown in FIG. 11D. For example, the heat treatment is conducted at 900° C. for 10 hours. As a result of the heat treatment, the direction of polarization of the parts of polarization inversion produced by the polarization inversion process is partly inverted as shown in FIG. 11E. In other words, the direction of polarization of those parts are partly returned to the direction of spontaneous polarization to consequently produce a polarization inversion pattern 52a where the direction of polarization in those parts is differentiated from the remaining parts by about a half in the direction of the height of the device.

Thus, in the piezoelectric element 52 where such a polarization inversion pattern 52a is formed, the direction of polarization is partly differentiated so that the piezoelectric element 52 includes parts where the direction of expansion and contraction is inverted from the remaining parts. In other words the mode of deformation is partly differentiated in the piezoelectric element 52. On the mirror surface, the radius of curvature of deformation is partly differentiated when a drive voltage is applied to the piezoelectric element 52.

Thus, with such a polarization inversion pattern 52a where the direction of expansion and contraction is partly differentiated, it is possible to produce a desired deformed profile according to application of predetermined uniform drive force, or the drive voltage applied to the piezoelectric element 52. In this case again it is possible to make the mirror surface show a deformed profile necessary for compensating the spherical aberration according to the applied predetermined uniform drive force. Thus, only a single actuator is required to drive the flexible member 2.

Additionally, it is possible to control the drive force stepwise relative to the flexible member 2 by changing the level of the voltage applied by the drive circuit 10. Then, it is possible to effectively compensate the spherical aberration for any of the recording layers of the optical disc where three or more than three recording layers are formed by designing the polarization inversion pattern 41a so as to produce one of the predetermined deformed profiles according to the level of the drive force that is changed stepwise.

The electrode patterns 41a, 42a and the polarization inversion pattern 52a for producing predetermined deformed profiles for the mirror surface of the deformable mirror devices 40, 50 of the fourth and fifth embodiments as described above so as to make them possible to compensate the spherical aberration can be defined according to the results of simulation typically using an FEM simulation tool.

Sixth Embodiment

Each of the above-described deformable mirror devices of the first through fifth embodiments is so designed that a laser beam that is reflected by a polarization beam splitter 72 is made to enter the device and then reflected by 180° so as to irradiate an optical disc 80. With the use of such an optical system, a laser beam can be irradiated onto the optical disc 80 only by linear polarization.

Generally, when designing an optical system, it is desirable to irradiate a laser beam onto an optical disc 80 in a circularly polarized state from the viewpoint of reducing the influence of dispersions of various characteristics from optical disc 80 to optical disc 80 on the optical system.

Additionally, it is desirable to make the laser beam returning from the optical disc 80 linearly polarized for the detector 77 from the viewpoint of the efficiency of utilization of the laser beam from the time when it is irradiated horn the semiconductor laser LD to the time when it is detected by the detector 77.

On the basis of these viewpoints, the polarization of the laser beam in the optical system described earlier by referring to FIG. 1 will be reviewed below.

FIGS. 12A and 12B schematically illustrate an optical system same as that of FIG. 1 mainly from the viewpoint of polarization of a laser beam. Note that, in FIGS. 12A and 12B, the part surrounded by broken lines in FIG. 1 is omitted.

FIG. 12A shows the "forward route" of the laser beam. Referring to FIG. 12A, the laser beam is S-polarized before it enters the polarization beam splitter 72 as described earlier by referring to FIG. 1. As the polarization beam splitter 72 reflects the S-polarized laser beam, the laser beam is transmitted through the ¼ wave plate 73. As the laser beam is transmitted through the ¼ wave plate 73, it is converted into a circularly polarized laser beam and reflected by the deformable mirror device by 180°.

The reflected and circularly polarized laser beam is then transformed into a P-polarized laser beam at it is transmitted through the ¼ wave plate 73 once again. The laser beam that is transformed into a P-polarized laser beam is transmitted through the polarization beam splitter 72 then converged by means of the objective lens 71 and focused on a predetermined recording layer of the optical disc 80.

On the "backward route" of the laser bean as shown in FIG. 12B the P-polarized returning laser beam that is reflected by the optical disc 80 is transmitted through the objective lens 71 and the polarization beam splitter 72 and transformed again into a circularly polarized laser beam as it is transmitted through the ¼ wave plate 73. Then, the laser beam that is transformed into a circularly polarized laser beam is then reflected by the deformable mirror device by 180° and transmitted once again through the ¼ wave plate 73 so as to be finally transformed into an S-polarized laser beam. Since the polarization beam splitter 72 reflects a S-polarized beam, the reflected laser beam is made to enter the collimator lens CL shown in FIG. 1 and then transmitted through the beam splitter BS so as to be led to the detector 77.

Therefore, in the instance illustrated in FIG. 12, the returning laser beam that is reflected by the optical disc 80 can be brought back into an S-polarized laser beam for the detector 77. However, not a circularly polarized laser beam but a P-polarized component that is a linearly polarized laser beam needs to be irradiated onto the optical disc 80.

Figures 13A, 13B:
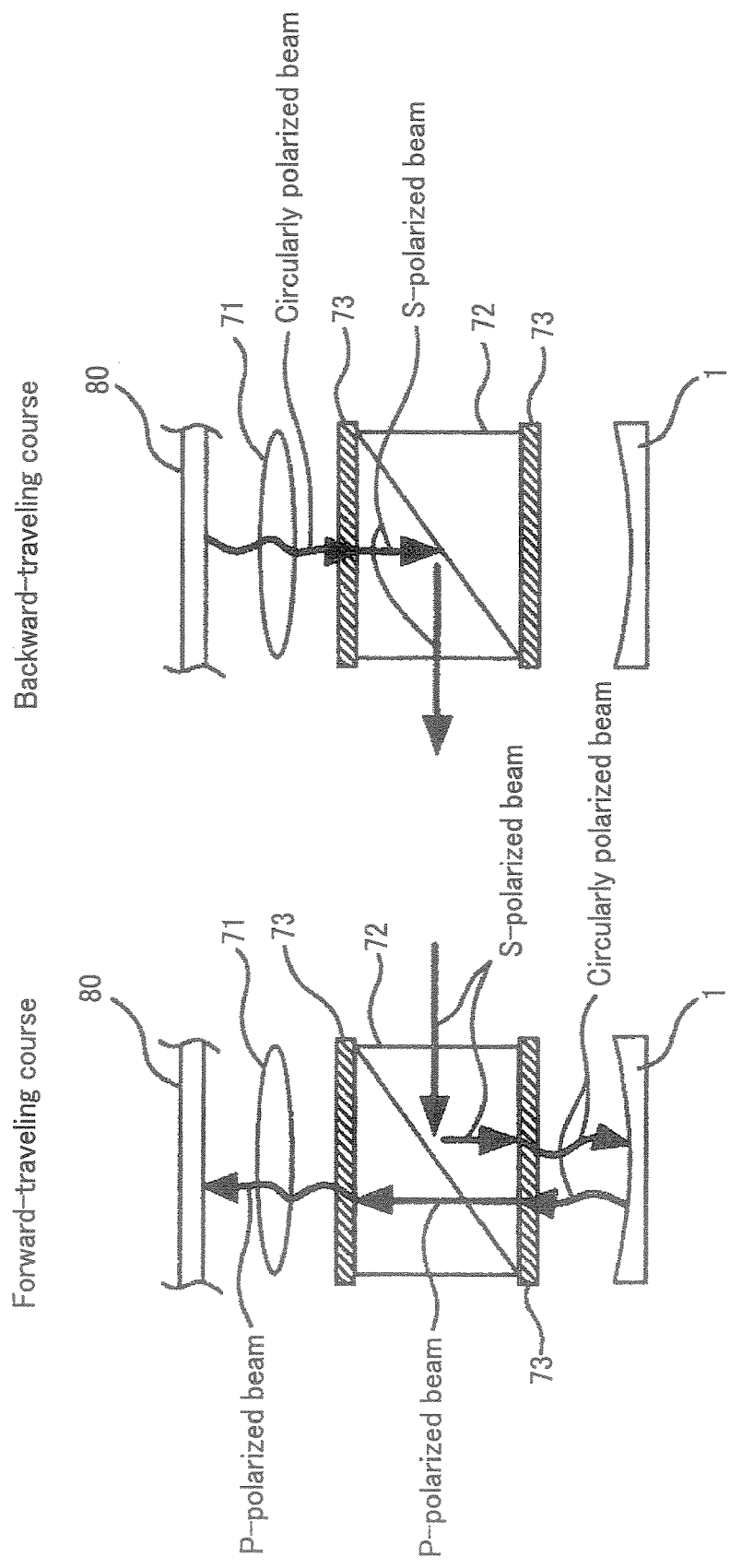
FIGS. 13A and 13B are schematic lateral views of the optical system of FIG. 1 to which another ¼ wave plate is added, illustrating polarization of a laser beam.

To irradiate a circularly polarized laser beam onto the optical disc 80, another ¼ wave plate 73 may have to be added to the optical system of FIG. 1 as illustrated in FIGS. 13A and 13B.

With this arrangement, while a P-polarized laser beam is irradiated onto the optical disc 80 without being transformed in FIG. 12A, the P-polarized laser beam is transformed into a circularly polarized laser beam by the newly added ¼ wave plate 73 on the "forward route" illustrated in FIG. 13A. Thus, a circularly polarized laser beam is irradiated onto the optical disc 80.

Then, on the "backward route" shown in FIG. 13B, the circularly polarized laser beam returning from the optical disc 80 is transformed into an S-polarized laser beam by the newly added ¼ wave plate 73. Then, the S-polarized returning laser beam is reflected by the polarization beam splitter 72 and led to somewhere out of the optical path so that it is no longer possible to detect the returning laser beam.

Thus, with the optical system of FIG. 1 designed to reflect a laser beam by the deformable mirror device by 180°, not a circularly polarized laser beam but a linearly polarized laser beam is irradiated onto the optical disc 80 when a linearly polarized laser beam is to be returned to the detector 77 by taking the efficiency of utilization of light into consideration. If on the other hand, a circularly polarized laser beam is to be irradiated onto the optical disc 80, it is not possible to properly lead the returning laser beam to the detector 77.

In other words, with the arrangement of optical system of FIG. 1, a linearly polarized (P-polarized) laser beam has to be irradiated onto the optical disc 80 for the purpose of properly leading the laser beam to the detector 77 and hence a returning linearly polarized (S-polarized) laser beam has to be led to the detector 77.

In view of the expected higher recording density in the future of optical discs, it is desirable to raise the efficiency of utilization of light. Then, it is advantageous to obtain a linearly polarized returning laser beam from the optical disc 80 as pointed out above from the viewpoint of the expected higher recording density.

Accordingly, it is also desirable to minimize dispersions of various characteristics of optical discs 80 from the viewpoint of influence on the optical system. Thus, it is desirable to irradiate a circularly polarized laser beam onto the optical disc 80.

Figure 14:
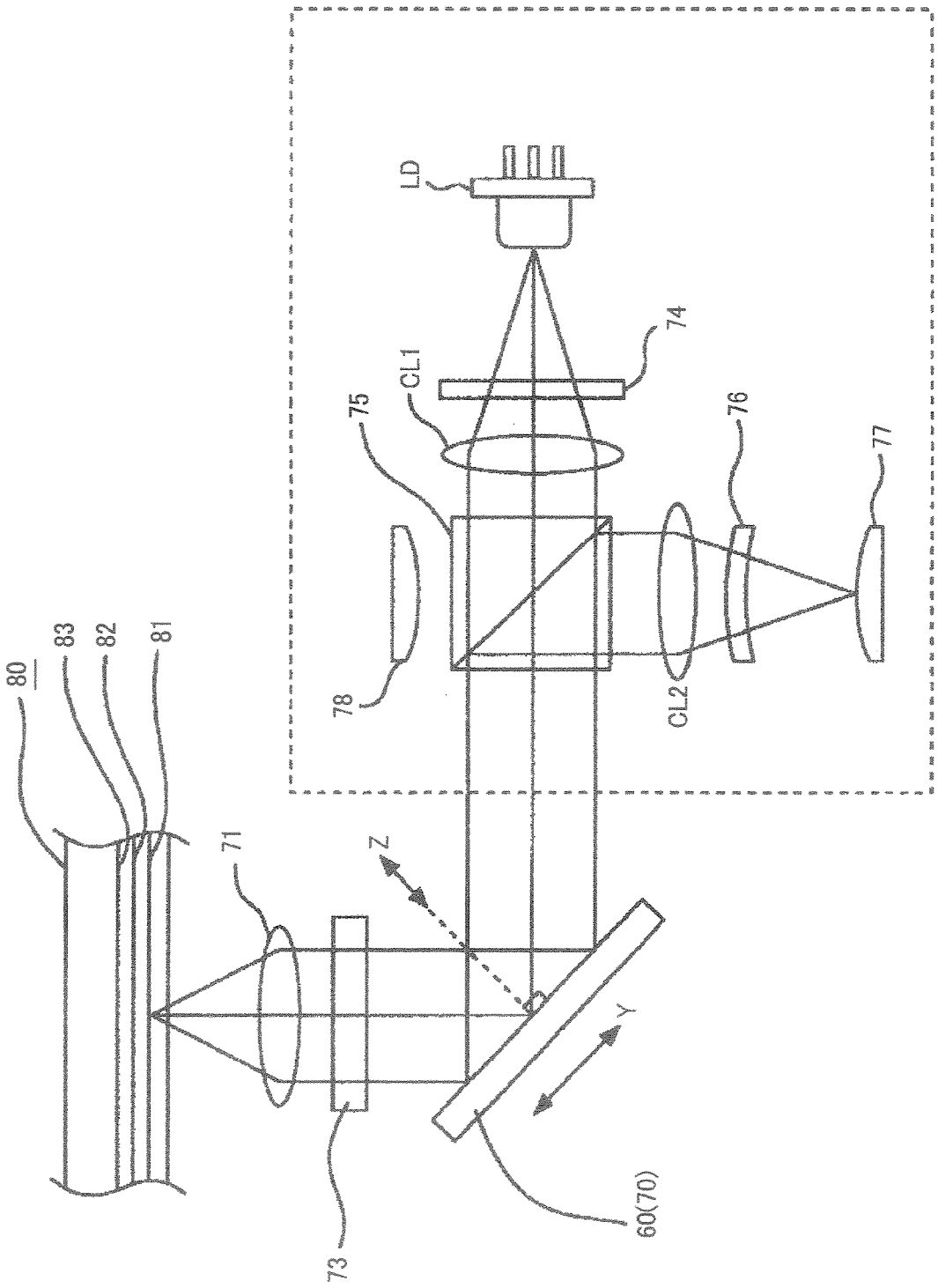
FIG. 14 is a schematic lateral view of the optical system that can be used for both the sixth and seventh embodiments of deformable mirror device according to the present invention.

The arrangement of optical system of FIG. 14 may be used to satisfy the requirement of the laser beam to be irradiated onto the optical disc 80 and that of the returning laser beam to be detected by the detector 77.

Note that the components in FIG. 14 that are same as or similar to those of FIG. 1 are denoted respectively by the same reference symbols and will not be described any further.

Referring to the optical system of FIG. 14, the laser beam emitted from the semiconductor laser LD is transmitted through the grating 74 and the collimator lens CL1 before it enters the polarization beam splitter 75. The laser beam that enters the polarization beam splitter 75 is partly reflected to the front monitor 78.

The part of the laser beam that is transmitted through the polarization beam splitter 75 then enters the deformable mirror device 60 (70) that is a so-called raising mirror (45° mirror) whose reflection plane is inclined by 45° as shown in FIG. 14. Thus, the laser beam is reflected by the raising mirror by 90° and irradiated onto the optical disc 80 by way of the ¼ wave plate 73 and the objective lens 71.

In the arrangement of FIG. 14, the polarization beam splitter 72 that is required in the arrangement of FIG. 1 to lead the laser beam to the deformable mirror device is omitted.

With such an arrangement of optical system, the laser beam emitted from the semiconductor laser LD is reflected by the 45° mirror to enter the ¼ wave plate 73 because it is a linearly polarized (P-polarized) laser beam. Then, the linearly polarized laser beam transmitted through the ¼ wave plate 73 is transformed into a circularly polarized laser beam and transmitted through the objective lens 71 before it is irradiated onto the optical disc 80.

Additionally, the laser beam reflected by the optical disc 80 is transmitted through the objective lens 71 and then the ¼ wave plate 73 once again so as to be transformed from a circularly polarized laser beam into a linearly polarized (S-polarized) laser beam and reflected by the 45° mirror so as to be led to the polarization beam splitter 75. The returning laser beam is reflected by the polarization beam splitter 75 and led toward the detector 77.

In this way, with the optical system of FIG. 14, a circularly polarized laser beam is irradiated onto the optical disc 80 and the laser beam returning from the optical disc 80 is transformed into a linearly polarized laser beam for the detector 77.

Figure 15:
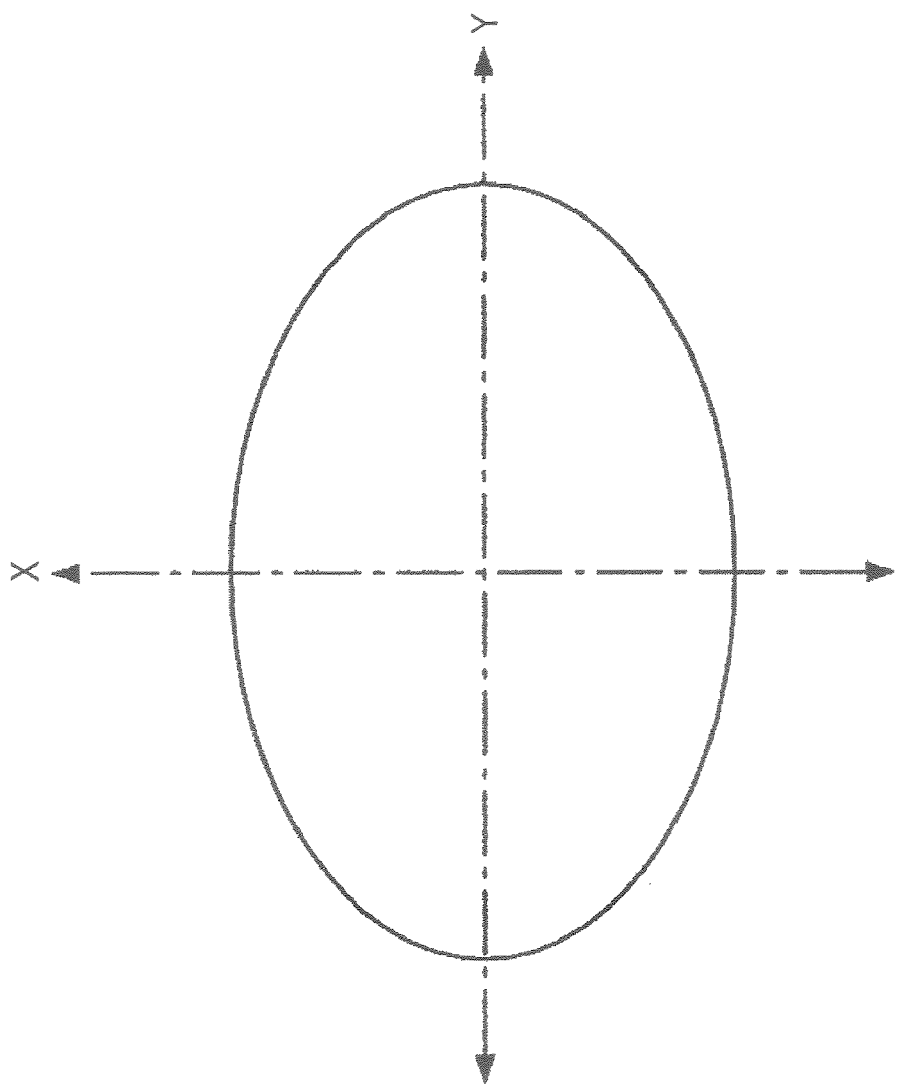
FIG. 15 is a schematic plan view of a laser beam on a reflection surface (irradiated surface) that can be used for both the sixth and seventh embodiments of deformable mirror device according to the present invention.

However, it should be noted that in the arrangement of the optical system shown in FIG. 14, the laser beam irradiation plane (reflection plane) of the mirror surface of the deformable mirror device that is provided as 45° mirror shows an elliptic profile as shown in FIG. 15. More specifically, when the reflection plane is viewed in the direction of the Z-axis in FIG. 14 and if the axis perpendicular to both the Z-axis and the Y-axis in FIG. 14 is X-axis, the ratio of the minor axis running in the direction of the X-axis to the major axis running in the direction of the Y-axis of the ellipse in FIG. 15, or X:Y, is about X:Y=1:2.

Since the angle of incidence of the laser beam of the optical system having a configuration as illustrated in FIG. 1 relative to the mirror surface is made to be equal to 90°, the laser beam shows a circular profile on the reflection plane. In the preceding embodiments, the pattern of the part whose state is differentiated is drawn as that of concentric circles to reflect the above-described situation.

To the contrary, since the laser beam on the reflection plane of the deformable mirror device having an optical system as illustrated in FIG. 14 shows an elliptic profile as described above, a pattern of concentric circles of any of the preceding embodiments cannot effectively correct spherical aberration in this embodiment.

Thus, in the sixth embodiment of the present invention, the pattern of the part whose state is differentiated is drawn as that of ellipses having a common center from the viewpoint of using the deformable mirror device as a rising mirror of the above-described type.

Now, the deformable mirror device 60 of the sixth embodiment will be described more specifically by referring to FIGS. 16, 17A and 17B.

Figure 16:
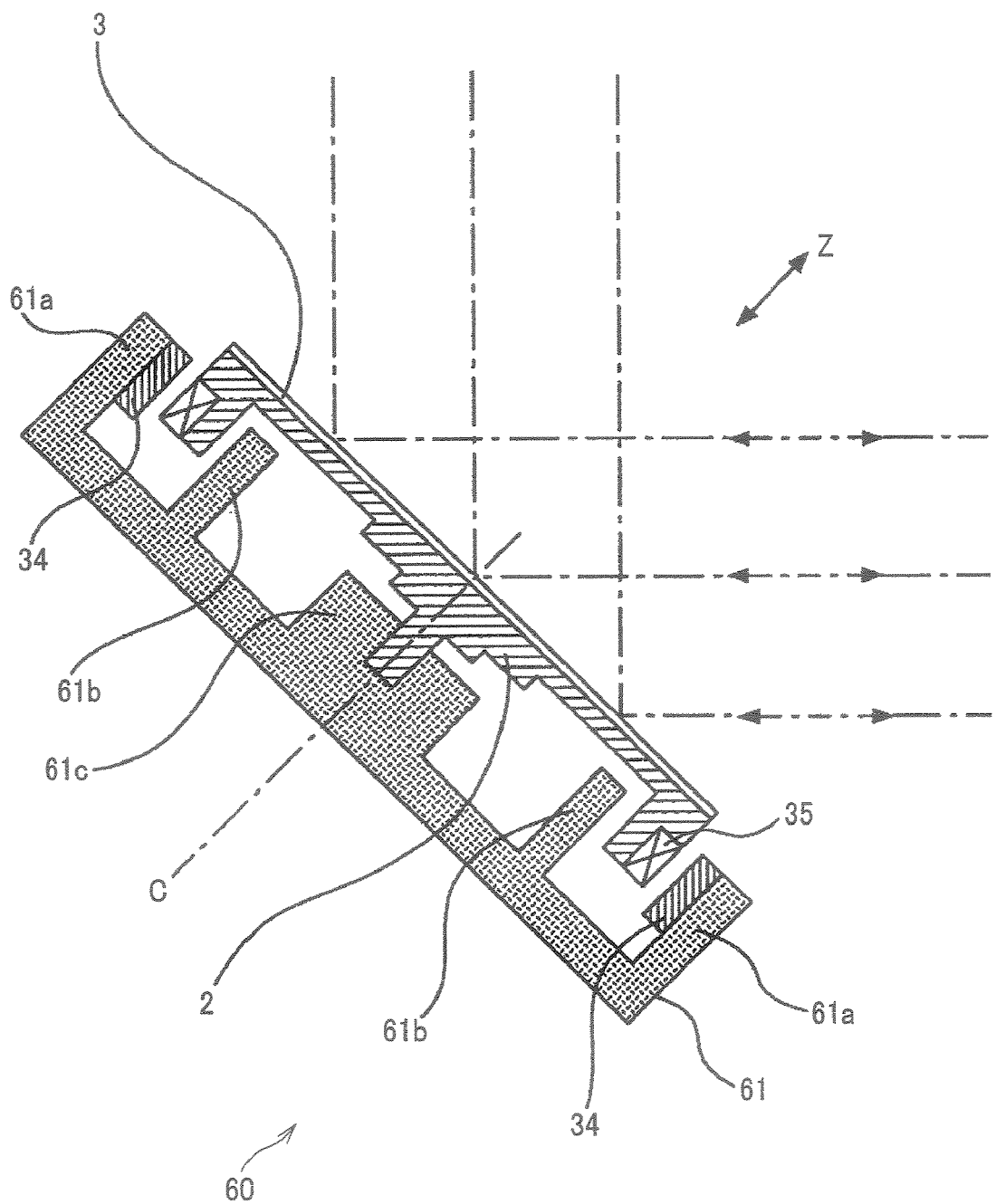
FIG. 16 is a schematic cross sectional view of the sixth embodiment of deformable mirror device according to the present invention.
Figure 17A:
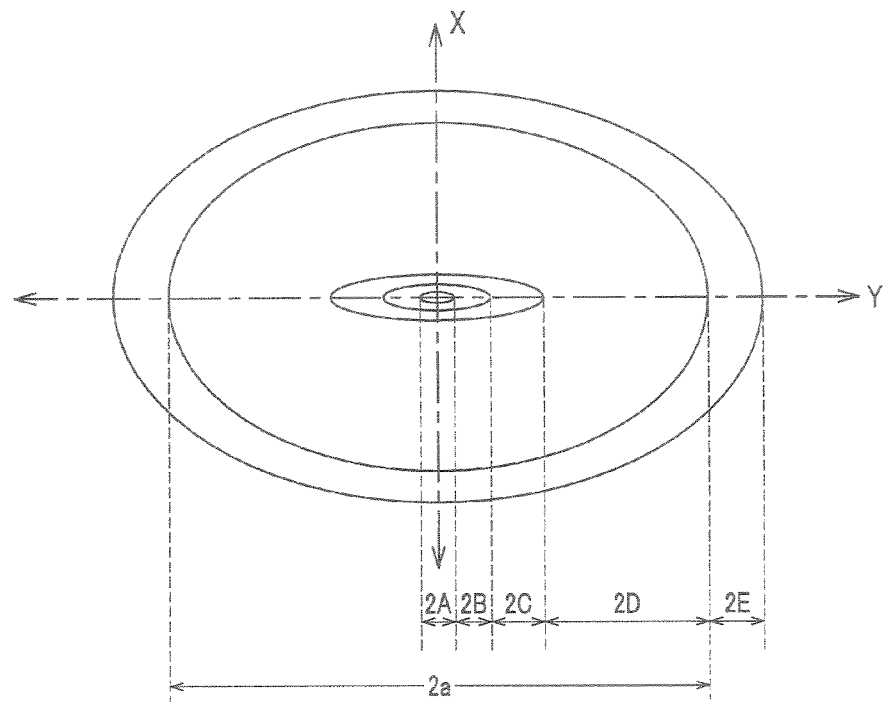
FIGS. 17A and 17B are schematic cross sectional views of a flexible member that can be used for both the sixth and seventh embodiments of deformable mirror device according to the present invention.
Figure 17B:
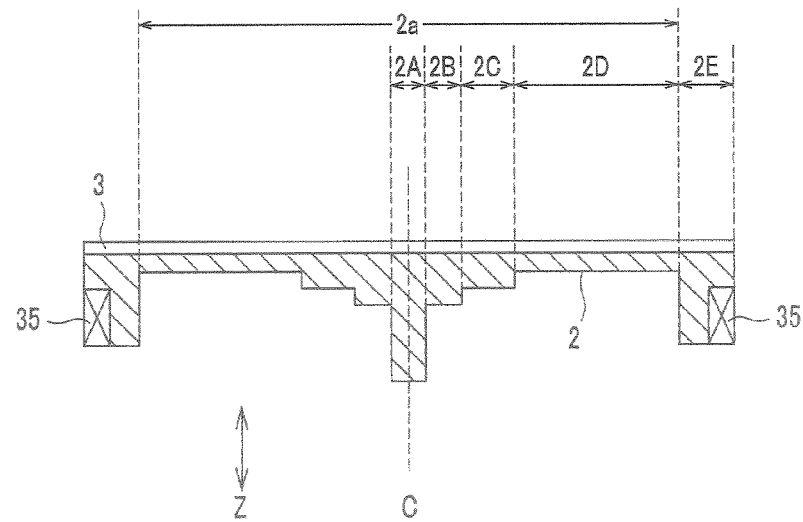

Of FIGS. 16 and 17, FIG. 16 is a cross sectional view of the deformable mirror device 60, illustrating the configuration thereof, whereas FIG. 17A is a schematic illustration of the flexible member 2 of the deformable mirror device 60, showing the structure thereof as viewed in the direction of the Z-axis in FIG. 14, and the FIG. 17B is a schematic cross sectional view of the flexible member 2 of the deformable mirror device 60, also showing the structure thereof.

Firstly, a reflection film 3 that operates as mirror surface is formed typically by sputtering on the flexible member 2 of the deformable mirror device 60 of the sixth embodiment as seen from FIGS. 17A and 17B.

A plurality of elliptic sections 2A, 2B, 2C, 2D having a common center C are formed at the side opposite to the mirror surface of the flexible member 2. Of the plurality of elliptic sections 2A through 2D, the elliptic section 2A surrounding the center C has the largest thickness as viewed in the direction of the Z-axis and the remaining elliptic sections 2B through 2D are formed with respective thicknesses that decrease toward the outer peripheral side as viewed in the direction of the Z-axis, the thickness of the elliptic section 2B being smaller than that of the elliptic section 2A, the thickness of the elliptic section 2C being smaller than that of the elliptic section 2B, the thickness of the elliptic section 2D being smaller than that of the elliptic section 2C. In other words, as seen from FIG. 17B, the flexible member 2 shows a stepped cross section with a thickness decreasing from the center C toward the outer periphery thereof.

A rib-shaped frame 2E is formed in a region located at the outer peripheral side relative to the region where the elliptic section 2D is formed in order to provide a sufficient degree of strength and prevent it from being deformed when the flexible member 2 is subjected to drive force in the direction of the Z-axis.

Then, a drive coil 35 like the one described for the third embodiment is wound around the outer peripheral surface of the frame 2E.

The range from the elliptic section 2A to the elliptic section 2D is a range that is deformable as deformable mirror. In other words, a desired deformed profile is obtained for the mirror surface by the pattern of the elliptic sections 2A through 2D having different respective thicknesses when drive force is applied to the flexible member 2 in the direction of the Z-axis. Thus, the elliptic sections 2A through 2D of the flexible member 2 form a strength distribution pattern 2a as illustrated in FIGS. 17 and 17A.

As described above, the frame 2E is formed in the region located at the outer peripheral side of the region of the deformable elliptic sections 2A through 2D to show strength of a sufficient level that makes it undeformable when drive force is applied to the flexible member 2. In other words, as the frame 2E, or the outer peripheral part of the flexible member 2, has strength of such a level that makes it undeformable when drive force is applied to the flexible member 2, it is easy to make the deformable sections including the elliptic sections 2A through 2D show an ideal deformed profile. When compared with an arrangement where the outer peripheral section of the flexible member 2 is easily deformable, it is possible to accurately bring the deformed profile of the minor surface closer to an ideal profile.

Additionally, the flexible member 2 where the reflection film 3 is formed as shown in FIG. 17B of the deformable mirror device 60 of the sixth embodiment is put into a base 61 having a configuration as shown in FIG. 16 to mutual engagement.

The base 61 includes an outer peripheral wall 61a that is the outermost part an inner peripheral wall 61b arranged at the inner side of the outer peripheral wall 61a and a central projecting section 61c including the center C arranged at the inner side of the inner peripheral wail 61b. A recess that includes the center C is formed at a central part of the central projecting section 61c to receive the elliptic section 2A formed at the center of the flexible member 2 for mutual engagement. As the elliptic section 2A is put into the recess for mutual engagement, the flexible member 2 is supported by the base 61.

A ring-shaped magnet 34 is rigidly bonded to the inner peripheral surface of the outer peripheral wall 61a. The frame 2E, around which the drive coil 35 of the flexible member 2 is wound, is pinched between the magnet 34 rigidly bonded to the inner peripheral surface of the outer peripheral wall 61a and the inner peripheral wall 61b when the flexible member 2 is put into the recess of the central projecting section 61c.

As the base 61 is made of a material showing a high magnetic transmission factor, a magnetic circuit is formed by the base 61 and the magnet 34.

A drive current is supplied from the drive circuit 10 to the drive coil 35 in the deformable mirror device 60 having the above-described configuration. As the drive current is supplied to the drive coil 35, drive force is generated in the direction of the Z-axis as a function of the polarity of the electric current supplied to the drive coil 35 in the frame 2E, around which the drive coil 35 is wound. In other words, drive force is uniformly applied to the frame 2E that is the outer peripheral part of the flexible member 2.

As drive force is generated in the direction of the Z-axis in the frame 2E, the flexible member 2 is deformed to project at the side of the mirror surface and recess at the side opposite to the mirror surface with the central part thereof supported by the base 61 forming the highest part of the projection.

At this time, the strength distribution pattern 2a is formed by the elliptic sections 2A through 2D in the flexible member 2. Thus, it is possible to obtain a desired deformed profile according to the uniform drive force applied to the flexible member 2 by mean of the pattern formed by the elliptic sections.

It is also possible to change the pressure being applied to the flexible member 2 stepwise by changing the level of the drive current being supplied to the drive coil 35. Then, it is possible to effectively compensate the spherical aberration for any of the recording layers of the optical disc where three or more than three recording layers are formed by designing the strength distribution pattern 2a so as to produce one of the predetermined deformed profiles according to the level of the drive force that is changed stepwise.

Additionally, drive force is applied to the flexible member 2 by utilizing the principle of voice coil motor in this sixth embodiment. Therefore, as in the case of the above-described third embodiment, this embodiment provides an advantage of providing a quick responsiveness in terms of deformation of the mirror surface particularly when the spherical aberration is compensated for a recording layer of an optical disc by following the change in the thickness of the cover layer of the optical disc.

Since the strength distribution pattern 2a is formed by using a pattern of ellipses having a common center C, it is possible to appropriately compensate the spherical aberration according to the profile of the laser beam, irradiating surface of the 45° mirror. In other words, it is possible to realize a deformable mirror device that can compensate spherical aberration as a 45° mirror.

Then, since it is possible realize a deformable mirror device that can compensate spherical aberration as a 45° mirror, an optical system as illustrated in FIG. 14 can be realized. Then, it is possible to irradiate a circularly polarized laser beam onto the optical disc 80 and obtain a linearly polarized returning laser beam for the detector 77. In other words, the influence of dispersions of optical discs 80 on the optical system can be reduced to improve the efficiency of utilization of a laser beam.

The arrangement of optical system for compensating spherical aberration by means of a deformable mirror device of this embodiment is advantageous from the viewpoint of raising the recording density of optical discs in the future.

When the arrangement of optical system as illustrating in FIG. 14 can be realized, one of the two beam splitters required for the arrangement of optical system illustrated in FIG. 1 can be omitted to make it possible to reduce the size and the manufacturing cost of the optical system.

Figure 18:
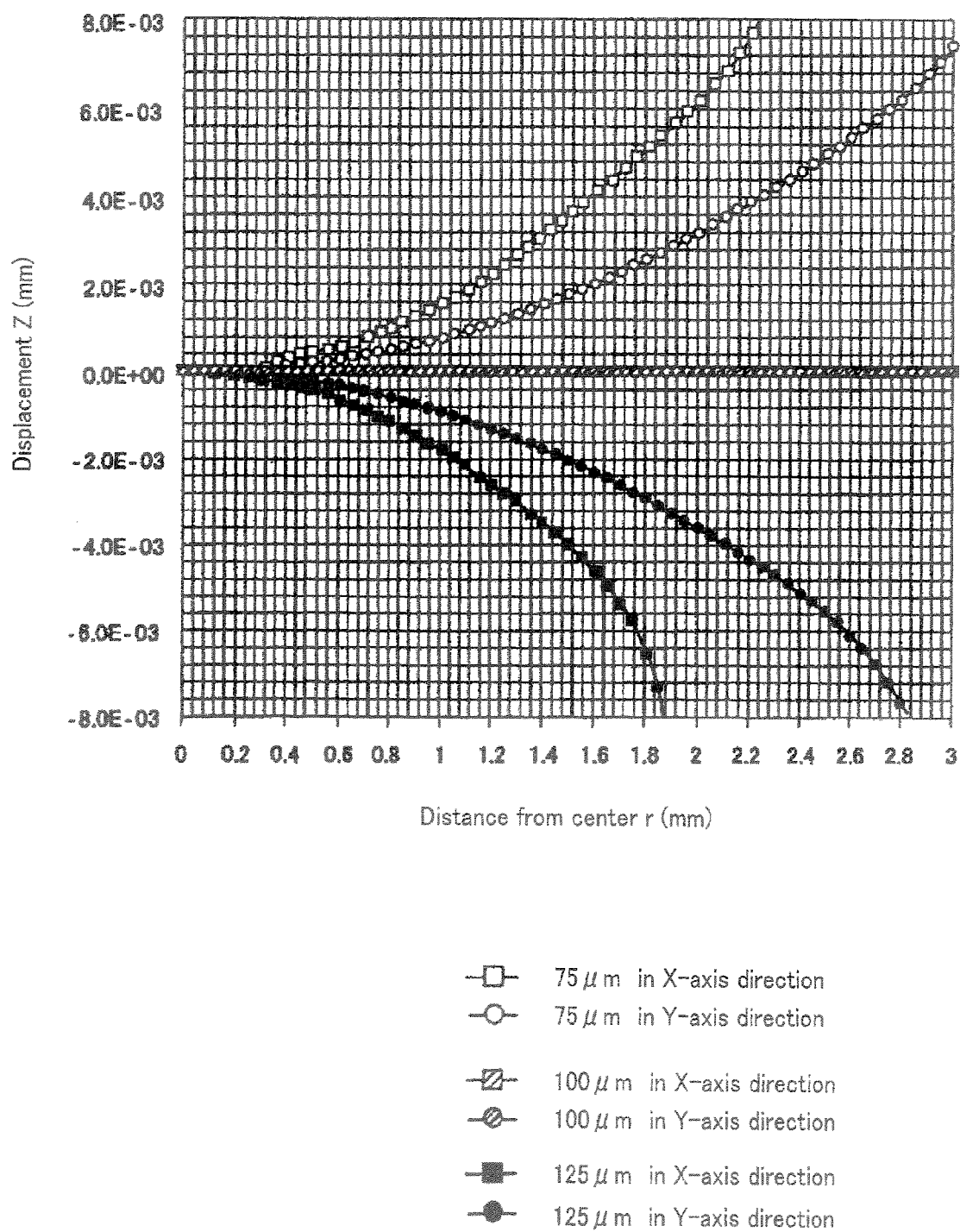
FIG. 18 is a schematic illustration of an ideally deformed profile of a mirror surface that can be used for both the sixth and seventh embodiments of deformable mirror device according to the present invention.

FIG. 18 schematically illustrates as an example the deformation of profile that is required to compensate the spherical aberrations on the recording layers 81 through 83 of an optical disc 80 by means of an optical system where the deformable mirror device 60 is used as 45° mirror.

In FIG. 18, the deformed profiles of the mirror surface required for compensating spherical aberrations is expressed by the numerical values indicating the distances from the center of the mirror surface (center C) in the direction of the X-axis and that of the Y-axis and the corresponding displacement in the direction of the Z-axis.

The numerical values of FIG. 18 are selected to correspond to an optical disc having a 0.075 mm (75 μm) thick cover layer for the first recording layer 81, a 0.100 mm (100 μm) thick cover layer for the second recording layer 82 and a 0.125 (125 μm) thick cover layer for the third recording layer 83.

The numerical values of FIG. 18 are selected also to correspond to such a design arrangement where it is not necessary to compensate any spherical aberration (since the spherical aberration is minimized there) when the optical system as shown in FIG. 14 that the deformable mirror device 60 is provided with is driven to focus the laser beam on the second recording layer 82.

In FIG. 18, the white marks indicate the values obtained for the thickness of the cover layer of 75 μm (for the first recording layer 81) and the shaded marks indicate the values obtained for the thickness of the cover layer of 100 μm (for the second recording layer 82), while the black marks indicates the values obtained for the thickness of the cover layer of 125 μm (for the third recording layer 83). Additionally, the square marks indicate the values of the deformed profiles in the direction of the X-axis and the round marks indicate the values of the deformed profiles in the direction of the Y-axis.

As seen from FIG. 18, the mirror surface is designed to show zero displacement for the second recording layer 82. As pointed out above, the optical system is so designed that it is not necessary to compensate any spherical aberration when the optical system is driven to focus the laser beam on the second recording layer 82.

The displacement in the direction of the X-axis and the displacement in the direction of the Y-axis are made to show a ratio of about X:Y=2:1 for the same distance from the center C for both the first recording layer 81 and the third recording layer 83 that require compensation of spherical aberration.

To satisfactorily compensate the spherical aberration for the first recording layer 81 or the third recording layer 83, it is necessary to define the pattern of the elliptic sections 2A through 2D in terms of, for example, the thickness in the Z-axis and the distance from the center C of each of the elliptic sections typically by means of an FEM simulation tool so as to obtain the displacements as shown in FIG. 18 at the corresponding positions from the center C.

As pointed out above, the optical system is so designed that it is not necessary to compensate any spherical aberration for the intermediate second recording layer 82 out of the three recording layers formed on the optical disc 80. With such an arrangement, both the spherical aberration of the first recording layer 81 and that of the third recording layer 83 may be compensated only for a single layer to minimize the displacement of the mirror surface. In other words, if the optical system is designed in such a way that it is not necessary to compensate any spherical aberration for the first recording layer 81 or the third recording layer, the mirror surface is maximally displaced for two layers so that the flexible member 2 is required to be made of a material showing an enhanced degree of strength to consequently raise the manufacturing cost. However, the manufacturing cost can be minimized by so designing the optical system as to make it unnecessary to compensate any spherical aberration for the second recording layer 82.

Similarly, the displacement of the mirror surface can be minimized for an optical disc having four or more than four recording layers by so designing the corresponding optical system as to make it unnecessary to compensate any spherical aberration for an intermediate recording layer.

Seventh Embodiment

Figure 19:
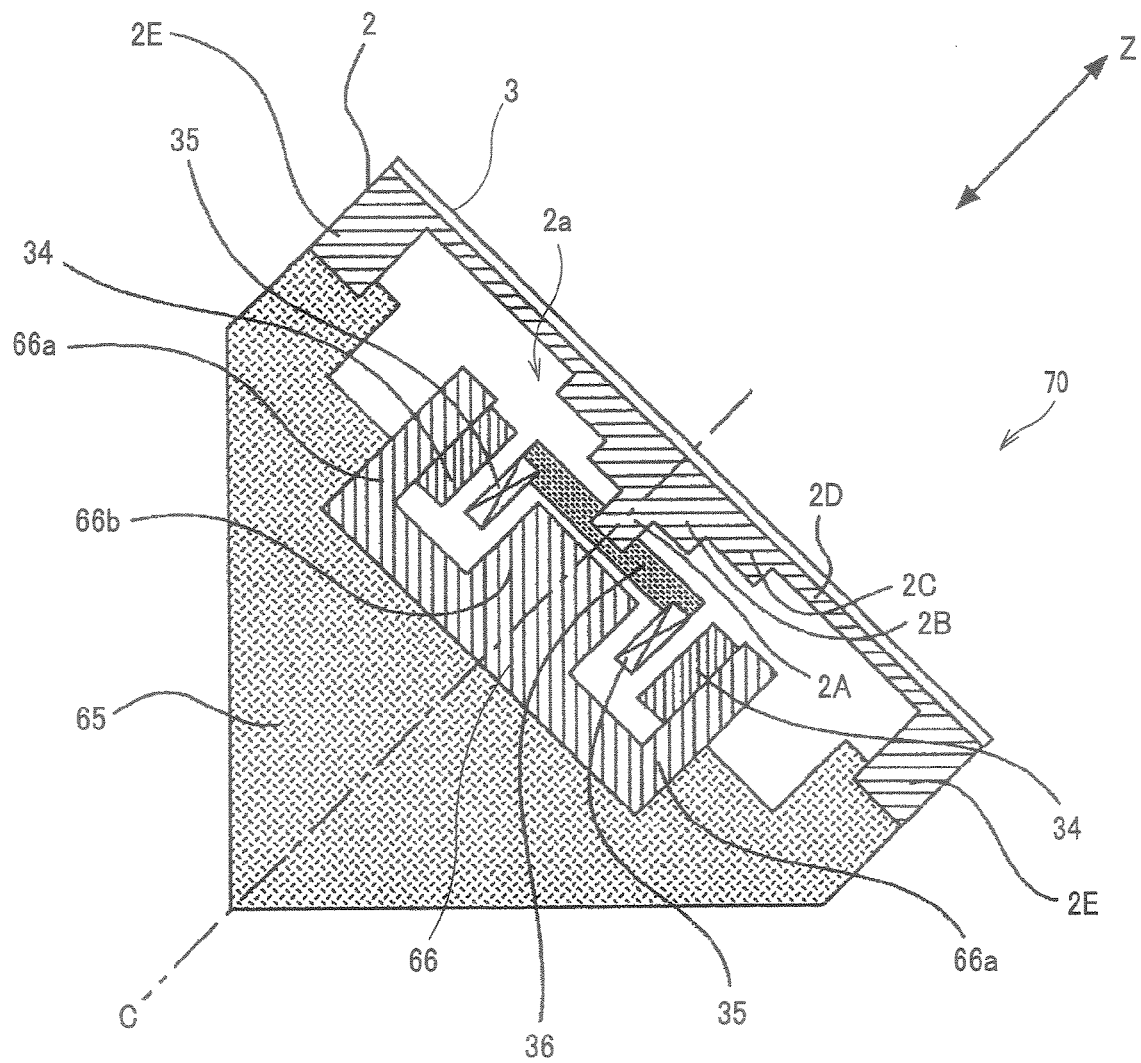
FIG. 19 is a schematic cross sectional view of the seventh embodiment of deformable mirror device according to the present invention.

Now, the seventh embodiment of the present invention will be described below by referring to FIG. 19.

The components of this embodiment same as or similar to those of FIGS. 16 and 17 are denoted respectively by the same reference symbols and will not be described any further.

Elliptic sections 2A through 2D and a frame 2E same as those used for the flexible member 2 of the deformable mirror device 60 of FIG. 16 are also used in the seventh embodiment for the purpose of compensating the spherical aberration that arises by means of a 45° mirror as shown in FIG. 14.

While drive force is applied to the outer peripheral section of the frame 2E of the flexible member 2 in the deformable mirror device 60 of FIG. 16, drive force is uniformly applied to the central part of the elliptic section 2A of the flexible member 2 of the deformable mirror device 70 of this embodiment.

A coil holder 36 similar to that of deformable mirror device 30 of the third embodiment is fitted to the elliptic section 2A that is formed in a central area of the flexible member 2. A drive coil 35 is wound around the outer periphery of the coil holder 36.

A base 65 is provided to support the flexible member 2 by way of the frame 2E. A yoke 66 having a outer peripheral wall 66a and a central projecting section 66b formed in the inside thereof to show a substantially E-shaped cross section is rigidly bonded to the base section 65 as show in FIG. 19.

A ring-shaped magnet 34 is fitted to the inner peripheral side of the outer peripheral wall 66a of the yoke 66 so that a magnetic flux may be supplied between the outer peripheral wall 66a and the central projecting section 66b. The yoke 66 is centered by the profile of the base 65 in such a way, when the frame 2E of the flexible member 2 is rigidly fitted to the base 65, the central axis of the central projecting section 66b is aligned with the center C of the mirror surface. When the base 65 and the flexible member 2 are rigidly secured relative to each other, the central projecting section 66b and the coil holder 36 provide a predetermined gap between them so that the outer peripheral part of the coil holder 36 where the drive coil 35 is wound is pinched between the magnet 34 that is rigidly fitted to the outer peripheral wall 66a and the central projecting section 66b.

As a drive current is supplied from the drive circuit 10 to the drive coil 35 of the deformable mirror device 70 having a configuration as described above, drive force is generated and directed in the direction of the Z-axis.

Thus, the deformable mirror device 70 of this embodiment differs from the sixth embodiment only in that drive force is applied not to the frame 2E arranged at the flexible member 2 but to the central elliptic section 2A.

When the deformable mirror device 70 is made to operate as 45° mirror, it can advantageously compensate spherical aberration because an elliptic pattern is formed as strength distribution pattern 2a in the flexible member 2. As the frame 2E is formed around the outer peripheral part of the elliptic sections 2A through 2D that operate as variable part for the mirror surface, it is possible to make the deformed profile of the mirror surface agree with a desired deformed profile as in the case of the sixth embodiment.

The strength distribution pattern 2a may be defined typically by way of a simulation using an FEM simulation tool so that the deformed profile produced by applying predetermined drive force may correspond to the extent of compensation required for each of the recording layers of the optical disc as shown in FIG. 18.

Figure 20:
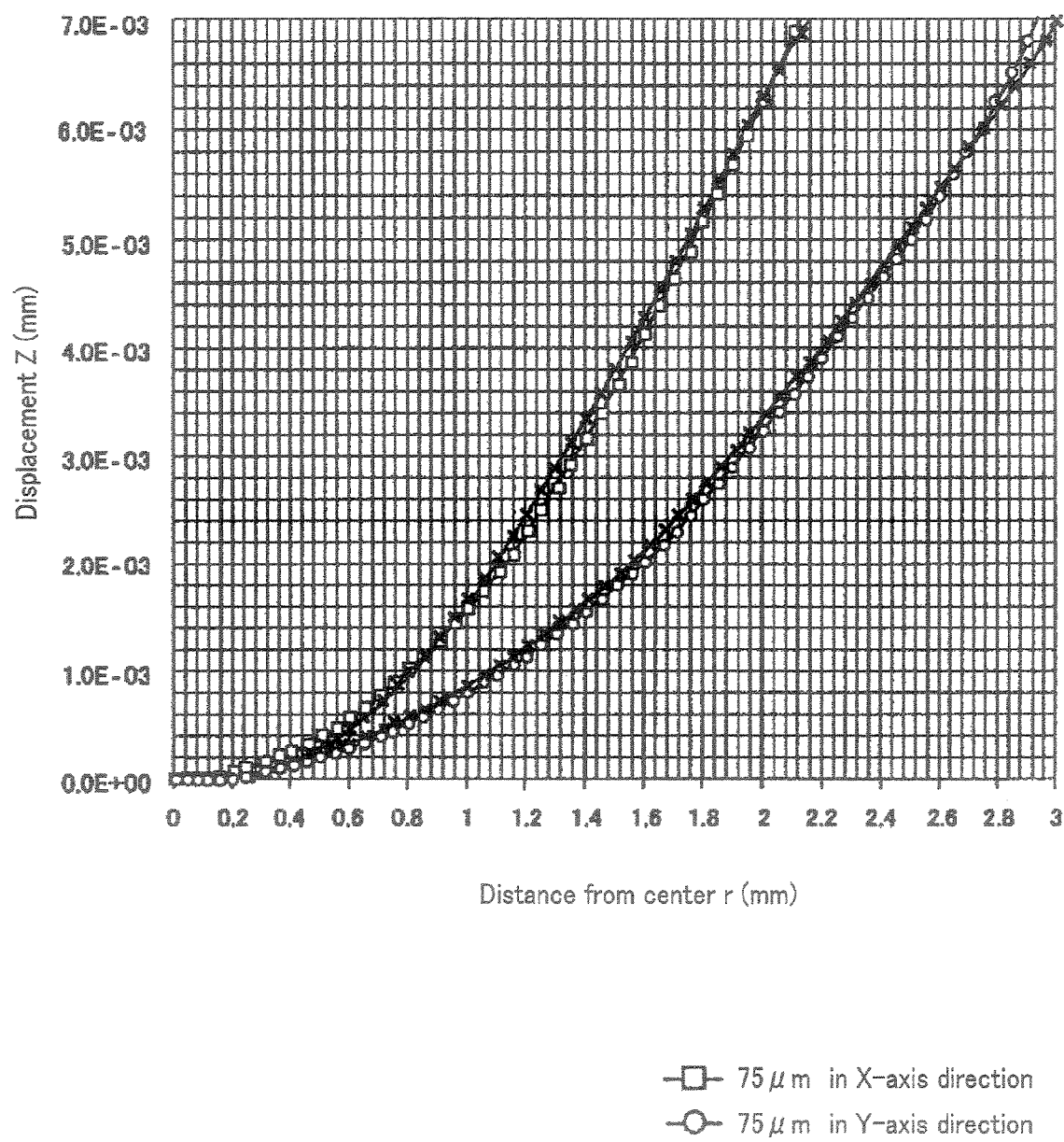
FIG. 20 is a schematic illustration of the deformed profile of the mirror surface of the seventh embodiment of deformable mirror device according to the invention as compared with an ideally deformed profile thereof.

FIG. 20 is a schematic illustration of the deformed profile of the mirror surface of the deformable mirror device 70 of the seventh embodiment as observed at each of the recording layers of the optical disc.

Note that FIG. 20 only illustrates the results obtained on the deformed profile as a function of the extent of compensation of the spherical aberration produced when the cover layer has a thickness of 75 μm. In FIG. 20, the square marks and the round marks respectively indicate the extents of displacement in the direction of the Z-axis as a function of the distance from the center C in the direction of the X-axis and in the direction of the Y-axis.

In FIG. 20, the x marks indicate the corresponding ideal values of the deformed profile in the direction of the X-axis and those in the direction of the Y-axis when the thickness of the cover layer is 75 μm similar to those described above by referring to FIG. 18.

From the results illustrated in FIG. 20, it will be seen that the obtained values of the deformed profile substantially agree with the corresponding ideal values at almost all the points of observation both in the direction of the X-axis and in the direction of the Y-axis. If the observed value differs from the corresponding ideal value at any of the points of observation, the difference is 0.2 μm or less at most.

Thus, the observed deformed profile of the mirror surface highly accurately agrees with the ideal deformed profile. From the obtained results, it will be appreciated that the deformable mirror device 70 can highly excellently compensate any spherical aberration.

While FIG. 20 shows only the results of an experiment for the seventh embodiment, the sixth embodiment will certainly provide similar results if such an experiment is conducted also for the sixth embodiment.

As for the above-described sixth and seventh embodiments, the central part of the flexible member 2 is rigidly secured to the base 61 in the sixth embodiment, where the frame 2E (outer peripheral part) is adapted to be driven, so that the displacement of the center of the mirror can be reduced to nil depending on the applied drive force. Then, as a result, the optical axis of the reflected laser beam can be made to produce practically no displacement.

On the other hand the frame 2E and the base 65 are rigidly secured to each other in the seventh embodiment, where the elliptic section 2A (central part) of the flexible member 2 is adapted to be driven, so that the flexible member 2 and the base 65 are bonded to each other over a large area to improve the rigidity of the entire arrangement. This arrangement then provides a advantage that a high value can be selected as the frequency of the proper oscillation of the flexible member 2. Thus, the spherical aberration in the disc rotating area can be corrected advantageously.

When the strength distribution pattern 2a is formed by using ellipses having a common center as in the case of the sixth and seventh embodiments, the flexible member 2 can be manufactured by utilizing the process of manufacturing semiconductor devices particularly in terms of film forming and etching. Thus, it is possible to manufacture deformable mirror devices according to the present invention easily and highly accurately on a mass production basis. Additionally, such deformable mirror devices ca be downsized to further reduce the manufacturing cost.

While an electromagnetic actuator is used to apply drive force to the flexible member 2 in both the sixth embodiment and the seventh embodiments as in the case of the third embodiment described earlier, it is also possible to realize a deformable mirror device that operates as 45° mirror for compensating spherical aberration if it is designed to use an arrangement similar to that of the first or second embodiment for applying drive force to the flexible member 2 where a strength distribution pattern 2a is formed by using elliptic profiles.

Apart from forming a strength distribution pattern 2a, it is also possible to realize a deformable mirror device that operates as 45° mirror for compensating spherical aberration by arranging an upper electrode 41 and a lower electrode 42 having an elliptic profile and a common center for the electrode pattern 2a of the flexible member 2.

With such an arrangement, it is also possible to utilize the electrostatic force generated between the upper electrode 41 and the lower electrode 42 only for applying drive force after forming a strength distribution pattern 2a of elliptic sections on the flexible member 2.

Similarly, it is also possible to realize a deformable mirror device that operates as 45° mirror for compensating spherical aberration if it is designed to use a piezoelectric element for the flexible member where a mirror surface is formed by arranging elliptic profiles having a common center for a polarization inversion pattern like the polarization inversion pattern 52 of the fifth embodiment.

While the number of the elliptic sections or the number steps with different thicknesses in the direction of the Z-axis of the strength distribution pattern 2a of the flexible member 2 is four including the elliptic sections A through D, the number is not subjected to any limitation.

The profile of each of the elliptic sections of each of the sixth and seventh embodiments is axially symmetric relative to both the X-axis and the Y-axis as described above and illustrated in FIG. 17A, it may alternatively take an axially asymmetric profile relative to the X-axis in view of the circumstances as described below.

Figure 21:
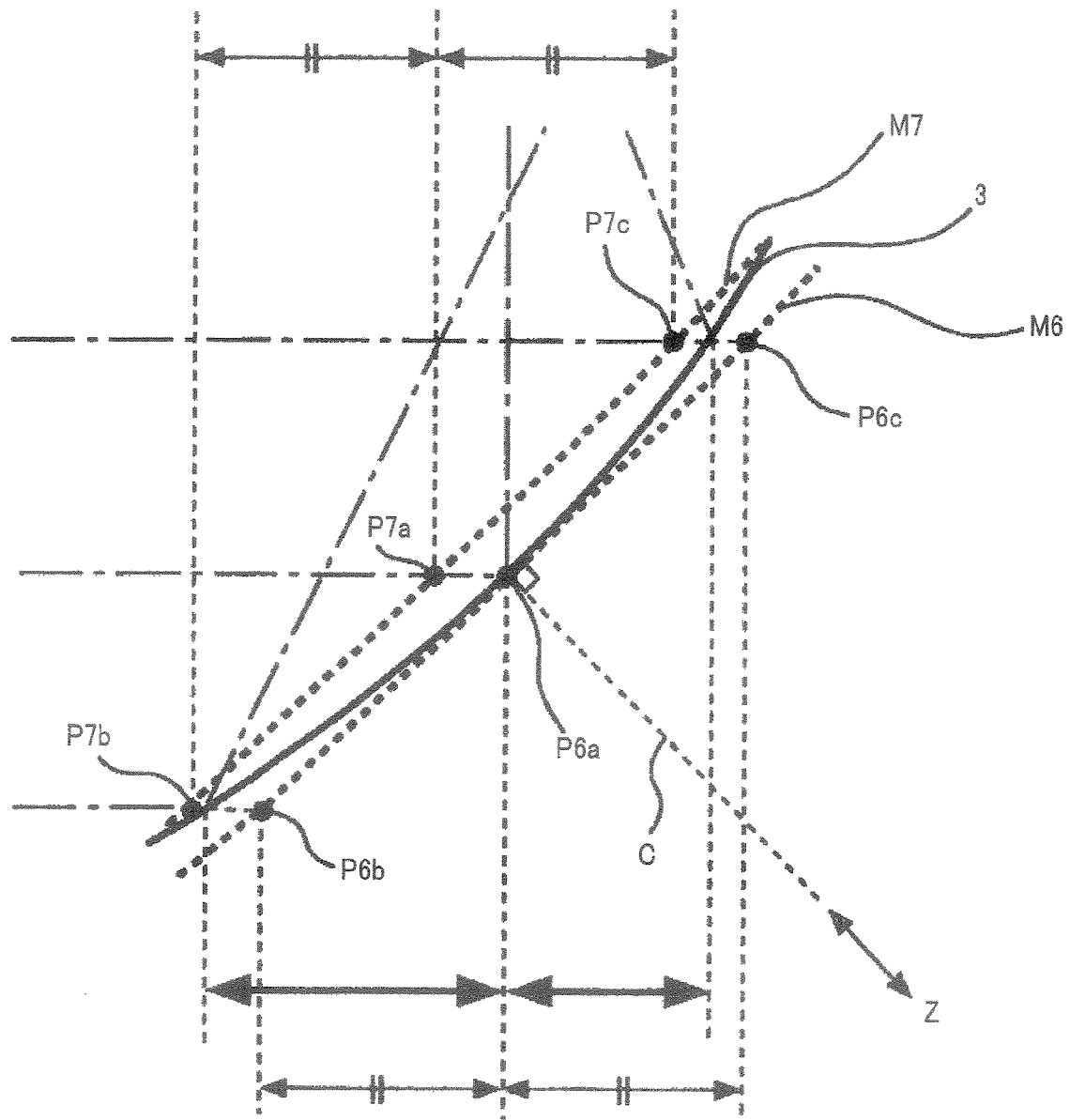
FIG. 21 is a schematic illustration of the relationship between an incident laser beam and a reflected laser beam at a mirror surface that can be used for both the sixth and seventh embodiments of deformable mirror device according to the present invention.

FIG. 21 is a schematic illustration of the relationship between an incident laser beam and a reflected laser beam at a mirror surface that can be used for both the sixth and seventh embodiments of deformable mirror device.

In FIG. 21, broken line M6 and broken line M7 respectively indicate the state of the mirror surface 3 of the sixth embodiment when it is not deformed and the state of the mirror surface 3 of the seventh embodiment when it is not deformed. More specifically, the broken line M6 indicates the state of the mirror surface 3 of the sixth embodiment where the flexible member 2 is supported at the central part thereof and when it is not deformed, whereas the broken line M7 indicates the state of the mirror surface 3 of the seventh embodiment where the flexible member 2 is supported at the frame 2E (outer peripheral section) thereof and when it is not deformed.

The massive solid line in FIG. 21 indicates the profile of the mirror surface 3 when it is subjected to drive force in the direction of the Z-axis as determined from the state of the mirror surface 3 that is not deformed of the sixth embodiment and that of the mirror surface 3 that is not deformed of the seventh embodiment. In other words, the mirror surface 3 shows a deformed profile that is convex at the laser beam reflecting side from the state thereof in the sixth embodiment indicated by the broken line M6, while the mirror surface 3 shows a deformed profile that is concave at the laser beam reflecting side from the state thereof in the seventh embodiment indicated by the broken line M7.

Firstly, in the state of the mirror surface 3 of the sixth embodiment when it is not deformed as indicated by the broken line M6, the center and the opposite ends of the irradiated laser beam are indicated respectively by P6a, P6b, P6c in FIG. 21. The opposite ends P6b, P6c of the irradiated laser beam are separated from the center P6a of the irradiated laser beam by the same distance so that it will be appreciated that a reflection angle of 90° is obtained. Similarly, in the case of the state of the mirror surface 3 of the seventh embodiment when it is not deformed as indicated by the broken line M7, the opposite ends P7b, P7c of the irradiated laser beam are separated from the center P7a of the irradiated laser beam by the same distance so that it will be appreciated that a reflection angle of 90° is obtained.

Thus, in either case, the reflection angles at the opposite ends of the laser beam are equal to each other when the mirror surface 3 is not deformed so that the optical axis of the laser beam does not show any displacement.

However, when the mirror surface 3 is deformed from the state as indicated by the broken line M6 or M7, the opposite ends of the irradiated laser beam are separated from the center of the irradiated laser beam not by the same distance and the reflection angles shows a discrepancy for the laser beam.

Note that the mirror surface 3 is deformed extremely for the purpose of easy understanding in FIG. 21 and the discrepancy is very large. However, the discrepancy is small and negligible because the extent of deformation actually required for the purpose of compensating spherical aberration is minute.

Figure 22:
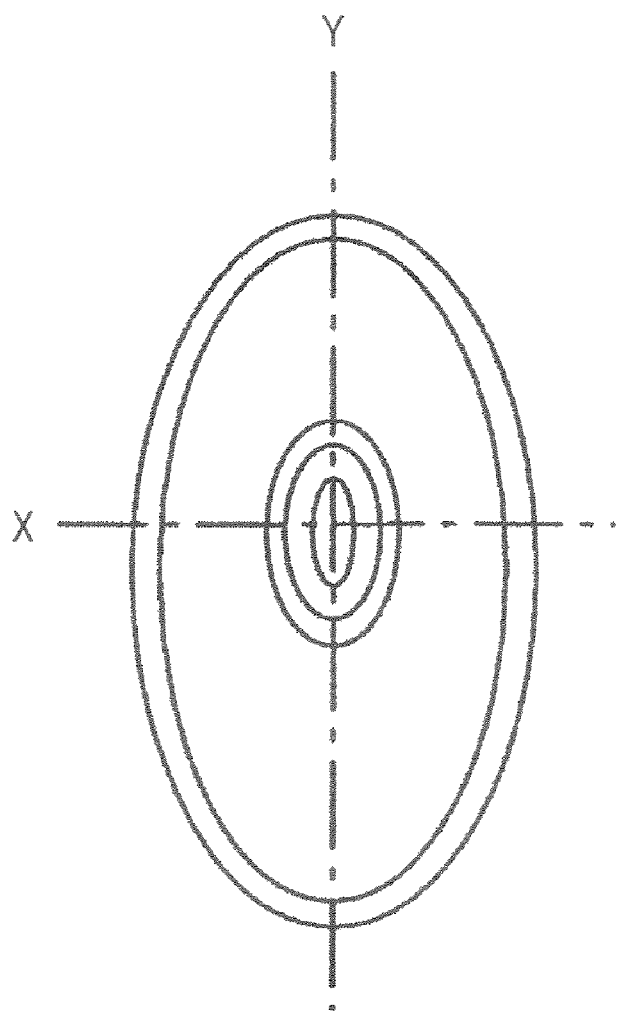
FIG. 22 is a schematic illustration of a strength distribution pattern that can be produced at the flexible member.

However, when the displacement of the optical axis is to be corrected as much as possible, it is possible to correct the discrepancy of the reflection angles by deforming the mirror surface 3 asymmetrically between the upper part and the lower part relative to the center C to make it show a so-called spoon-like cross section as shown in FIG. 21. To deform the mirror surface 3 so as to make it show such a spoon-like cross section, a strength distribution pattern 2a of ellipses as shown in FIG. 22 that are not completely axially symmetrical relative to the X-axis but asymmetric may well be formed.

Thus, to accurately correct the displacement of the optical axis of the laser beam when the mirror surface 3 is deformed in a deformable mirror device that operates as 45° mirror as in the case of the sixth and seventh embodiments the strength distribution pattern 2a may not well be formed by perfect ellipses.

Thus, the expression of "ellipse" as used herein for the purpose of the present invention may be an ellipse that is asymmetric relative to the minor axis (X-axis) thereof.

As described above for the preceding embodiments, according to the present invention parts are formed in a flexible member where a mirror surface is formed on the surface thereof so as to put them in a state differentiated from the remaining parts in terms of mode of deformation due to the profiles of circles or ellipses thereof having a common center in order to obtain a desired deformed profile necessary for correcting the spherical aberration of the mirror surface according to the application of uniform drive force.

As such parts to be in a differentiated state are formed by "the profiles of circles or ellipses having a common center", it is possible to realize a deformable mirror device that can advantageously compensate spherical aberration regardless of the variations where the laser beam is reflected by 180° and where the laser beam is reflected by 90°.

Then, as a result of forming parts to be in a differentiated state that show profiles of circles or ellipses having a common center according to the present invention, it is possible to prevent areas intensively subjected to stress from arising when drive force is applied. Thus, it is possible to effectively prevent the flexible member from being broken and/or fractured by fatigue.

When drive force is applied to deform the mirror surface, internal stress arises in the flexible member. If there is an area of the flexible member where stress is concentrated, the dimensions of the area can be abruptly changed particularly when the flexible member is made of a material that is homogeneous and isotropic.

For instance, when the pattern of the parts to be in a differentiated state is not formed by circles or ellipses having a common center, the pattern may show gaps that are reduced or increased in one or more than one particular directions. Then, stress is apt to be concentrated in such an area where gaps are reduced so that the dimensions of such an area can be changed abruptly.

If there is an area where stress is concentrated, the stress can exceed the allowable level of the flexible member in that area and the flexible member can highly probably be broken in that area. If the flexible member is repeatedly deformed, the flexible member can be fractured in that area by fatigue.

To the contrary, according to the present invention, a pattern is formed by the profiles of circles of ellipses having a common center so that the elements of the pattern are separated from each other by uniform gaps to prevent an area of concentrated stress from arising. Then, it is possible to effectively prevent the flexible member from being broken and fractured by fatigue.

Eighth Embodiment

Now, the eighth embodiment of the present invention will be described blow.

The eighth embodiment is formed by providing the flexible member with a thin section arranged at a predetermined position where the thickness is smallest in cross section.

The configuration of the eighth embodiment will be described by way of a flexible member 2 same as its counterparts of the sixth and seventh embodiments. The eighth embodiment differs from the deformable mirror devices of the other embodiments only in terms of the configuration of the flexible member and hence the parts common to the eighth embodiment and the other embodiments are denoted respectively by the same reference symbols and will not be described any further.

Figure 23A:
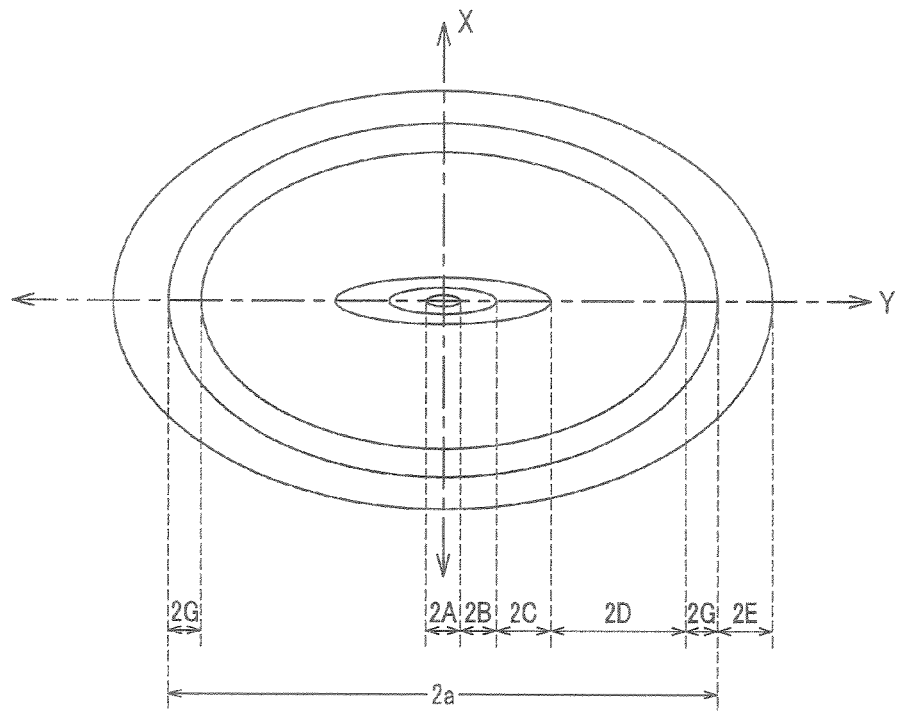
FIG. 23A is a schematic plan view of the flexible member of a deformable mirror device that can be realized when the eighth embodiment is applied to the sixth embodiment according to the present invention.
Figure 23B:
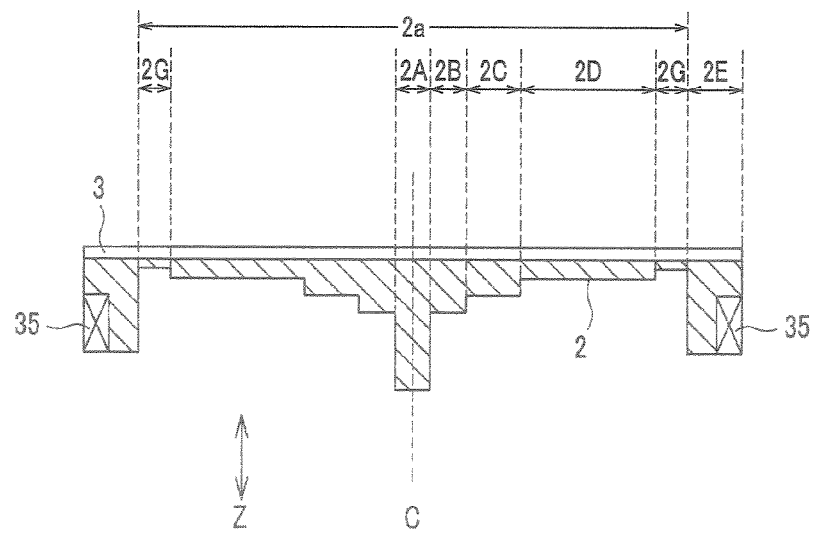
FIG. 23B is a schematic cross sectional view of the flexible member of FIG. 23A.

FIGS. 23A and 23B are schematic views of the flexible member 2 of the sixth embodiment realized by applying the flexible member 2 of the seventh embodiment. FIG. 23A is a plan view and FIG. 23B is a cross sectional view of the flexible member 2.

Figure 24A:
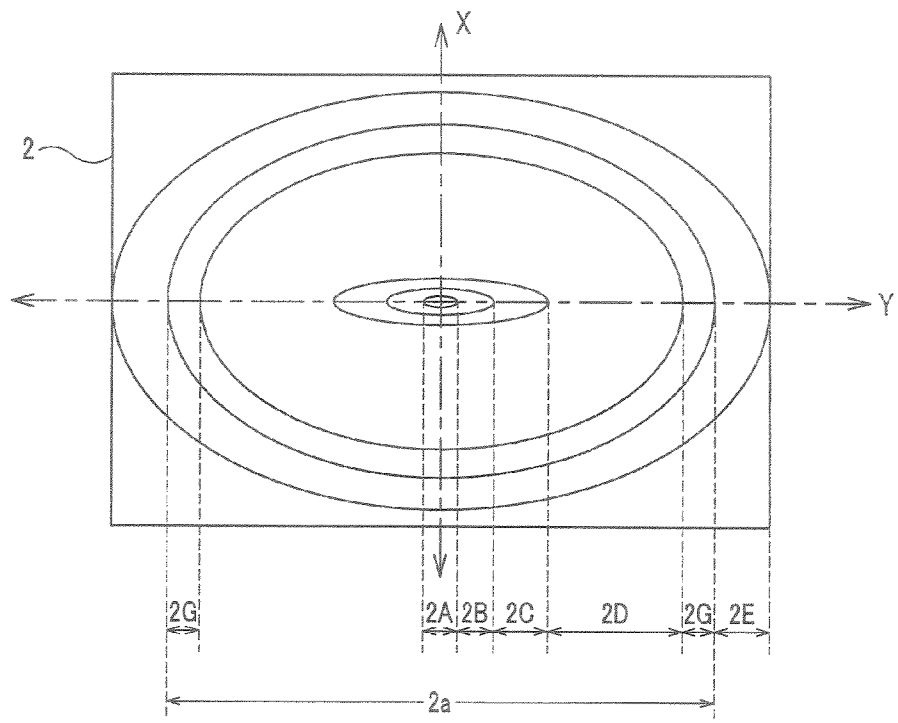
FIG. 24A is a schematic plan view of the flexible member of a deformable mirror device that can be realized when the eighth embodiment is applied to the seventh embodiment according to the present invention.
Figure 24B:
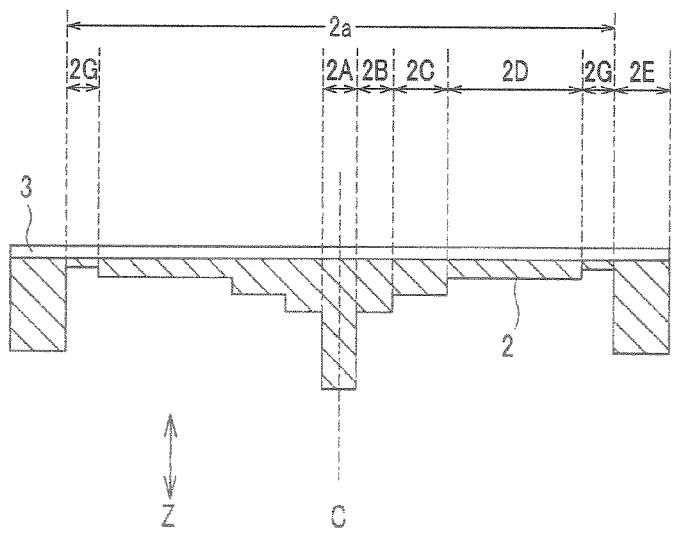
FIG. 24B is a schematic cross sectional view of the flexible member of FIG. 24A.

FIGS. 24A and 24B are schematic views of the flexible member 2 of the eighth embodiment realized by applying the flexible member 2 of the seventh embodiment. FIG. 24A is a plan view and FIG. 24B is a cross section view of the flexible member 2.

As seen from FIGS. 24A and 24B, the flexible member 2 is formed to include a frame 2E arranged at the most outer peripheral side so as to show the largest thickness in cross section and the highest strength and a thin section 2G arranged at the boundary area between the frame 2E and the inner part located close to the center C of the mirror surface to show the smallest thickness due to the profiles of the ellipses having a common center at the center C of the mirror surface.

The thin section 2G has a thickness of about 0.015 mm that is about a half of the thickness of the elliptic section 2D.

The thin section 2G is formed so as to have a uniform width along the entire circumference thereof, in this case, about 0.2 mm.

As the frame 2E is arranged at the most outer peripheral side to show the largest thickness and the highest strength and the thin section 2G is arranged at the boundary area of the frame 2E and the inner part located close to the center C of the mirror surface to show the smallest thickness, the thin section 2G is most easily deformable when drive force is applied to the flexible member if compared with the remaining parts of the flexible member.

With the above-described arrangement, when drive force is applied to the flexible member, the thin section 2G is deformed to show a large radius of curvature of deformation. Thus, the deformed profile of the mirror surface can easily be made to agree with the desired deformed profile if the elliptic section 2D is made to show a small area.

The thin section 2G is made to have a uniform width along the entire circumference thereof. Thus, drive force is uniformly transmitted to the thin section 2G so that the deformed profile of the mirror surface can be made to agree with the desired deformed profile so much easier.

Figure 25:
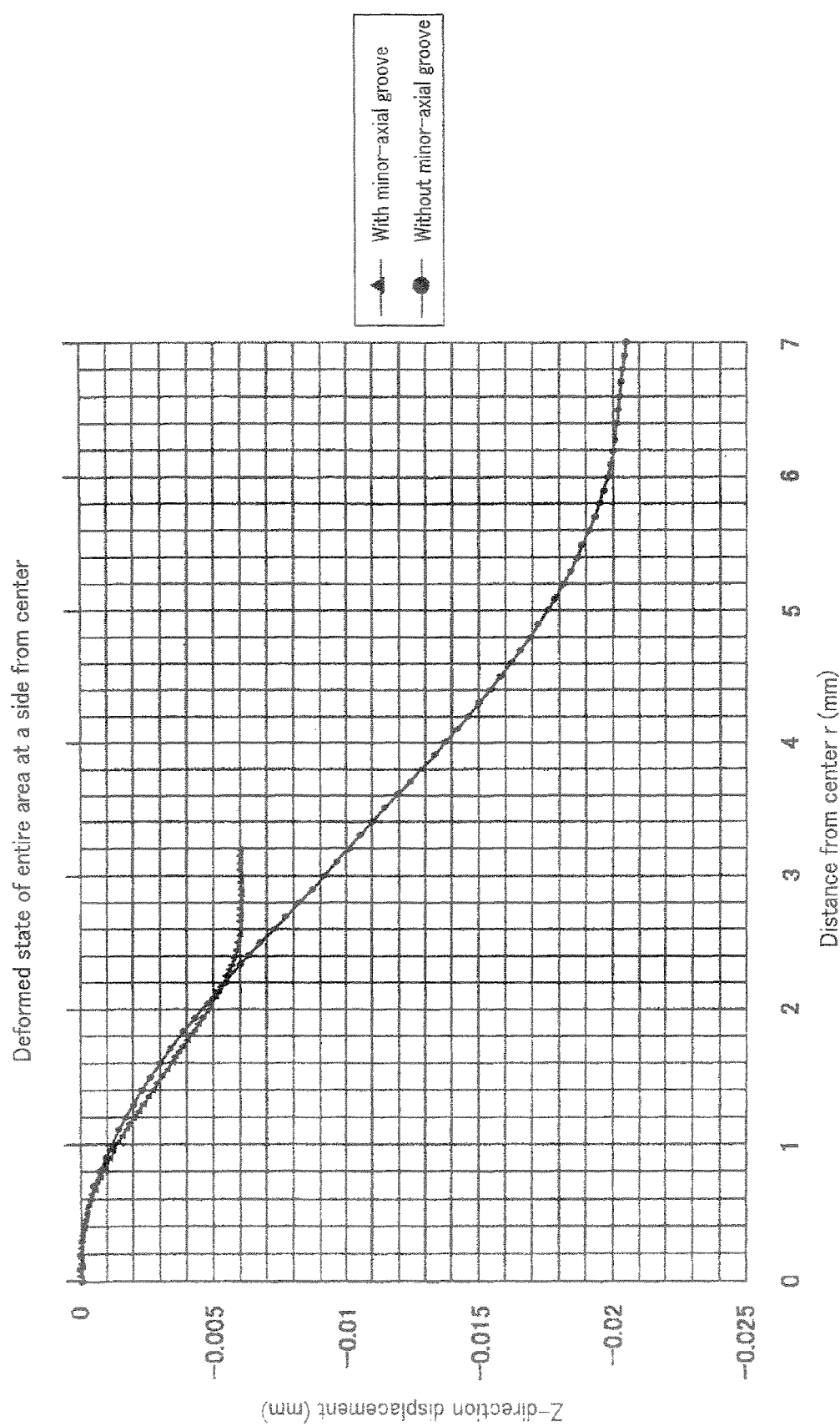
FIG. 25 is a schematic illustration of the deformed profile of the flexible member of the eighth embodiment of deformable mirror device according to the present invention as obtained by simulation.

FIG. 25 is a schematic illustration of the deformed profile of the flexible member 2 having a configuration as illustrated in FIGS. 23A through 24B as obtained by simulation.

FIG. 25 shows the results of a experiment conducted on a flexible member 2 having a thin section 2G as shown in FIGS. 23A through 24B and those of an experiment conducted on a flexible member 2 having no such a section as described above for the sixth and seventh embodiments in comparison. In FIG. 25, the black triangles indicate the results obtained for the flexible member 2 having a thin section as described above by referring to 23A through 24B and black circles indicate the results obtained for the flexible member 2 having so such a section as described above for the sixth and seventh embodiments.

For the convenience of explanation, the deformed profile of the flexible member 2 is indicated in FIG. 25 by the relationship between the distance from the center C of the mirror surface in the direction of the minor axis of ellipse and the displacement in the direction of the Z-axis.

To obtain the results shown in FIG. 25, the dimensions of the elliptic sections 2A through 2D of the flexible member 2 illustrated in FIGS. 23A through 24B are reduced to about ⅓.

Firstly, it is assumed that the laser spot to be formed on the mirror surface is found within about 2 mm from the center C in the direction of the minor axis (the X-axis) of ellipse. Then, the deformed range (effective range of deformation) required to compensate the spherical aberration on the mirror surface is the range within about 2 mm from the center C in the direction of the minor axis of ellipse.

On the above-described assumptions it will be seen that the flexible member 2 having no thin section 2G of the sixth and seventh embodiments as indicated by the black circles in FIG. 25 can obtain a deformed profile required to compensate the spherical aberration within the effective range of deformation within about 2 mm from the center C as it is deformed mildly and gradually from the part separated from the center C by about 7 mm. In other words, the flexible member 2 requires a range of deformation of about 7 mm to obtain a desired deformed profile as effective range of deformation when it does not have any thin section 2G.

On the other hand, the flexible member 2 having a thin section 2G of this embodiment can obtain a deformed profile similar to that of the flexible member 2 having no thin section 2G within the effective range of deformation as it is deformed from the part separated from the center C by about 2.4 mm.

On the basis of the results of the experiment, it is possible for a flexible member having a thin section 2G to reduce the range of deformation necessary for obtaining a desired deformed profile within the effective range of deformation to about ⅓ in terms of half diameter if compared with a flexible member having no thin section 2G.

Thus, for obtaining a desired deformed profile within the effective range of deformation, the necessary range of deformation of the flexible member 2 can be reduced to consequently reduce the flexible member 2 and hence the deformable mirror device having such a flexible member.

As will be understood by comparing the results illustrated in FIG. 25, the displacement of the flexible member 2 in the direction of the Z-axis of this embodiment is reduced to about ⅓ if compared with the sixth and seventh embodiments. That the displacement in the direction of the Z-axis is reduced by turn provides an advantage that the displacement of the optical axis of the laser beam can be effectively reduced when the flexible member 2 is rigidly secured at the outer peripheral part thereof and the central part thereof is driven by the method of driving the flexible member 2 of the seventh embodiment (the flexible member 2 of FIG. 24).

The above-described flexible member of this embodiment that is provided with the thin section 2G is same as the one as described above for the sixth and seventh embodiments except the thin section 2G and hence the thickness is reduced stepwise from the center C toward the outer periphery thereof although the outermost peripheral part has the largest thickness in cross section.

With the arrangement of reducing the thickness stepwise from the center C toward the outer periphery, the boundary area of the outermost peripheral part and the side of the center C provides the thinnest part as a matter of course. In other words, the arrangement of the flexible member 2 for the sixth and seventh embodiments provides a part that is apt to be deformed in the boundary area of the outermost peripheral part and the side of the center C.

In the eighth embodiment, the boundary area is made thinner for the arrangement of reducing the thickness stepwise from the center C toward the outer periphery to increase the difference of strength between the outermost peripheral part and the boundary area so as to make the boundary area more apt to be deformed. Then, as a result it is possible to intensify the extent of deformation relative to constant and uniform drive force.

The method of driving the flexible member of the first through fifth embodiments can also suitably be used for the eighth embodiment.

Unlike the flexible member described for the sixth and seventh embodiments, the flexible member (including the piezoelectric element 52) described for the first through fifth embodiments does not have an outermost peripheral part having the largest thickness in cross section. However, the flexible member described for the second through fifth embodiments is connected to the main body side (to the side of the substrate 4) of the deformable mirror device at the outermost periphery thereof so that the outermost peripheral part provides a desired level of strength. In other words, the outermost peripheral part of the flexible member described above for the second through fifth embodiments can be regarded as that of the flexible member described above for the sixth and seventh embodiments that has the largest thickness in cross section.

From this fact, the flexible member described above for the second through fifth embodiments can provide the advantage similar to the one described above for the sixth and seventh embodiments when it is provided with a thin section 2G in the boundary area between the outermost peripheral part and the side of the center C.

However, it should be noted that, in either case, the boundary area between the outermost peripheral part and the side of the center C is made thinnest in cross section in the rigorous sense of the word. In other words, the flexible members provide the effect of increasing the radius of curvature of deformation in the boundary area if compared with a flexible member where the boundary area is made thicker than the remaining area.

Then, the boundary area can be made more easily deformable as the thickness of the boundary area between the outermost peripheral part and the side of the center C is reduced so that it is possible to intensify the extent of deformation relative to constant and uniform drive force.

Meanwhile, the flexible member 2 of the first embodiment differs from its counterparts of the other embodiments because it is formed integrally to bridge the side of the first space 5 and the side of the second space 7.

The flexible member 2 of the first embodiment is connected to the inner peripheral wall of the substrate 4 that defines the first space 5 and a required level of strength is secured at that part. In other words, that part corresponds to the outermost peripheral part of the flexible member 2 of any of the other embodiments.

Therefore, the flexible member of the first embodiment can provide the effects of the thin section 2G of the flexible member of any of the other embodiments when a thin section 2G is arranged at the boundary area between the part connected to the inner peripheral wall defining the first space 5 and the side of the center C of the mirror surface.

While the eighth embodiment is described above in terms of a strength distribution pattern 2a formed by the profiles of ellipses so that the thin section 2G also has an elliptic profile, the thin section 2G is made to show a circular profile when the strength distribution pattern 2a is formed by the profiles of circles. As the profile of the strength distribution pattern 2a is made to agree with that of the thin section 2G, it is possible to make the deformed profile of the mirror surface agree with a desired deformed profile with ease. Additionally, it is possible to reduce the range of deformation of the flexible member required to obtain a desired deformed profile necessary to compensate the spherical aberration within the effective range of deformation when a thin section 2G is provided.

As pointed out above, when the flexible member 2 of the eighth embodiment is provided with a required level of strength at the outermost peripheral part thereof as in the case of the second through fifth embodiments and the sixth and seventh embodiments, it may be made to have a thin section 2G that is apt to be deformed in the boundary area between the outermost peripheral part and the side of the center C of the mirror surface. Then, consequently, it is possible to reduce the range of deformation of the flexible member required to obtain a desired deformed profile necessary to compensate the spherical aberration within the effective range of deformation.

When, on the other hand, the flexible member 2 is made to be large enough for covering both the first space 5 and the second space 7 and the part thereof connected to the inner peripheral wall of the substrate 4 that defines the first space 5 is provided with a required level of strength as in the case of the first embodiment, it may be made to have a thin section 2G that is apt to be deformed on the flexible member 2 in the boundary area between the part connected to the inner peripheral wall and the side of the center C of the mirror surface. Then, consequently, it is possible to reduce the range of deformation of the flexible member required to obtain a desired deformed profile necessary to compensate the spherical aberration within the effective range of deformation. When the strength distribution pattern 2a of the flexible member 2 is by concentric circles, the deformed profile of the mirror surface can be made to agree with the desired deformed profile with ease if the thin section 2G is formed as a ring-shaped part with its center located at the center C. When, on the other hand the strength distribution patter 2a of the flexible member 2 is formed by ellipses, the deformed profile of the mirror surface can be made to agree with the desired deformed profile with ease if the thin section 2G is formed as an elliptic belt like part with its center located at the center C.

As described above, the thin section 2G that is apt to be deformed is formed as a ring-shaped part with its center located at the center C when the strength distribution pattern 2a of the flexible member 2 is formed by concentric circles, whereas it is formed as an elliptic belt like part with its center located at the center when the strength distribution pattern 2a of the flexible member 2 is formed by ellipses. Then, it is possible to reduce the range of deformation of the flexible member required to obtain a desired deformed profile necessary to compensate the spherical aberration within the effective range of deformation.

Figure 26:
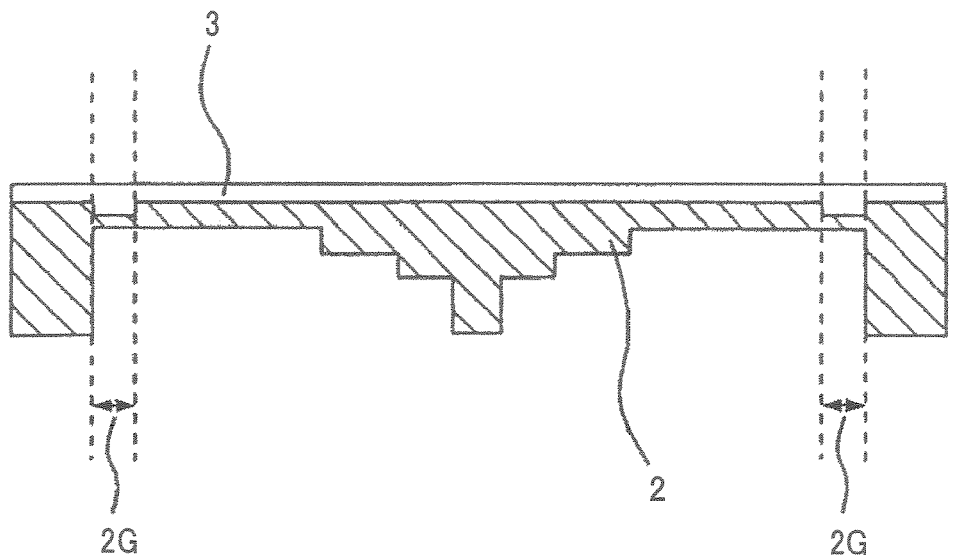
FIG. 26 is a schematic cross sectional view of the flexible member of a deformable mirror device according to the present invention obtained by modifying the eighth embodiment.
Figure 27:
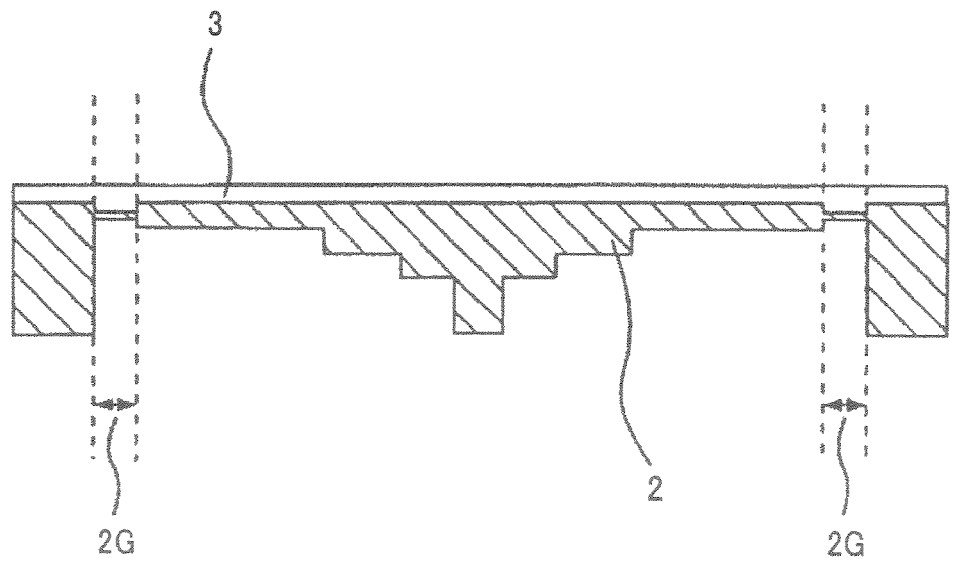
FIG. 27 is a schematic cross sectional view of the flexible member of a deformable mirror device according to the present invention also obtained by modifying the eighth embodiment.

FIGS. 26 and 27 are schematic cross sectional views of the flexible members of deformable mirror devices according to the present invention obtained by modifying the eighth embodiment.

FIG. 26 shows a flexible member where a thin section 2G is formed as a groove at the side of the reflection film 3 (the mirror surface) to provide the thinnest part in cross section.

FIG. 27 shows a flexible member where a thin section 2G is formed as grooves respectively at the side of the mirror surface and at the opposite side (rear surface) to provide the thinnest part in cross section.

As shown above, there are no limitations to the for of the thin section 2G so long as it is formed to provide the thinnest section in cross section.

Ninth Embodiment

Now, the ninth embodiment of the present invention will be described below.

While the reflection film 3 is formed over the entire surface of the flexible member 2 in each of the above-described embodiments, it is formed only on part of the surface of the flexible member 2 in the ninth embodiment.

Figure 28:
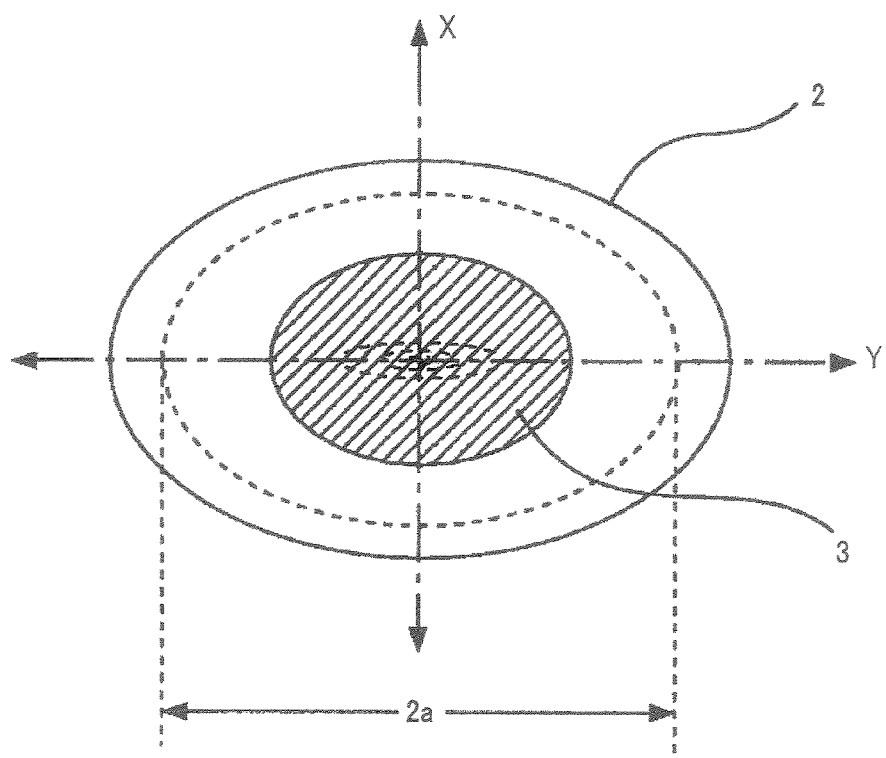
FIG. 28 is a schematic plan view of the deformable mirror plate of a deformable mirror device that can be realized when the ninth embodiment is applied to the sixth embodiment according to the present invention.

FIG. 28 shows a flexible member 2 similar to that of the sixth embodiment. Similarly, FIG. 29 shows a flexible member 2 similar to that of the seventh embodiment.

Figure 29:
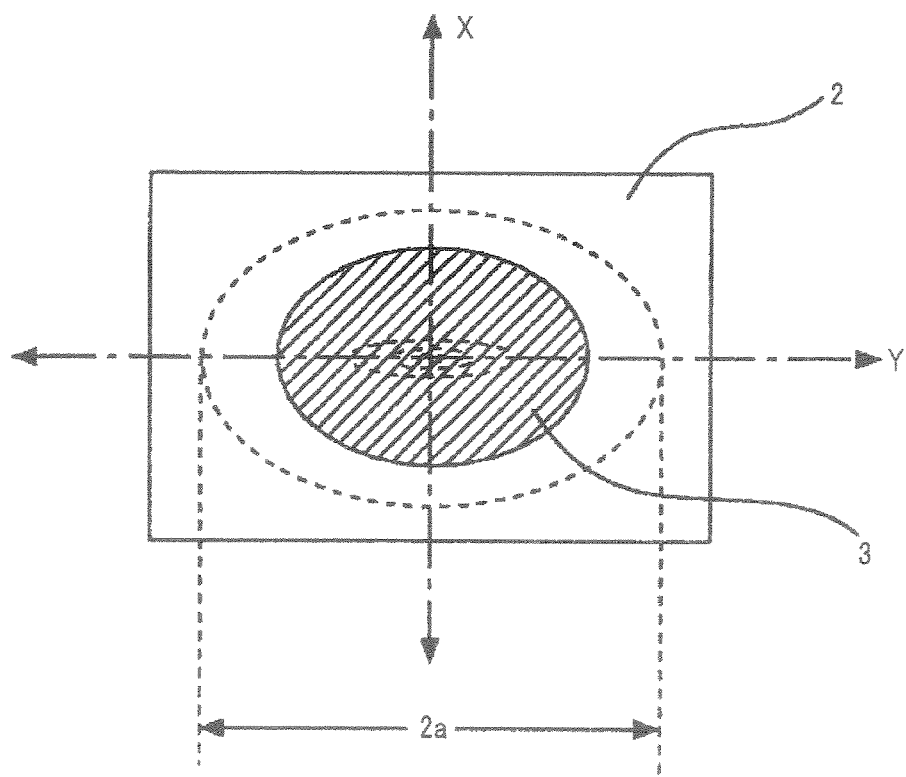
FIG. 29 is a schematic plan view of the deformable mirror plate of a deformable mirror device that can be realized when the ninth embodiment is applied to the seventh embodiment according to the present invention.

Note that FIGS. 28 and 29 are plan views of the flexible members 2 as viewed from the front surface side.

As seen from FIGS. 28 and 29, the reflection film 3 is formed only on part of the flexible member 2 in the ninth embodiment. More specifically the reflection film 3 is formed only in the area to be irradiated with a laser beam.

If the beam spot diameter of the laser beam is ø3 mm and the flexible member 2 is inclined by 45° for use as in the case of the sixth and seventh embodiments of deformable mirror device, the part of the flexible member 2 that is to be irradiated by a laser beam shows an elliptic profile with dimensions of about ø4.2426×3 mm. Then, the reflection film 3 will operate satisfactorily as mirror surface when it is formed to show an elliptic profile with its center located at the center C of the mirror surface and with dimensions of about ø4.2426×3 mm.

However, in reality, the position of the laser beam spot may be shifted slightly as the lens is shifted and/or the characteristics of the optical system change with time. To accommodate such errors, the reflection film 3 is formed typically in an area of about ø6.1 mm×4.3 mm with its center located at the center C of the mirror surface to show a relatively wide margin in the ninth embodiment. The mirror surface is effective and necessary only in that area and the remaining area will actually be not used so that the reflection film 3 is formed only in the effective and necessary area. The area that is expected to be irradiated with a laser beam is referred to as effective area hereinafter.

When a metal film is formed as reflection film 3 on the surface (outer surface) of the elastic flexible member of this embodiment, the flatness of the flexible member may be degraded depending on the film forming conditions. More specifically, the flexible member may be warped to accommodate the internal stress that arises as a result of the operation of forming the reflection film 3 so that consequently the flatness of the reflection film may be degraded after the film forming process.

If the initial flatness of the flexible member 2 (before it is deformed) is not secured, it will be difficult to make the deformed profile thereof agree with the ideal deformed profile obtained by simulation.

However, when the film forming area is reduced for the reflection film 3 on the flexible member 2 as shown in FIGS. 28 and 29, the part of the flexible member 2 that can be warped is also reduced so that consequently it is possible to effectively improve the flatness of the flexible member 2 after the film forming process.

Figure 30A:
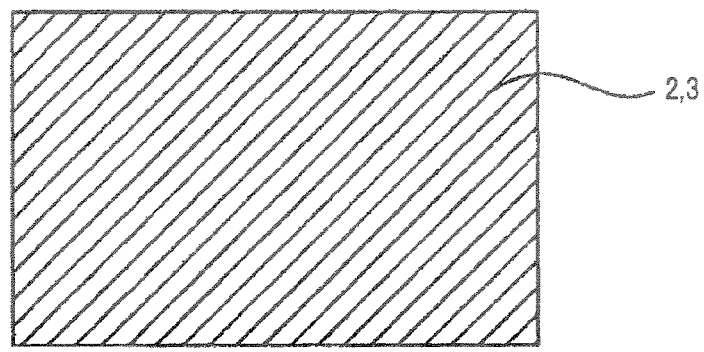
FIGS. 30A and 30B are schematic plan views of the deformable mirror plate of the ninth embodiment of deformable mirror device according to the present invention illustrating the method of manufacturing it.
Figure 30B:
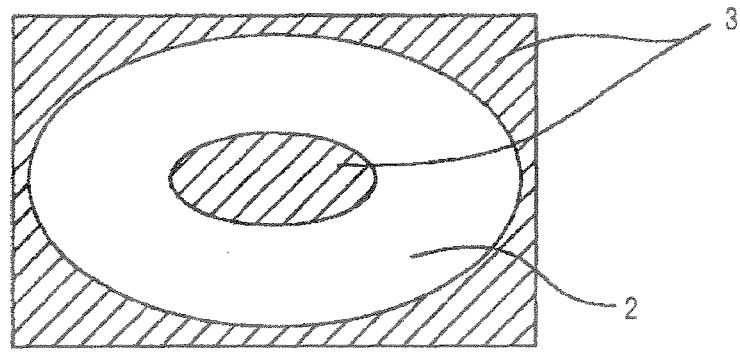

FIGS. 30A and 30B are schematic plan views of the deformable mirror plate (the flexible member 2 and the reflection film 3) of the ninth embodiment of deformable mirror device according to the present invention, illustrating the method of manufacturing it.

Note that FIGS. 30A and 30B shows the method of manufacturing a flexible member 2 having a configuration the same as that of the seventh embodiment as shown in FIG. 29.

Firstly, referring to FIG. 30A, a reflection film 3 is formed on the entire surface of the flexible member 2. Synthetic quartz is selected as material for the flexible member 2. The thickness t of the flexible member in cross section is t=0.2 mm and the length x in the direction of the X-axis and the length y in the direction of the Y-axis are 14 mm×20 mm. The reflection film 3 is made of aluminum.

Although not shown, a strength distribution pattern 2a is formed by dry etching on the rear surface of the flexible member 2.

Then, resist is applied to the effective area that is expected to be irradiated with a laser beam of the flexible member 2 of which the reflection film 3 is formed on the entire surface. Thereafter the reflection film 3 is exfoliated from the unnecessary area other than the above effective area by means of an exfoliation solution.

As a result, a deformable mirror plate where the reflection film 3 is formed only on the central effective area as shown in FIG. 30B.

Figure 31:
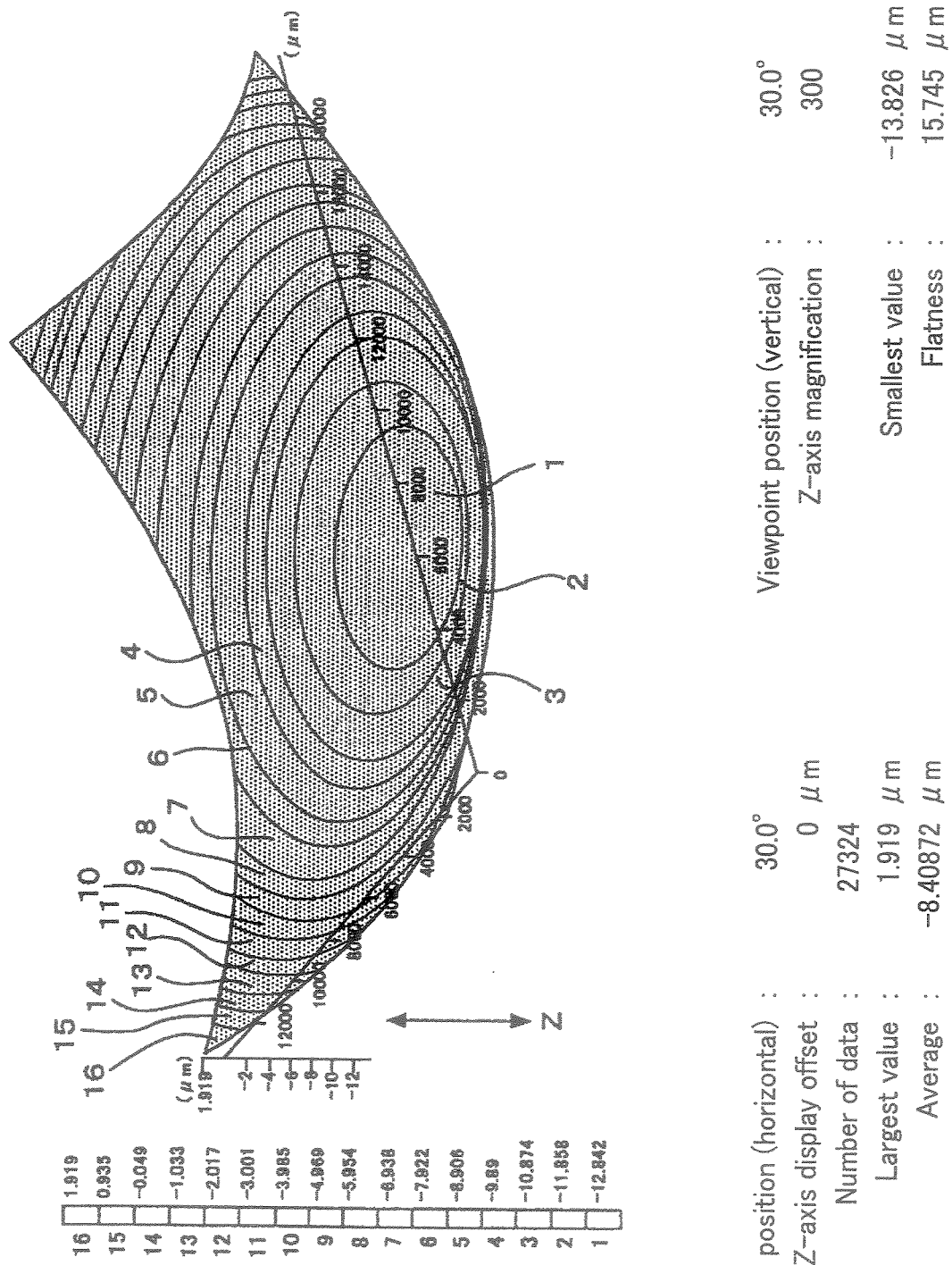
FIG. 31 is a graph illustrating the results obtained by measuring the degree of flatness of the flexible member where the reflection film is formed on the entire surface according to the present invention.
Figure 32:
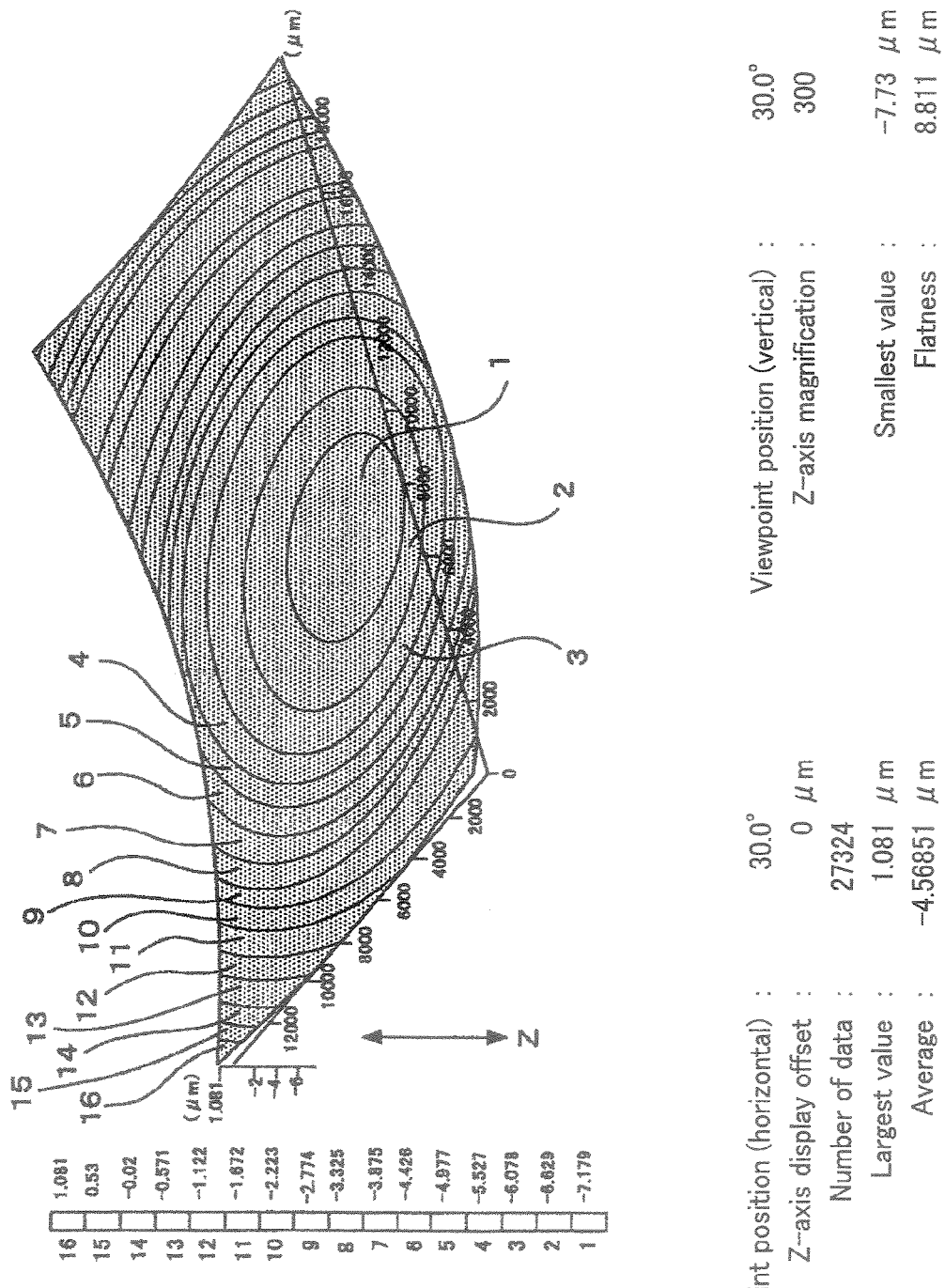
FIG. 32 is a graph illustrating the results obtained by measuring the degree of flatness of the flexible member where the reflection film is formed on part of the surface according to the present invention.

FIG. 31 is a graph illustrating the results obtained by measuring the degree of flatness of the flexible member 2 (deformable mirror plate) where the reflection film 3 is formed on the entire surface as shown in FIG. 30A. FIG. 32 is a graph illustrating the results obtained by measuring the degree of flatness of the surface of a flexible member 2 (deformable mirror plate) where the reflection film 3 is formed only on part (the effective area) of the surface as shown in FIG. 30B.

In these graphs, the results obtained by measuring the degree of flatness of the flexible member 2 are shown by 3D data. In the graphs, the displacement (altitude) of the flexible member 2 in the direction of the Z-axis relative to an ideal plane is indicated by contour lines where a smaller number shows a lower altitude.

By comparing the graphs it will be clear that the flexible member where a reflection film 3 is formed only on part of the surface as shown in FIG. 32 shows a degree of flatness that is almost twice as high as the flexible member where a reflection film 3 is formed on the entire surface as shown in FIG. 31.

Thus, it will be clear that the degree of flatness of the flexible member 2 (deformable mirror plate) is improved when a reflection film 3 is formed only on part of the surface thereof as in the case of the ninth embodiment if compared with that of the flexible member 2 where a reflection film 3 is formed on the entire surface as in the case of the first through eighth embodiments.

As the degree of flatness is improved, it is possible to bring the deformed profile closer to the ideal one.

Additionally, as the degree of flatness is improved, the flexible member 2 can be anchored to some other part with ease. Then, it is possible to reduce the number of steps required to anchor the flexible member 2 and the number of steps required to regulate the position and posture of the flexible member 2 to by turn reduce the manufacturing cost. Furthermore, as an excellent degree of flatness can be achieved the quality of the deformable mirror plate and that of the deformable mirror device can be held to a stable condition.

While FIGS. 31 and 32 show the reflection films 3 formed respectively on the entire surface and only on part of the surface of the flexible members 2 having a configuration as shown in FIG. 29, the flexible member where a reflection film 3 is formed only on part of the surface shows a degree of flatness that is also almost twice as high as the flexible member where a reflection film 3 is formed on the entire surface when the flexible members have a configuration as shown in FIG. 28.

While the laser beam spot formed on the mirror surface is described above as elliptic as in the description given earlier by referring to the sixth and seventh embodiments, similar effects can be achieved if the laser beam spot formed on the mirror surface is circular. More specifically, when the laser beam spot formed on the mirror surface is circular, a reflection film 3 is formed on part of the surface of the flexible member or the effective area that includes the area of the laser beam spot formed on the mirror surface and a margin. Then, the warp of the flexible member 2 is minimized to improve the degree of flatness if compared with an arrangement where a reflection film 3 is formed on the entire surface of the flexible member.

The ninth embodiment can advantageously be applied to the eighth embodiment where the flexible member is provided with a thin section 2G.

Figure 33:
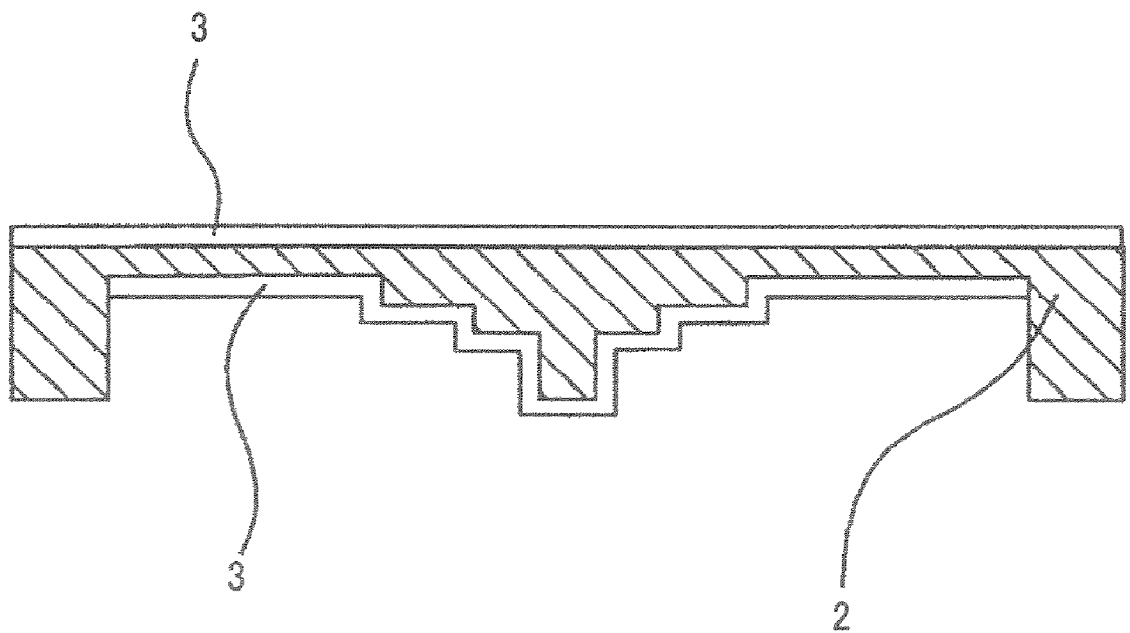
FIG. 33 is a schematic cross sectional view of the flexible member of a deformable mirror device according to the present invention obtained by modifying the ninth embodiment.

FIG. 33 is a schematic cross sectional view of the flexible member of a deformable mirror device obtained by modifying the ninth embodiment.

In the modified embodiment, a reflection film 3 is also formed on the rear surface of the flexible member 2. As a reflection film 3 is also formed on the rear surface, the flexible member 2 is sandwiched by two reflection films 2. Then, the internal stress that arises in the flexible member 2 at the time of forming the reflection film 3 on the front surface is well balanced by the internal stress that arises in the flexible member 2 at the time of forming the reflection film 3 on the rear surface so that the warp, if any, of the flexible member 2 can be controlled and minimized.

However, it should be noted that since the strength distribution pattern 2a of the flexible member 2 shows a cross section that is not symmetrical, the internal stresses cannot be well balanced by simply forming reflection films 3 that are identical in terms of quality and thickness respectively on the font and rear surfaces of the flexible member 2. Therefore, the thickness of the reflection film 3 formed on the rear surface may have to be regulated according to the thickness in cross section of the strength distribution pattern 2a and/or the material of the reflection film 3 formed on the rear surface may have to be differentiated for each of the parts of the strength distribution pattern 2a having different thicknesses so that the internal stresses produced in the flexible member 2 as a result of forming the reflection films 3 may be well balanced.

When a piezoelectric element 52 is used as in the case of the fifth embodiment, the strength distribution pattern 2a does not have a differentiated thickness. Then, it is possible to balance the internal stresses by forming reflection films (electrodes 53 operating as mirror surfaces) of the same material and the same thickness respectively on the front and rear surfaces of the flexible member to consequently improve the degree of flatness of the piezoelectric element 52.

In the case of the fourth embodiment (see FIG. 8), parts are formed so as to be in a state differentiated from the remaining parts by the electrode pattern 41a arranged on the rear surface of the flexible member 2. Then, if an aluminum reflection film 3 is formed on the rear surface, it means that it is no longer possible to realize a desired deformed profile. Therefore, in this case, the degree of flatness can be improved only by forming a reflection film 3 on part of the front surface as illustrated in FIGS. 28 and 29. In the case of the flexible member obtained by modifying the fourth embodiment (see FIG. 9), the upper electrode 41 can be formed on the entire rear surface of the flexible member 2. Then, the degree of flatness of the flexible member 2 can be improved by forming a metal film as upper electode 41 that is identical with the reflection film 3 in terms of material and thickness.

While FIG. 33 shows reflection films 3 formed respectively on the entire front surface and on the entire rear surface of the flexible member 2, it is also possible to form reflection films 3 respectively on a part of the front surface and on the corresponding part of the rear surface. With such an arrangement, it is possible to improve the degree of flatness of the flexible member 2 after forming the reflection films 3.

The present invention is by no means limited to the above-described embodiments. For instance while the deformable mirror device of each of the above embodiments is designed so as to be applied to high recording density discs such as Blu-ray discs in the above description it may also be applied to optical discs of any other type having a plurality of recording layers formed thereon.

Furthermore, the present invention is also applicable to optical discs having a single recording layer if the optical disc is required to compensate the spherical aberration that arises as a function of the change in the thickness of the cover layer on the entire surface of the optical disc.

While the strength distribution patterns 2a the electrode patterns 41a, 42a and the polarization inversion pattern 52a in the above description have concentric circles as elements in the above description, they may be replaced by some other patterns so long as they can produce a deformed profile necessary for compensating spherical aberration.

Note, however, if other patterns are used, they have to be made to produce a desired deformed profile when uniform drive force is applied.

While all the above-described patterns are formed by using perfect circles or ellipses, the circles or ellipses may be partly notched. In short, the pattern to be formed on a flexible member does not necessarily need to be formed by perfect circles or ellipses.

As for the strength distribution patterns 2a formed on the respective flexible members 2 of the first, second, third, sixth and seventh embodiments, the strength distribution patterns 2a of the first, second and third embodiments having concentric circles as elements may be provided with thicknesses that are changed stepwise as in the case of the sixth and seventh embodiments.

Conversely, the strength distribution patterns 2a of the sixth and seventh embodiment having ellipses with a colon center as elements may not be provided with thicknesses that are changed stepwise as in the case of the first, second and third embodiment.

The strength distribution pattern 2a formed on the flexible member 2 of each of the above-described embodiments may not necessarily be realized by forming projections in the above-described manner. Alternatively, it may be formed by using different materials at predetermined respective positions of the flexible member 2.

If such is the case, however, the flexible member 2 needs to be formed so as to contain such different materials at predetermined respective positions to predetermined respective content ratios. Then, the process of manufacturing such a flexible member 2 can be a complex one to by turn raise the manufacturing cost.

To the contrary, with the technique of forming projections that are used in the above-described embodiments, a same material can be used for the flexible member 2 and the strength distribution patter 2a can be formed by etching to reduce the manufacturing cost.

The invention claimed is:

1. A deformable mirror device comprising:
a flexible member that carries a mirror surface formed on a surface of the flexible member, the flexible member having a plurality of elliptical or circular sections with a common center that are differentiated in terms of mode of deformation due to varying cross sectional profiles, a thickness of the cross sectional profile of each section decreasing from a center of the flexible member towards an outer periphery of the flexible member in a horizontal direction relative to the surface; and
a drive unit configured to apply drive force generated as electromagnetic force to the flexible member, the drive unit
including a voice coil motor having a coil holder rigidly bonded to the surface of the flexible member opposite to the mirror surface, and
deforming the mirror surface by driving the voice coil motor and directly applying pushing/pulling pressure to the flexible member via the coil holder.

2. The device according to claim 1, wherein the flexible member exhibits a predetermined strength distribution via the plurality of sections formed with differentiated cross sectional profiles.

3. The device according to claim 2, wherein the flexible member is formed to show the cross sectional profile where the outermost peripheral part thereof is thickest and the thickness is reduced stepwise from the center of the mirror surface in the direction toward the outer periphery.

4. The device according to claim 1, wherein the flexible member is made to show a predetermined strength distribution as parts are formed with differentiated cross sectional profiles so as to be in a differentiated state in terms of mode of deformation and the drive unit is adapted to deform the mirror surface by applying required pressure to the surface of the flexible member opposite to the mirror surface.

5. The device according to claim 1, wherein the drive unit
emits a drive current to a drive coil wound around an outer peripheral part of the flexible member having a central part rigidly secured in position so as to generate electromagnetic force, and
applies pushing/pulling pressure to the outer peripheral part of the flexible member to deform the mirror surface via the generated electromagnetic force.

6. The device according to claim 1, wherein the device is adapted to reflect incident light by 180° and the parts to be in a differentiated state in terms of mode of deformation are formed by concentric circles having a common center.

7. The device according to claim 1, wherein the flexible member reflects incident light by 90° and the plurality of sections are formed by ellipses having a common center.

8. The device according to claim 1, wherein the flexible member includes a thin section having a thinnest cross section at a predetermined position
in regard to the profiles of the circular sections having a common center when the plurality of sections are formed by circles having a common center, and
in regard to the profiles of the elliptical sections having a common center when the plurality of sections are formed by ellipses having a common center.

9. The device according to claim 1, wherein the mirror surface is formed only on part of the flexible member.

10. The device according to claim 1, wherein the mirror surface is formed also on the rear surface of the flexible member.

11. A deformable mirror plate comprising:
a flexible member having a plurality of elliptical or circular sections with a common center that are differentiated in terms of mode of deformation due to varying cross sectional profiles, a thickness of a cross sectional profile of each section decreasing from a center of the flexible member towards an outer periphery of the flexible member in a horizontal direction relative to the surface; and
a mirror surface formed on a surface of the flexible member; and
a drive unit configured to apply drive force generated as electromagnetic force to the flexible member, the drive unit
including a voice coil motor having a coil holder rigidly bonded to the surface of the flexible member opposite to the mirror surface, and
deforming the mirror surface by driving the voice coil motor and directly applying pushing/pulling pressure to the flexible member via the coil holder.

12. The deformable mirror plate according to claim 11, wherein the flexible member exhibits a predetermined strength distribution via the plurality of sections formed with differentiated cross sectional profiles.

13. The deformable mirror plate according to claim 11, wherein the flexible member is formed to show the cross sectional profile where the outermost peripheral part thereof is thickest and the thickness is reduced stepwise from the center of the mirror surface in the direction toward the outer periphery.

14. The deformable mirror plate according to claim 11, wherein the plurality of sections are formed by concentric circles having a common center.

15. The deformable mirror plate according to claim 11, wherein the plurality of sections are formed by ellipses having a common center.

16. The deformable mirror plate according to claim 11, wherein the flexible member includes a thin section showing the thinnest cross section at a predetermined position
in regard to the profiles of the circular sections having a common center when the plurality of sections are formed by circles having a common center, and
in regard to the profiles of the elliptical sections having a common center when the plurality of sections are formed by ellipses having a common center.

17. The deformable mirror plate according to claim 11, wherein the mirror surface is formed only on part of the flexible member.

18. The deformable mirror plate according to claim 11, wherein the mirror surface is formed also on the rear surface of the flexible member.

19. A deformable mirror device comprising:
flexible means for carrying a mirror surface and a plurality of elliptical or circular sections and for compensating spherical aberrations via a drive force that deforms a profile of the mirror surface via the plurality of elliptical or circular sections such that a lowest deformation occurs at a center of the flexible means and increases towards an outer periphery of the flexible means;
means for applying the drive force generated as electromagnetic force to the flexible means, the means for applying the drive force including
means for deforming the mirror surface, the means for deforming being bonded to the flexible means opposite to the mirror surface, and
means for applying a pushing/pulling pressure to the flexible means to deform the mirror surface via the deforming means.

* * * * *